(12) United States Patent
Bennis

(10) Patent No.: US 11,317,616 B2
(45) Date of Patent: *May 3, 2022

(54) STEM GUIDES AND REPLACEABLE CARTRIDGES

(71) Applicant: Gary Bennis, Eau Claire, WI (US)

(72) Inventor: Gary Bennis, Eau Claire, WI (US)

(73) Assignee: Gary Bennis, Eau Claire, WI (US)

( * ) Notice: Subject to any disclaimer, the term of this patent is extended or adjusted under 35 U.S.C. 154(b) by 603 days.

This patent is subject to a terminal disclaimer.

(21) Appl. No.: 16/114,295

(22) Filed: Aug. 28, 2018

(65) Prior Publication Data

US 2018/0360014 A1 Dec. 20, 2018

Related U.S. Application Data

(63) Continuation of application No. 13/961,653, filed on Aug. 7, 2013, now Pat. No. 10,058,084, which is a
(Continued)

(51) Int. Cl.
*A01K 93/00* (2006.01)
*A01K 91/03* (2006.01)
(Continued)

(52) U.S. Cl.
CPC .............. *A01K 93/00* (2013.01); *A01K 91/03* (2013.01); *A01K 91/06* (2013.01); *A01K 93/02* (2013.01)

(58) Field of Classification Search
CPC .................................. A01K 93/00; A01K 91/03
(Continued)

(56) References Cited

U.S. PATENT DOCUMENTS 261,505 A * 7/1882 Wilson ................... A01K 93/00
43/43.1
332,573 A * 12/1885 Tufts ...................... A01K 93/00
43/44.91
(Continued)

FOREIGN PATENT DOCUMENTS

EP 459053 A1 * 12/1991 ............. A01K 93/00
EP 624314 A2 * 11/1994 ............. A01K 93/00
(Continued)

*Primary Examiner* — Darren W Ark
(74) *Attorney, Agent, or Firm* — William D. Hare, Esq.; McNeely, Hare & War, LLP

(57) ABSTRACT

The invention relates to a method for adjusting the buoyancy of a fishing bobber. The method includes providing a buoyant member and a stem guide configured to receive the buoyant member, mounting the buoyant member to the stem guide and cutting the buoyant member. The buoyant member is made of a material capable of being severed by a cutting device and having first length, a lower end, and an upper end. The stem guide receives the buoyant member and a fishing line with fishing tackle. The buoyant member is cut such that the buoyant member has a second length shorter than the first length. The buoyant member is cut to a second length such that the buoyancy of the buoyant member when cut to a second length is enough to oppose the tendency of the stem guide and fishing tackle to submerse the buoyant member such that a top surface of the cut buoyant member is adjacent to the surface of the water when the stem guide, buoyant member, fishing line and any fishing tackle are placed in the water.

22 Claims, 41 Drawing Sheets

Related U.S. Application Data continuation of application No. 13/760,020, filed on Feb. 5, 2013, now Pat. No. 8,756,855, which is a continuation-in-part of application No. 12/970,929, filed on Dec. 16, 2010, now Pat. No. 8,819,986, which is a continuation-in-part of application No. 12/774,710, filed on May 5, 2010, now abandoned, which is a continuation-in-part of application No. 12/336,696, filed on Dec. 17, 2008, now Pat. No. 7,797,877, which is a continuation-in-part of application No. 11/707,251, filed on Feb. 15, 2007, now abandoned.

(51) Int. Cl.
*A01K 91/06* (2006.01)
*A01K 93/02* (2006.01)

(58) Field of Classification Search
USPC ............ 43/44.87, 44.86, 44.9, 44.91, 44.94, 43/44.95, 44.92
See application file for complete search history.

(56) References Cited

U.S. PATENT DOCUMENTS

| | | | | |
|---|---|---|---|---|
| 755,683 A * | 3/1904 | Miller | A01K 93/00 | 43/43.11 |
| 862,853 A * | 8/1907 | Simmons | A01K 93/00 | 43/44.91 |
| 1,418,944 A * | 6/1922 | Lower | A01K 93/00 | 43/44.95 |
| 1,457,550 A * | 6/1923 | Runkel | A01K 83/00 | 43/44.86 |
| 2,004,414 A * | 6/1935 | Menefee | A01K 93/00 | 43/43.1 |
| 2,163,483 A * | 6/1939 | Carlisle | A01K 93/00 | 43/44.95 |
| 2,181,458 A * | 11/1939 | La Gue | A01K 93/00 | 43/44.87 |
| 2,209,638 A * | 7/1940 | Smith | D06F 53/04 | 248/353 |
| 2,221,168 A * | 11/1940 | Pflueger | A01K 93/00 | 43/43.1 |
| 2,239,813 A * | 4/1941 | Dubell | A01K 93/00 | 43/43.1 |
| 2,305,234 A * | 12/1942 | Bratz | F16G 11/10 | 24/581.1 |
| 2,316,074 A * | 4/1943 | Kimbrough | A01K 93/00 | 43/44.87 |
| 2,435,730 A * | 2/1948 | Worden | A01K 95/00 | 43/42.08 |
| 2,482,625 A * | 9/1949 | Kunkel | D06F 55/00 | 24/523 |
| 2,501,471 A * | 3/1950 | Larson | A01K 93/00 | 43/44.87 |
| 2,560,129 A * | 7/1951 | Rhotehamel | A01K 93/00 | 43/44.95 |
| 2,587,311 A * | 2/1952 | Golnick | A01K 93/00 | 43/44.93 |
| 2,720,720 A * | 10/1955 | Landrum | A01K 93/00 | 43/43.11 |
| 2,729,014 A * | 1/1956 | Johnson | A01K 95/00 | 43/42.49 |
| 2,755,589 A * | 7/1956 | Osborne | A01K 93/02 | 43/15 |
| 2,807,907 A * | 10/1957 | Brite | A01K 93/00 | 43/44.91 |
| 2,842,888 A * | 7/1958 | Landrum | A01K 93/00 | 43/44.95 |
| 2,867,936 A * | 1/1959 | Lambach | A01K 93/00 | 43/44.95 |
| 2,869,278 A * | 1/1959 | Cook | A01K 97/24 | 43/42.08 |
| 2,910,798 A * | 11/1959 | Bias | A01K 93/00 | 43/41.2 |
| 2,957,266 A * | 10/1960 | Pfister | A01K 93/00 | 43/44.88 |
| 3,023,535 A * | 3/1962 | Holka | A01K 91/04 | 43/43.1 |
| 3,023,538 A * | 3/1962 | Cameron | A01K 93/00 | 43/44.95 |
| 3,168,790 A * | 2/1965 | Creasey | A01K 93/00 | 43/43.11 |
| 3,184,880 A * | 5/1965 | Ratte | A01K 91/04 | 43/44.86 |
| 3,323,247 A * | 6/1967 | Murray | A01K 93/00 | 43/17 |
| 3,613,289 A * | 10/1971 | Wehren | A01K 93/00 | 43/43.11 |
| 3,624,949 A * | 12/1971 | Lowndes | A01K 93/00 | 43/43.15 |
| 3,667,149 A * | 6/1972 | Daigle | A01K 93/00 | 43/43.15 |
| 3,800,459 A * | 4/1974 | Fleischaker | A01K 95/00 | 43/44.9 |
| 3,866,346 A * | 2/1975 | Schneider | A01K 93/00 | 43/44.87 |
| 3,918,193 A * | 11/1975 | Schneider | A01K 93/00 | 43/43.1 |
| 4,177,598 A * | 12/1979 | Jolley | A01K 85/00 | 24/665 |
| 4,361,977 A * | 12/1982 | Lawler | A01K 91/04 | 24/131 C |
| 4,449,318 A * | 5/1984 | Lane | A01K 93/00 | 43/44.9 |
| 4,506,471 A * | 3/1985 | Riead | A01K 93/00 | 43/44.87 |
| 4,516,349 A * | 5/1985 | Klocksiem | A01K 93/02 | 43/17.5 |
| 4,574,515 A * | 3/1986 | Garner | A01K 93/00 | 43/43.11 |
| 4,649,660 A * | 3/1987 | Kurka | A01K 93/02 | 43/17.5 |
| 4,693,030 A * | 9/1987 | Wohead | A01K 95/00 | 43/42.22 |
| 4,757,635 A * | 7/1988 | Cole | A01K 93/00 | 43/17.5 |
| 4,827,655 A * | 5/1989 | Reed | A01K 93/02 | 43/17.5 |
| 4,986,023 A * | 1/1991 | Bucholz | A01K 93/00 | 24/115 R |
| 5,159,774 A * | 11/1992 | Bennis | A01K 93/02 | 24/339 |
| 5,190,366 A * | 3/1993 | World | A01K 85/01 | 362/234 |
| 5,199,205 A * | 4/1993 | Klammer | A01K 93/02 | 43/17 |
| 5,235,777 A * | 8/1993 | Burns | A01K 93/00 | 43/43.14 |
| 5,241,774 A * | 9/1993 | Rayburn | A01K 93/00 | 43/44.9 |
| 5,243,780 A * | 9/1993 | Christensen | A01K 93/00 | 43/17.5 |
| 5,329,722 A * | 7/1994 | Wilson | A01K 93/00 | 43/44.87 |
| 5,359,804 A * | 11/1994 | Burns | A01K 93/00 | 43/43.14 |
| 5,373,659 A * | 12/1994 | Neese, Jr. | A01K 93/00 | 43/44.94 |
| 5,404,668 A * | 4/1995 | Christensen | A01K 93/00 | 43/44.87 |
| 5,490,348 A * | 2/1996 | Serba | A01K 93/00 | 43/44.88 |
| 5,608,985 A * | 3/1997 | Kainec | A01K 91/04 | 43/43.1 |
| 5,737,868 A * | 4/1998 | Rikard | A01K 93/00 | 43/43.14 |
| 5,987,807 A * | 11/1999 | Reed | A01K 93/00 | 43/44.87 |

(56) References Cited

U.S. PATENT DOCUMENTS

| | | | | |
|---|---|---|---|---|
| 6,079,147 A * | 6/2000 | Mosher | A01K 93/00 43/43.14 |
| 6,158,164 A * | 12/2000 | Mack | A01K 93/00 43/44.95 |
| 6,173,524 B1 * | 1/2001 | Kinchen, Sr. | A01K 91/065 43/42.31 |
| 6,425,200 B1 * | 7/2002 | Bennis | A01K 93/00 43/44.87 |
| 6,484,435 B1 * | 11/2002 | Mosher | A01K 91/06 43/43.1 |
| 6,493,981 B2 * | 12/2002 | Izzard | A01K 91/10 43/15 |
| 6,655,073 B2 * | 12/2003 | Mosher | A01K 91/06 43/43.1 |
| 6,880,288 B1 * | 4/2005 | Hanes | A01K 93/00 43/42.39 |
| 7,082,711 B2 * | 8/2006 | Adams | A01K 93/00 43/17.5 |
| 7,100,323 B1 * | 9/2006 | Bogess | A01K 93/02 24/339 |
| 7,434,349 B2 * | 10/2008 | Bennis | A01K 93/00 43/43.1 |
| 7,437,851 B2 * | 10/2008 | Bennis | A01K 93/00 43/44.91 |
| 7,797,877 B1 * | 9/2010 | Bennis | A01K 93/00 43/44.87 |
| 7,823,258 B2 * | 11/2010 | Tegg | A61M 25/01 24/136 R |
| 8,756,855 B2 * | 6/2014 | Bennis | A01K 91/06 43/44.9 |
| 8,819,986 B2 * | 9/2014 | Bennis | A01K 91/06 43/17.5 |
| 10,058,084 B2 * | 8/2018 | Bennis | A01K 91/06 |
| 10,813,348 B2 * | 10/2020 | Bennis | A01K 93/02 |
| 2006/0230668 A1 * | 10/2006 | Adams | A01K 93/00 43/17.5 |
| 2006/0254121 A1 * | 11/2006 | Huynh | A01K 93/02 43/44.95 |
| 2006/0288633 A1 * | 12/2006 | Fiferlick | A01K 97/01 43/44.92 |
| 2007/0227058 A1 * | 10/2007 | Adams | A01K 93/00 43/17.5 |
| 2019/0289838 A1 * | 9/2019 | Bennis | A01K 93/00 |
| 2020/0337288 A1 * | 10/2020 | Disney | A01K 93/00 |

FOREIGN PATENT DOCUMENTS

| | | | | |
|---|---|---|---|---|
| FR | 2087455 A5 * | 12/1971 | | A01K 93/00 |
| FR | 2688656 A1 * | 9/1993 | | A01K 93/00 |
| GB | 2155292 A * | 9/1985 | | A01K 95/00 |
| GB | 2203622 A * | 10/1988 | | A01K 93/00 |
| GB | 2232864 A * | 1/1991 | | A01K 93/00 |
| GB | 2240698 A * | 8/1991 | | A01K 93/00 |
| GB | 2263851 A * | 8/1993 | | A01K 91/03 |
| GB | 2305344 A * | 4/1997 | | A01K 93/00 |
| GB | 2330756 A * | 5/1999 | | A01K 87/002 |
| GB | 2345425 A * | 7/2000 | | A01K 91/03 |
| GB | 2400006 A * | 10/2004 | | A01K 93/00 |
| GB | 2411560 A * | 9/2005 | | A01K 91/047 |
| JP | 01235531 A * | 9/1989 | | |
| JP | 10028501 A * | 2/1998 | | |
| JP | 11056186 A * | 3/1999 | | |
| JP | 11196734 A * | 7/1999 | | |
| JP | 2000125731 A * | 5/2000 | | |
| JP | 2002027881 A * | 1/2002 | | |
| JP | 2002325532 A * | 11/2002 | | |
| JP | 2002325533 A * | 11/2002 | | |
| JP | 2003079296 A * | 3/2003 | | |
| JP | 2003092961 A * | 4/2003 | | |
| JP | 2004049076 A * | 2/2004 | | |
| JP | 2004201670 A * | 7/2004 | | |
| JP | 2005080614 A * | 3/2005 | | |
| JP | 2005124425 A * | 5/2005 | | |
| JP | 2005160460 A * | 6/2005 | | |
| JP | 3156515 U * | 1/2010 | | |
| JP | 2012090622 A * | 5/2012 | | |
| JP | 2012217406 A * | 11/2012 | | |
| WO | WO-9902031 A1 * | 1/1999 | | A01K 93/00 |

* cited by examiner

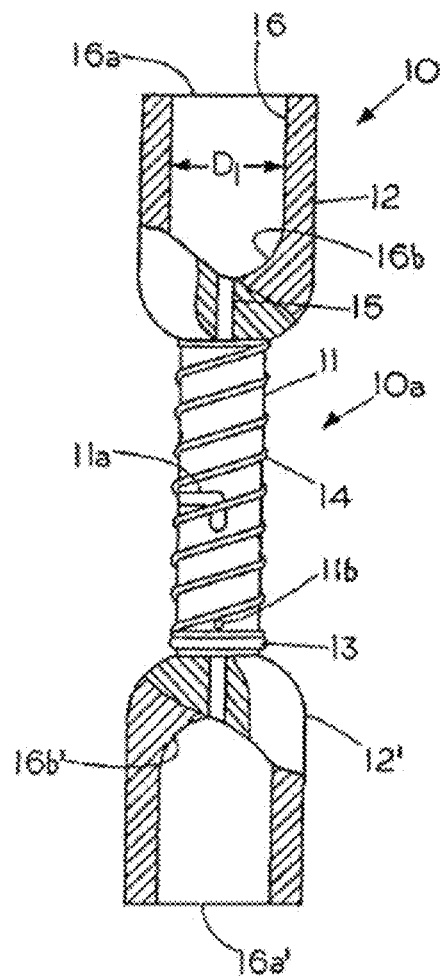

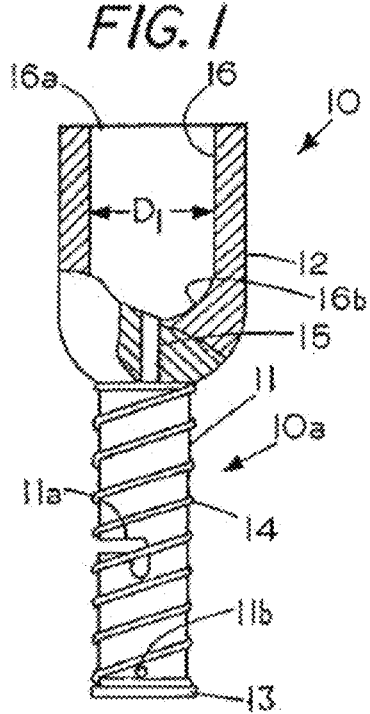
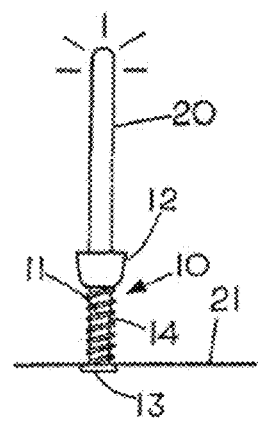
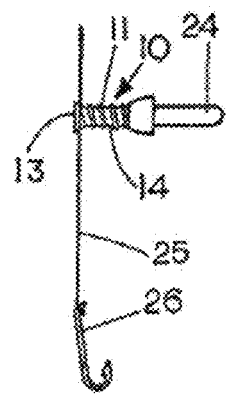
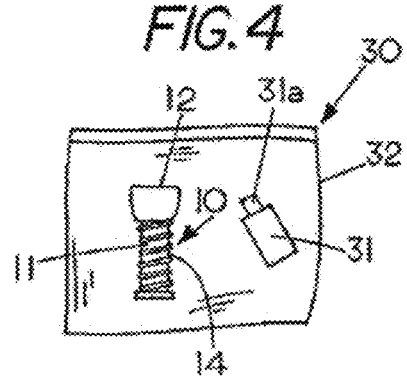
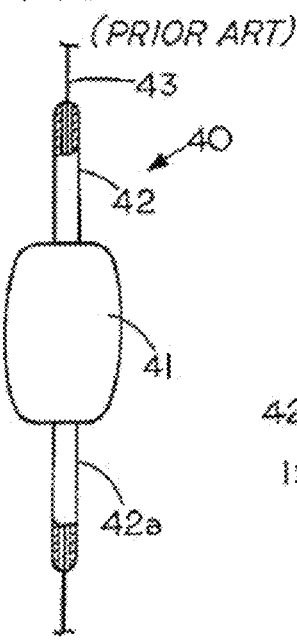
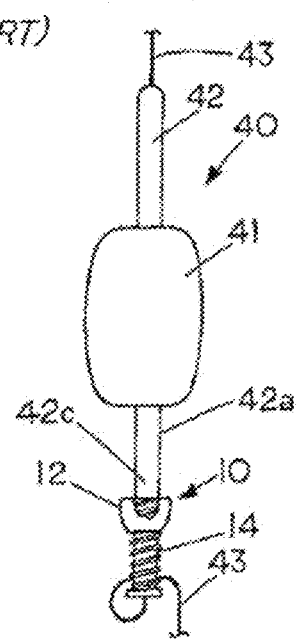
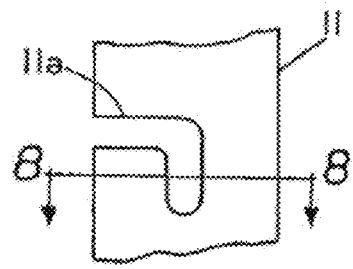

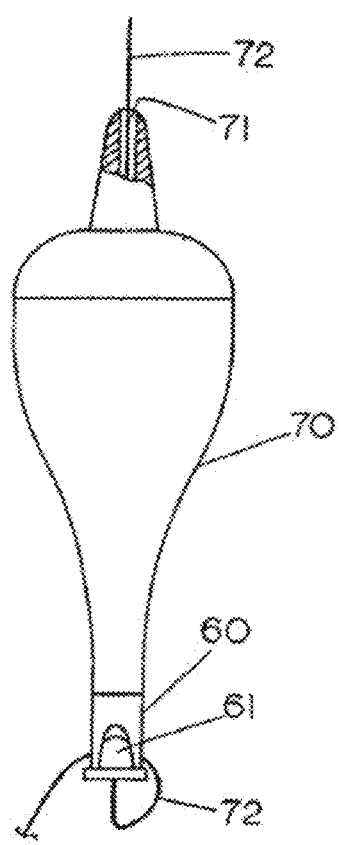
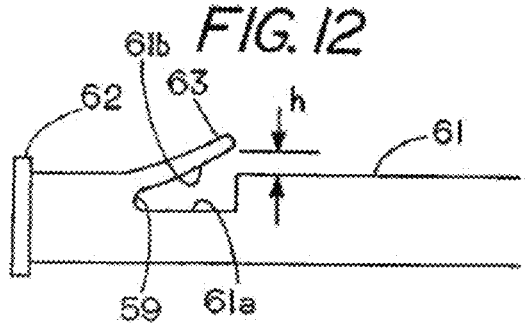
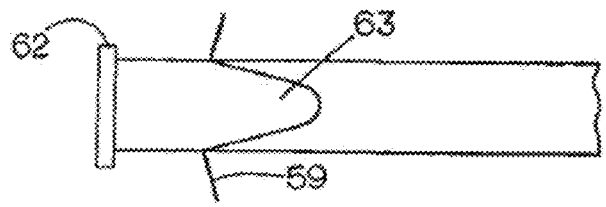
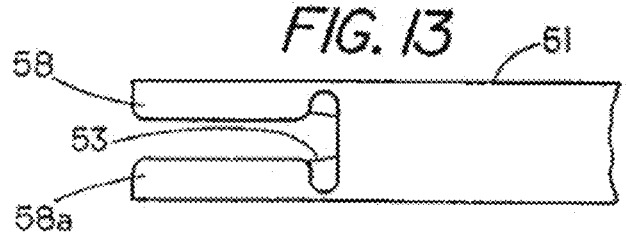
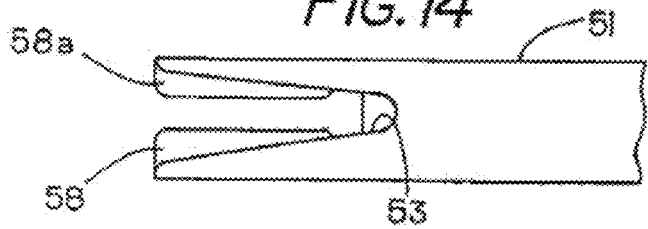
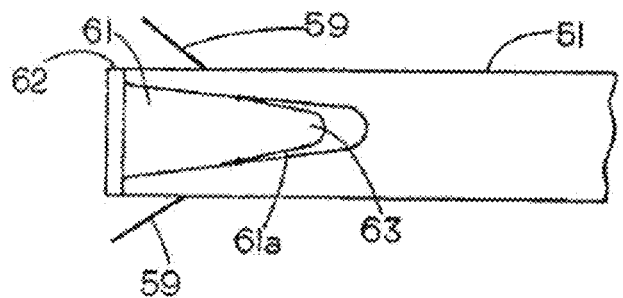

SECTION A-A

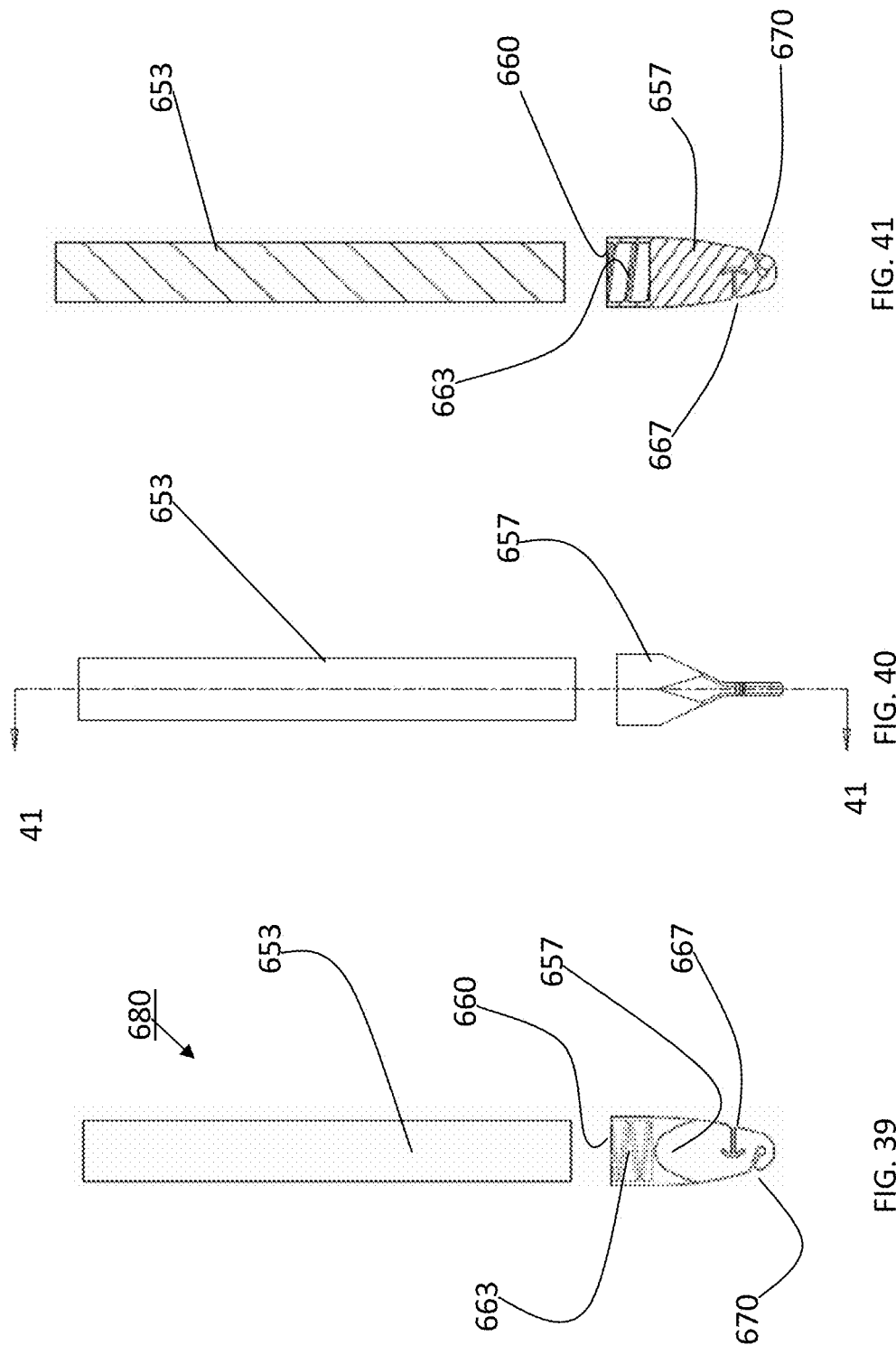

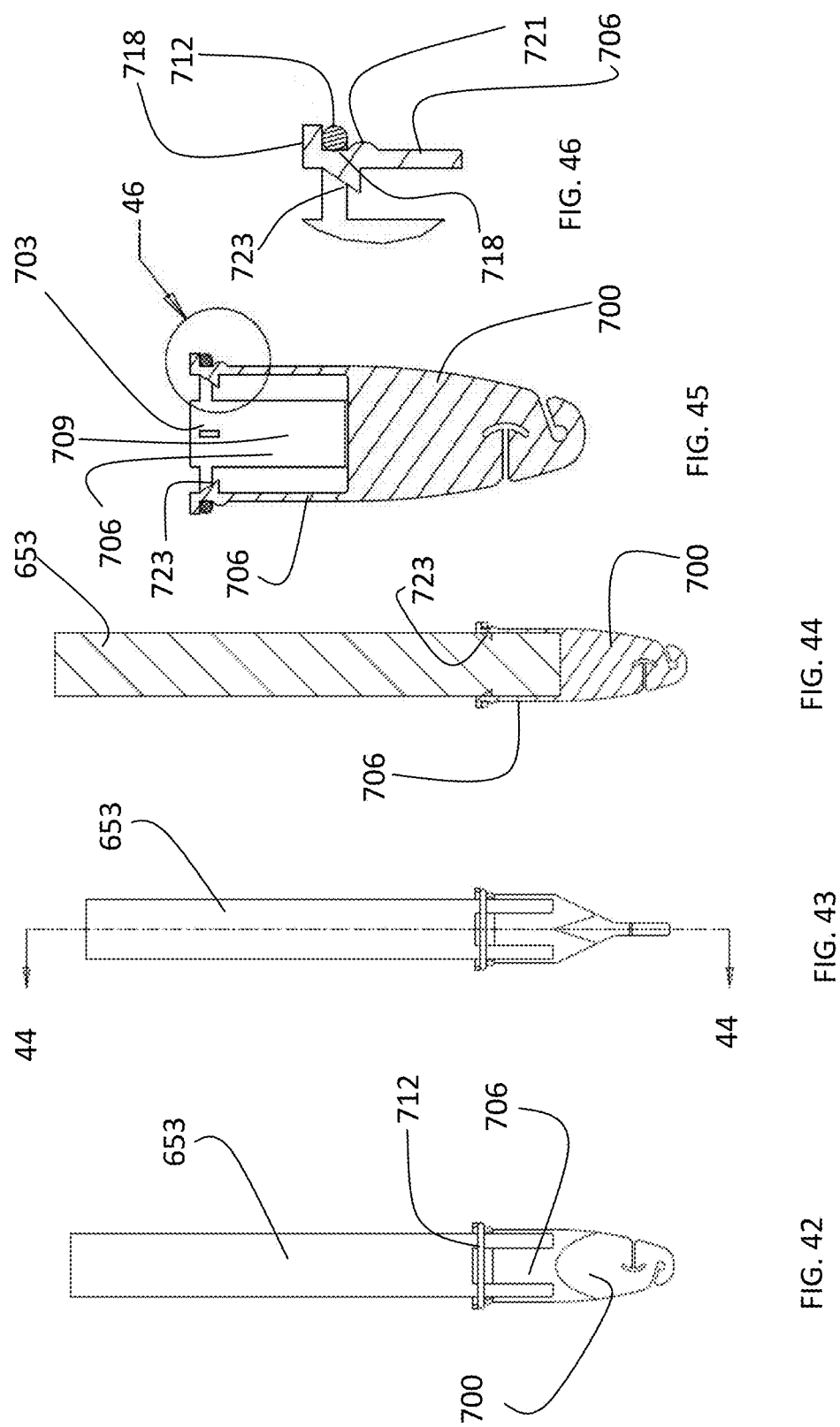

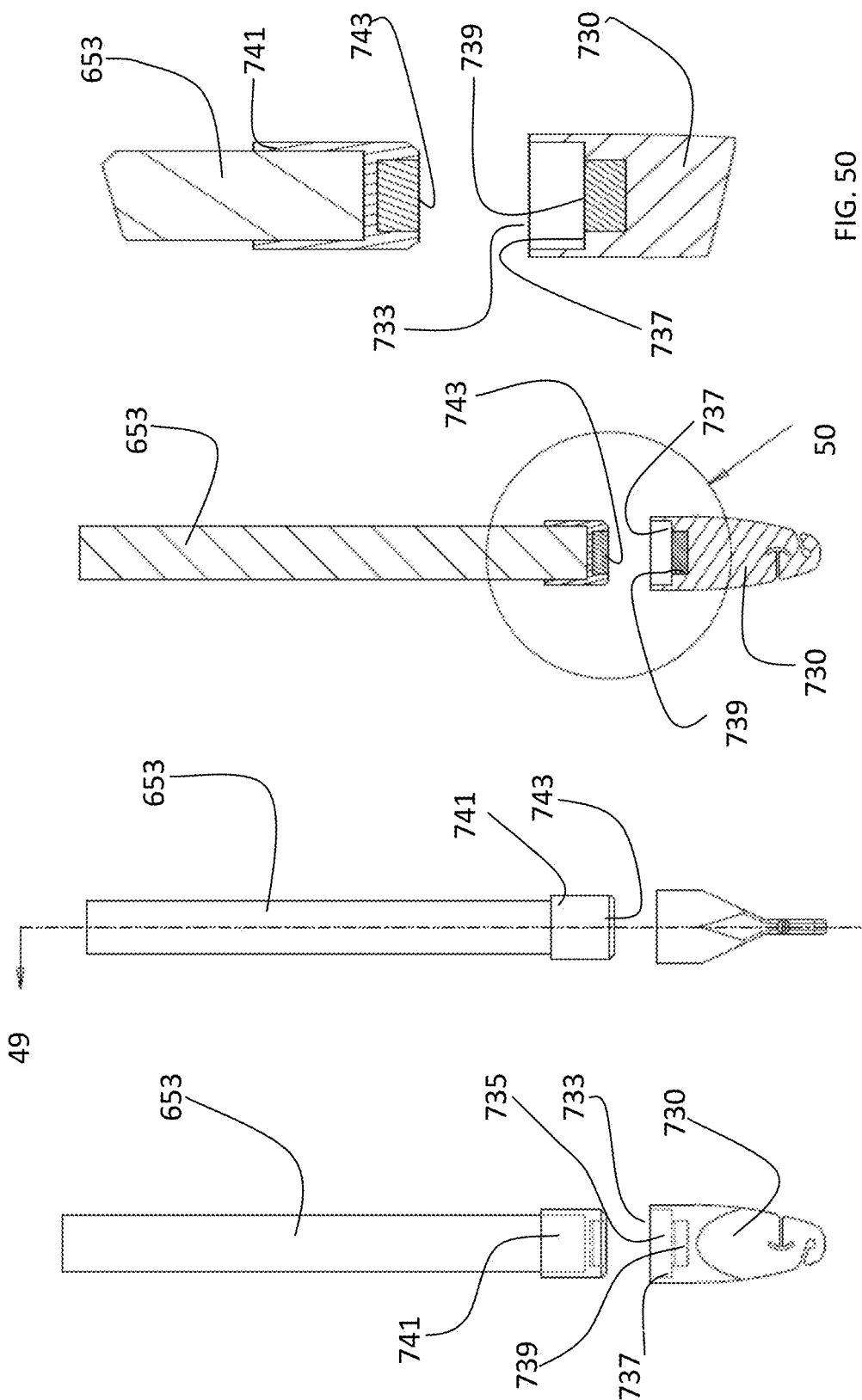

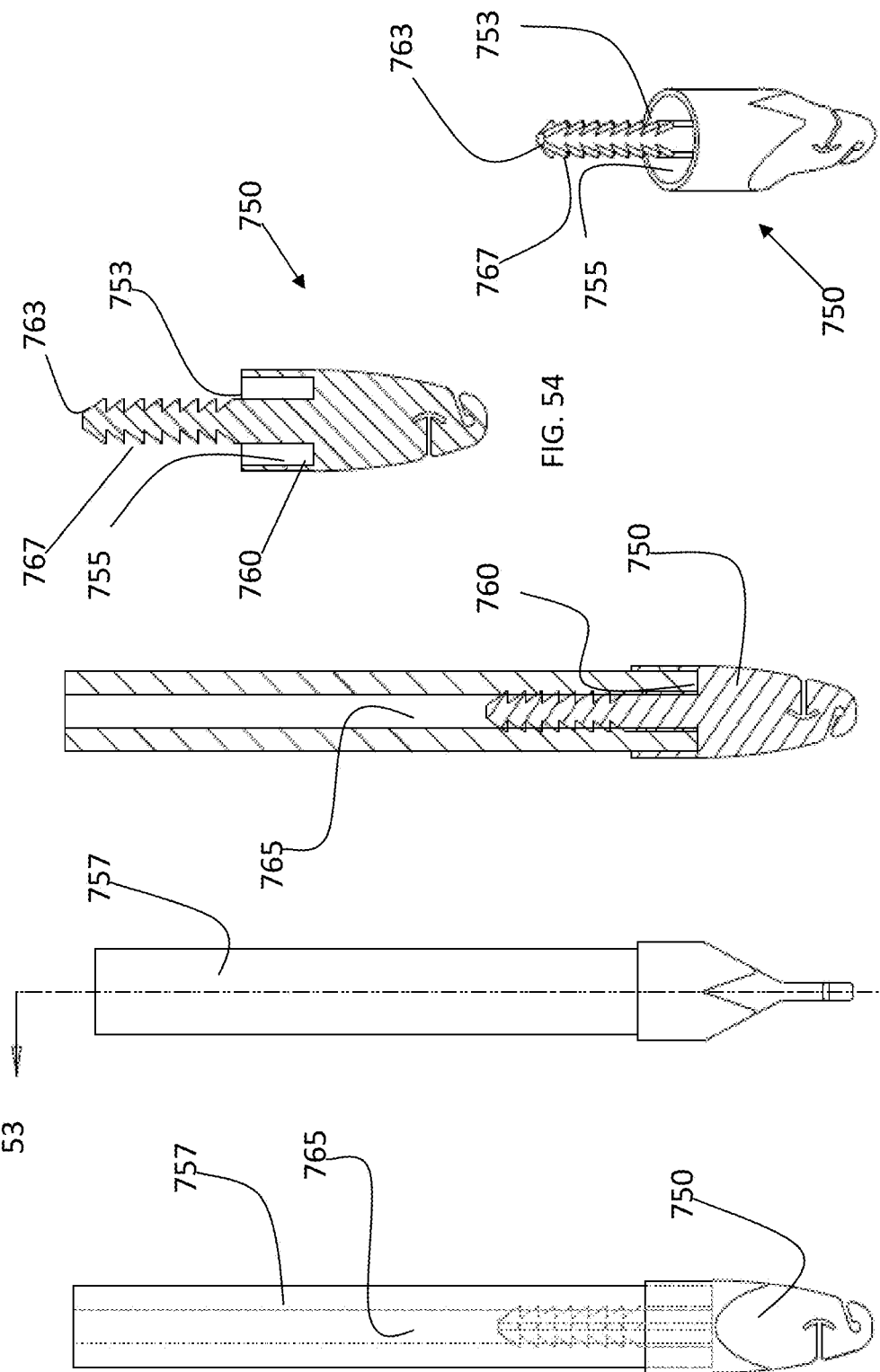

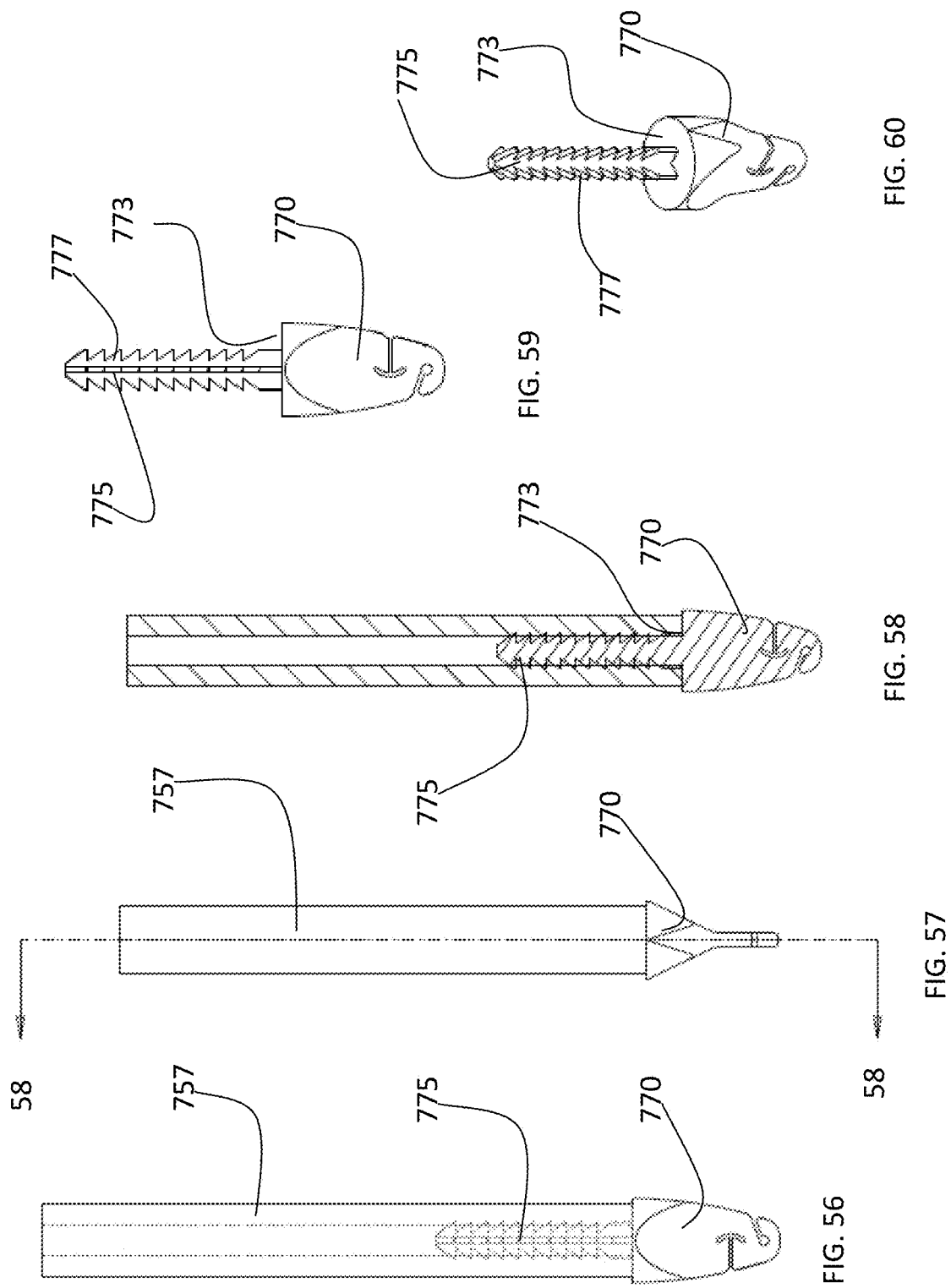

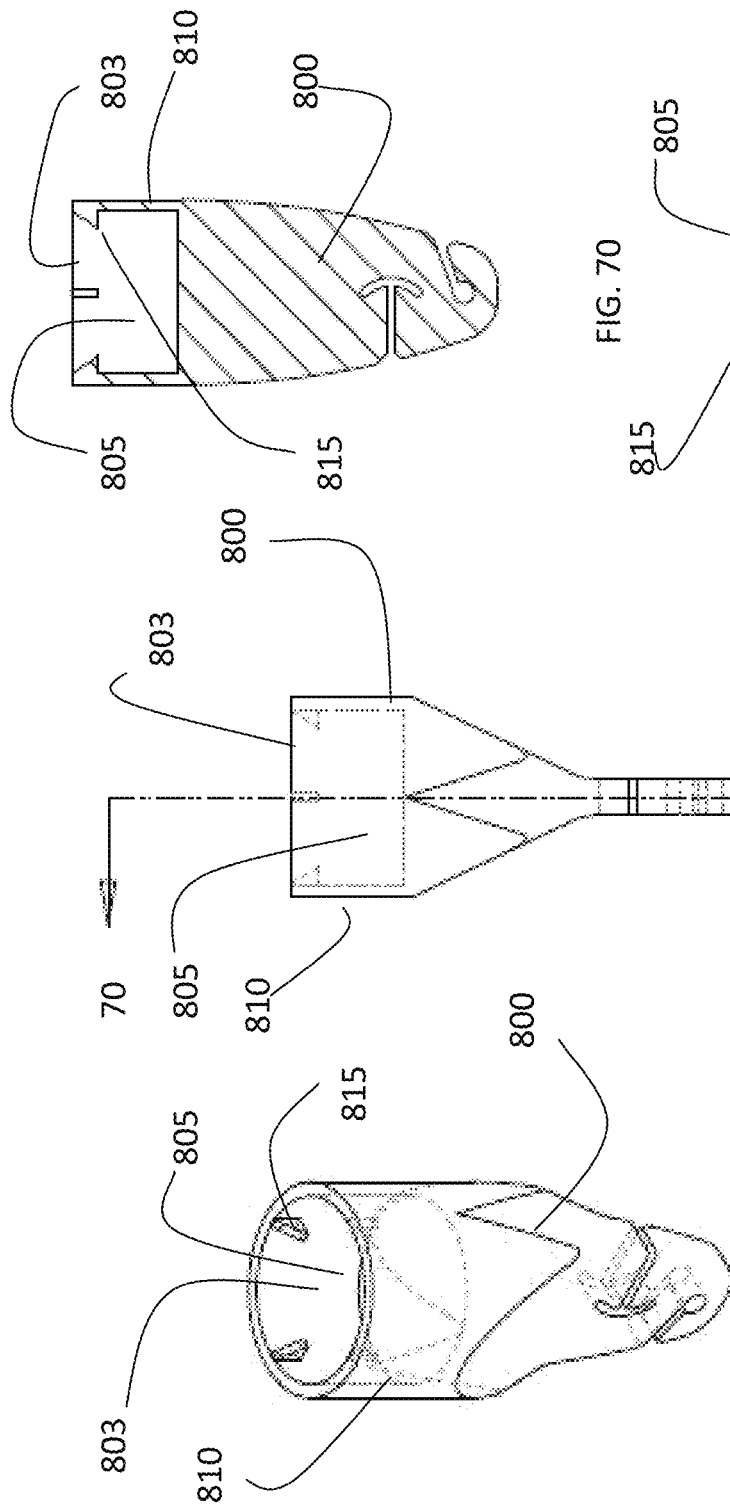

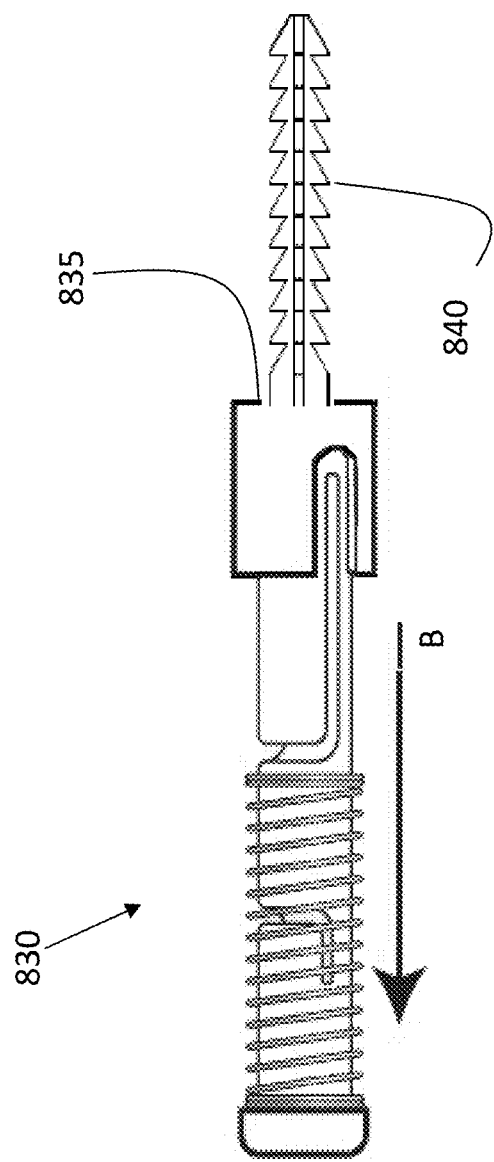

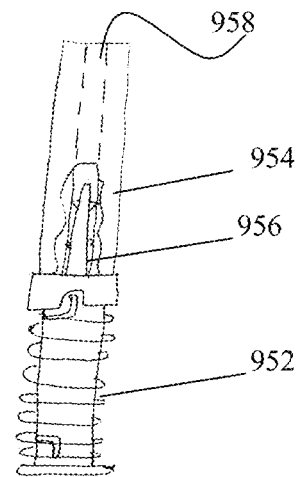
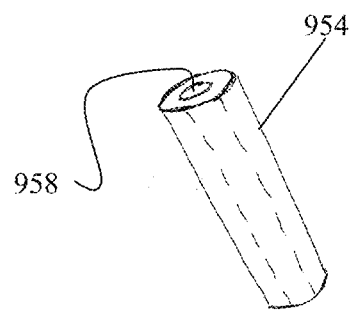
FIG. 77a    FIG. 77b
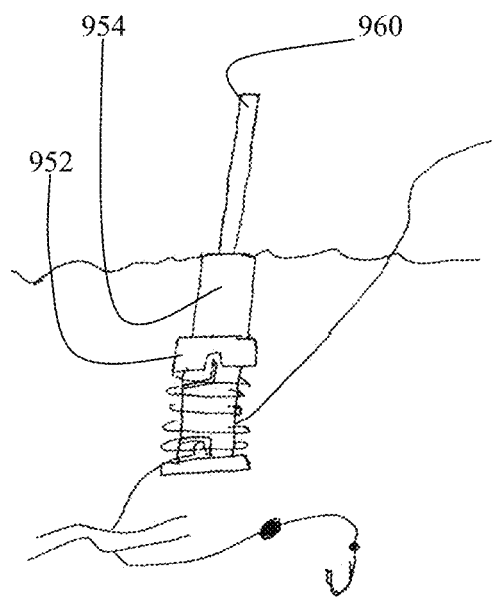
FIG. 77c

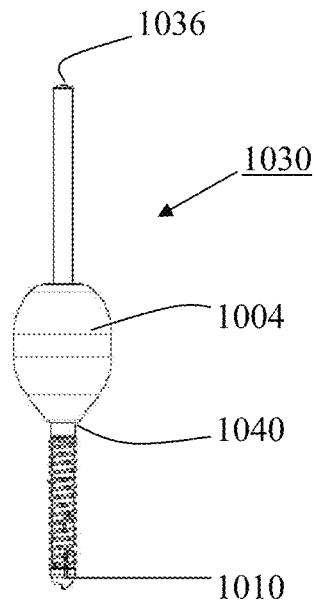
FIG. 80a
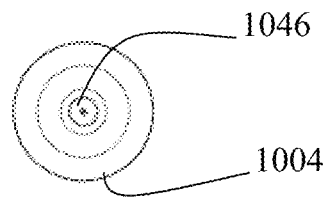
FIG. 80d
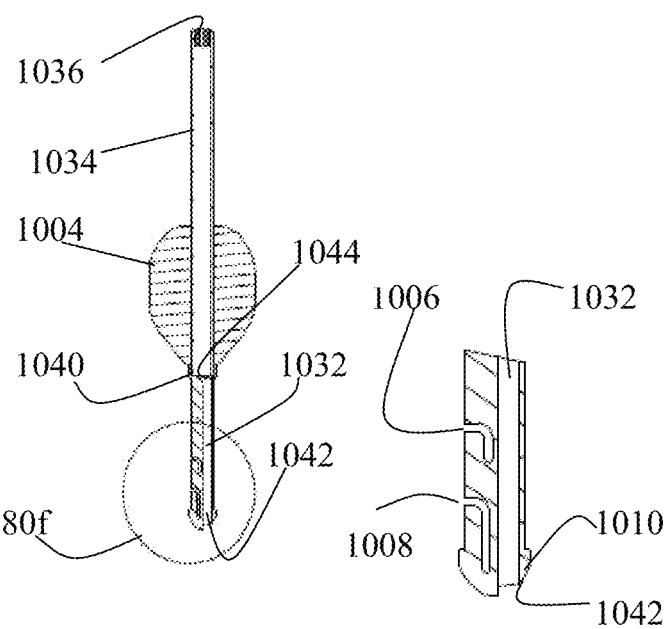
FIG. 80c
FIG. 80f
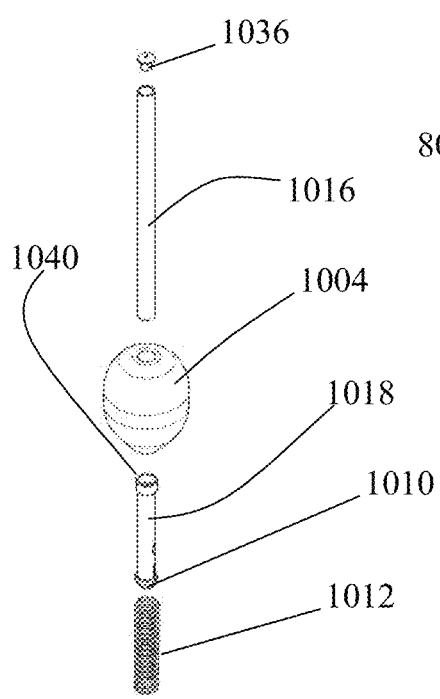
FIG. 80b
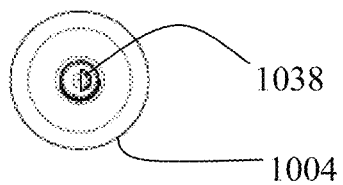
FIG. 80e

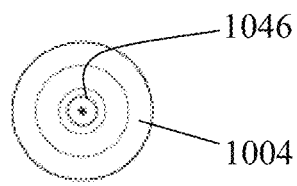
FIG. 81c
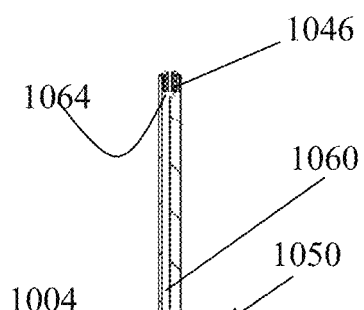
FIG. 81d
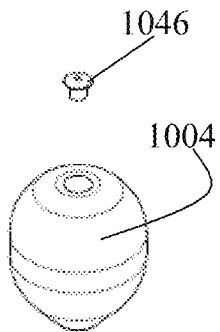
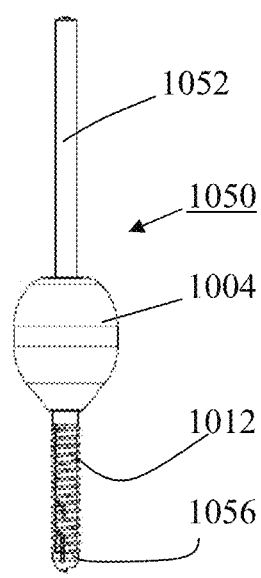
FIG. 81a
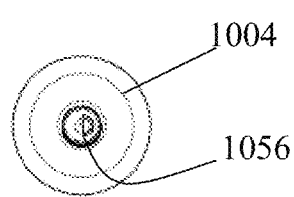
FIG. 81b
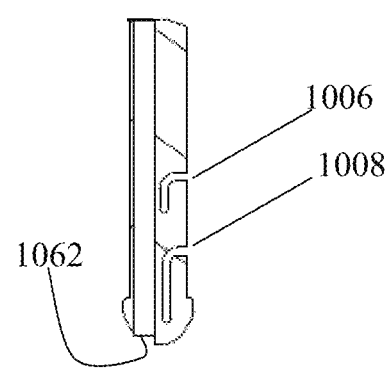
FIG. 81e
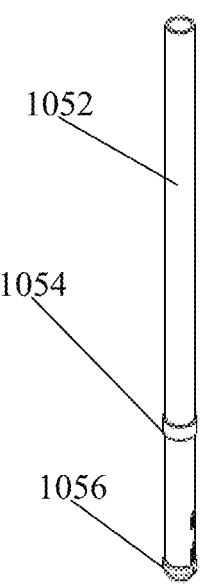
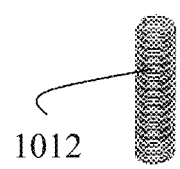
FIG. 81f

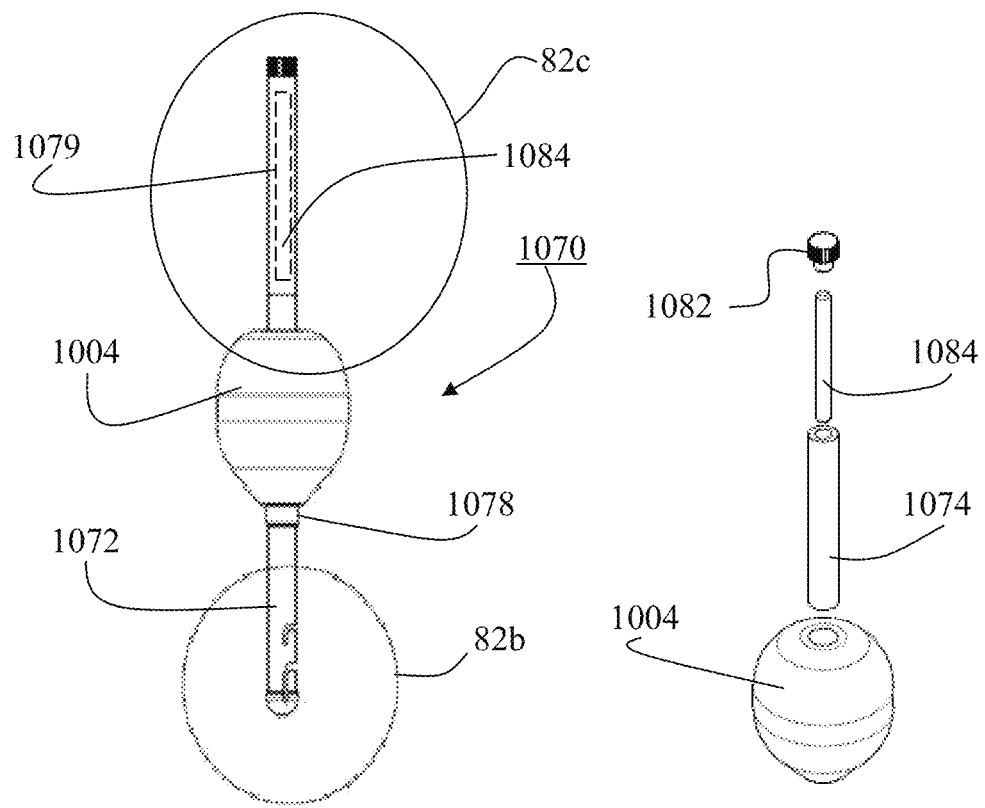
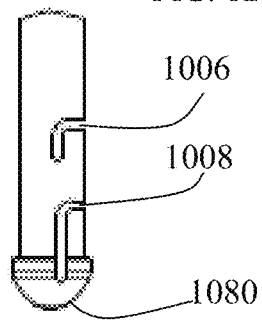
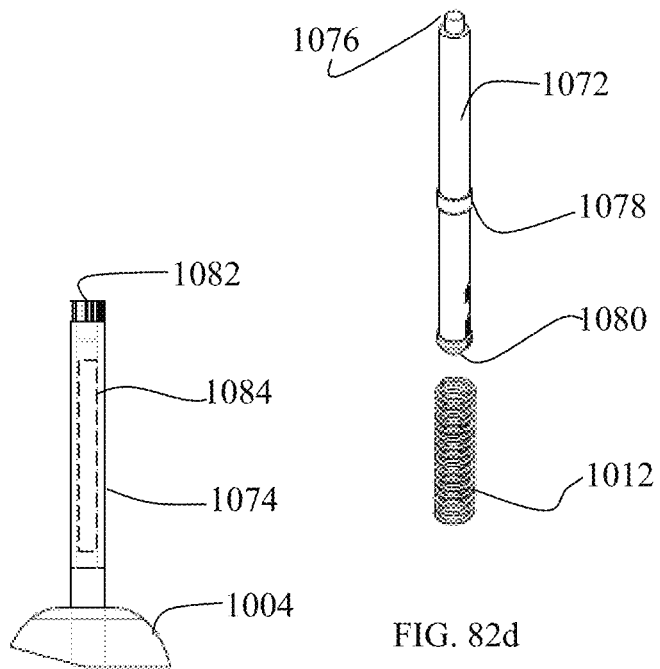
FIG. 82a
FIG. 82b
FIG. 82c
FIG. 82d

STEM GUIDES AND REPLACEABLE CARTRIDGES

FIELD OF THE INVENTION

This invention relates generally to stem guides that are configured to accept removable and replaceable cartridges, such as bobbers, floats, light sticks and scent sticks for fishing.

CROSS REFERENCE TO RELATED APPLICATIONS

This application claims priority under 35 USC § 120 as to U.S. patent application Ser. No. 13/760,020 filed on Feb. 5, 2013, which claims priority to U.S. patent application Ser. No. 12/970,929 filed on Dec. 16, 2010, which claims priority to U.S. patent application Ser. No. 11/707,251 filed on Feb. 15, 2007; U.S. patent application Ser. No. 12/336,696, filed on Dec. 17, 2008; and U.S. patent application Ser. No. 12/365,596, filed on Feb. 3, 2009, and under 35 USC § 119 from EP09179460.2, filed on Dec. 16, 2009, the contents of which are incorporated herein in their entirety by reference. This application also claims priority from U.S. patent application Ser. No. 12/774,710, filed on May 5, 2010 and claiming priority from U.S. Provisional Patent Application No. 61/175,653, filed on May 5, 2009, the contents of which are incorporated herein in their entirety by reference.

BACKGROUND OF THE INVENTION

The concept of fishing tackle such as fishing bobbers that can be used either as a slip bobber or a fixed line bobber is known in the art. Typically, in the slip bobber mode the fishing line extends freely through a tube in the fishing float. A string stop in the form of a knot is tied onto the fishing line. Usually a bead, which can slide along the fishing line, is placed on the fishing line with the knot forming a stop for the bead and the bead having a larger outside diameter than the tube to form a stop for the fishing bobber. The knot being small can pass through the eyes of the fishing rod and the fishing reel to allow the line with the knot to be wound up on the fishing reel. As one casts the line with the slip bobber and the bead the hook with the bait sinks allowing the fishing line to slide through the slip bobber until the bead engages the knot, which prevents further sliding of the bead along the fishing line. In addition, since the bead cannot pass through the tube in the fishing float it also stops the fishing float from sliding past the knot thus limiting the depth of the hook.

The slip bobbers, which are well known in the art, are also often used to fish in a fixed line mode, that is, the bobber is temporarily attached to the fishing line with a spring clamp that slides over a fishing line that extends through a saw cut on the hollow stem in the fishing float. Unfortunately, the fishing float stems with saw cuts in the hollow stem have sharp edges which can weaken and cut the soft flexible fishing lines. In addition to harshness to the fishing line by the saw cut in the stem of a fishing float the placement of a saw cut in the stem of the fishing bobber weakens the stem, which can cause the stem to break during use. One such fishing float with a spring and saw cut hollow stem is shown in U.S. Pat. No. 7,082,711. Another such fishing float with a saw cut stem is sold by Carlson Tackle Company Inc. of Cortland Ohio under the trademark Wing-it™.

An improved line stop is found in a fishing bobber sold under the name Lucky Jack™ by ROD-N-BOBB'S of Eau Claire Wis. The improved line stop includes a compression spring located around a hollow stem, which is an integral portion of the fixed/slip bobber. The line guide shoulders in the stem of the bobber include rounded or radiused corners to protect the fishing line from nicks and cuts that would weaken the fishing line thus causing the line to break unexpectedly. While the improved line stop is useful as part of a slip bobber it has limited application to slip bobbers.

Although the improved line stop can protect the fishing line from abrasion the spring forms a moving part that can become stuck. In order to avoid a spring that can stick it would be desired to have a line stop for use on fishing tackle that has no moving parts and can be used on slip bobbers as well as other types of fishing tackle.

Oftentimes a fisher person may want to create his or her own tackle, such as a line light or a scent stick that can be quickly attached or detached from a fishing line. Unfortunately, devices for attaching a fishing line to a piece of tackle include extraneous items that render it impractical to use the device, consequently, people who use line lights or scent sticks attach the devices to a fishing line using a rubber band or the like.

It is known in the art to adjust a bobber during fishing if the bobber configuration is not suitable for the fishing conditions. For example, U.S. Pat. No. 6,079,147 describes a foam rubber buoyant member, or float, that is mounted in a hook member and can be adjusted by the angler. The float of the '147 patent is adjusted not by replacing the float in the hook member with a different float but by instead using a knife to cut the float to have a different length. This is different from removing and replacing the float.

Similarly, U.S. Pat. No. 6,655,073 describes an adjustable buoyant member, or float, that is made of a plastic foam attached to a hook member. The plastic foam can be cut to adjust the length of the float and thereby make an adjustable bobber system with adjustable buoyancy. The bobber system also includes a weight that encircles the float and can be adjusted along the length of the float. This weight appears to be similar to the known plastic bands that are movable along the length of the float to allow the angler to better visualize the position and movement of the float in the water. Again, like the '147 patent, the '073 patent appears to adjust the buoyancy of the float by cutting the float to a shorter length rather than removing and replacing the float in the hook member. For example, the '073 patent describes the float as being secured in a cavity by use of glue, adhesive or other mechanical securing means. This does not disclose or teach that the float can be removed and replaced or removed and used again. Instead, the examples given for securing in the cavity demonstrate that the float and hook member would likely be damaged in its removal and unsuitable for use again.

Further, with respect to the mounting of the buoyant member to the stem guide, in general the stem guides are rigid while the buoyant member is flexible. Therefore a mounting of the buoyant member to the stem guide involves a temporary deformation of the buoyant member rather than a permanent or temporary deformation of the stem guide. As a result, the buoyant member is retained to the stem guide on the basis of the compressive tendency of the buoyant member against the stem guide rather than any force imparted by the stem guide against the buoyant member. As an analogy, the floats herein may be stretch over the prong to mount to the prong and therefore be in a slightly expanded state around the prong and exerting a compressive force against the prong. Similarly, when inserted into a cavity in the stem guide, the buoyant member is compressed and then one released within the cavity, the buoyant member exerts an expansive force against the cavity to retain the buoyant member in the cavity.

The stem guides disclosed herein permit the angler to attach and remove the stem guide from the line without cutting the line. The stem guide may have a float, scent stick or light stick temporarily attached to the stem guide such that the float, scent stick or light stick may be easily attached and removed from the fishing line without cutting the line or damaging the stem guide and potentially not damaging the float, scent stick or light stick.

SUMMARY OF THE INVENTION

In one general aspect, there is provided a method for adjusting the buoyancy of a fishing bobber. The method includes providing a buoyant member, providing a stem guide, mounting the buoyant member to the stem guide and cutting the buoyant member. The buoyant member is made of a material capable of being severed by a cutting device. The buoyant member has a first length, a lower end, an upper end an internal channel passing between the two ends. The stem guide is configured to receive the buoyant member and a fishing line with fishing tackle.

The stem guide includes a cartridge receiving end and a fishing line engaging end. The cartridge receiving end has a cartridge attachment means configured for receiving and retaining the fishing cartridge to the stem guide in a manner that permits the fishing cartridge to be removed from the stem guide without causing an amount of damage to the stem guide which prevents the stem guide from being used again. The fishing line engaging end is at an end of the stem guide that is opposite the cartridge receiving end and is configured for receiving a fishing line through an opening in the receiving end. The opening is configured to limit the ability of the line to become separated from the stem guide while allowing the fishing line to pass through the stem guide.

The buoyant member is cut such that the buoyant member has a second length shorter than the first length, whereby the buoyant member is cut to a second length such that the buoyancy of the buoyant member when cut to a second length is enough to oppose the tendency of the stem guide and fishing tackle to submerse the buoyant member such that a top surface of the cut buoyant member is adjacent to the surface of the water when the stem guide, buoyant member, fishing line and any fishing tackle are placed in the water.

Embodiments of the method may include one or more of the following features. For example, the top surface of the cut buoyant member may be above the surface of the water, below the surface of the water, or generally flush with the surface of the water.

The cartridge attachment means may be a prong and mounting the buoyant member to the cartridge attachment means includes inserting the prong into the channel in the buoyant member.

The method may further include mounting a visualization aid to the buoyant member. Mounting a visualization aid to the buoyant member may include inserting the visualization aid into the hollow channel of the buoyant member. The visualization aid may be one or more of a viz stick and a light stick.

The method may further include applying an adhesive to the buoyant member or the stem guide to retain the buoyant member to the stem guide. The method may further include applying an adhesive to either the buoyant member or the visualization aid to retain the visualization aid to the buoyant member.

The buoyant member may be made of polyethylene, such as extruded polyethylene.

In another general aspect there is provided a method for adjusting the buoyancy of a fishing bobber. The method includes providing a buoyant member, providing a stem guide, mounting the buoyant member to the stem guide and cutting the buoyant member. The buoyant member is made of a material capable of being severed by a cutting device. The buoyant member has a first length, a lower end, and an upper end. The stem guide is configured to receive the buoyant member and a fishing line with fishing tackle.

The stem guide includes a cartridge receiving end and a fishing line engaging end. The cartridge receiving end has a cartridge attachment means configured for receiving and retaining the fishing cartridge to the stem guide in a manner that permits the fishing cartridge to be removed from the stem guide without causing an amount of damage to the stem guide which prevents the stem guide from being used again. The fishing line engaging end is at an end of the stem guide that is opposite the cartridge receiving end and is configured for receiving a fishing line through an opening in the receiving end. The opening is configured to limit the ability of the line to become separated from the stem guide while allowing the fishing line to pass through the stem guide.

The buoyant member is cut such that the buoyant member has a second length shorter than the first length, whereby the buoyant member is cut to a second length such that the buoyancy of the buoyant member when cut to a second length is enough to oppose the tendency of the stem guide and fishing tackle to submerse the buoyant member such that a top surface of the cut buoyant member is adjacent to the surface of the water when the stem guide, buoyant member, fishing line and any fishing tackle are placed in the water.

Embodiments of the method may include one or more of the following features. For example, the top surface of the cut buoyant member may be above the surface of the water, below the surface of the water, or generally flush with the surface of the water.

The cartridge attachment means may be a prong and mounting the buoyant member to the cartridge attachment means includes inserting the prong into the buoyant member.

The method may further include mounting a visualization aid to the buoyant member. Mounting a visualization aid to the buoyant member may include inserting the visualization aid into the buoyant member. The visualization aid may be one or more of a viz stick and a light stick. The buoyant member may be polyethylene, such as extruded polyethylene.

In another general aspect, a fishing bobber system includes a stem guide and one or more replaceable cartridges mountable in the stem guide. The stem guide includes an open end exposing an open cavity at one end and at an opposite end a first slot within the inside of the stem guide and passing between opposite sides of the stem guide and connected to an outer surface of the stem guide by a second slot passing from the first slot to the outer surface of the stem guide and configured to receive a fishing line. The one or more replaceable cartridges are made of plastic foam and configured to be inserted into and removed from the open cavity in the stem guide without damaging to the stem guide.

In another general aspect, a fishing bobber system includes a stem guide and one or more replaceable buoyant members mountable in the stem guide. The stem guide has a first end and a second end. The first end has a surface and a prong extending outwardly from the surface and at the second end a first slot passing through the stem guide between opposite sides of the stem guide and connected to an outer surface of the stem guide by a second slot passing from the first slot to the outer surface of the stem guide. The first slot and second slot are configured to receive a fishing line. The one or more replaceable buoyant members have a first end, a second end and a longitudinal channel passing between openings at the first end and the second end, are made of a plastic foam and configured to be inserted onto the prong of the stem guide and removed from the prong without damaging the stem guide.

In another general aspect, a method of fishing includes providing a fishing float and mounting the fishing float to a stem guide. The fishing float has a first end, a second end and a longitudinal channel passing between openings at the first end and the second end. The fishing float is made of an extruded polyethylene foam, the fishing float being provided in a kit with multiple fishing floats.

In another general aspect, a fishing tackle stem guide is configured to receive a replaceable fishing cartridge and a fishing line. The stem includes a cartridge receiving end and a fishing line engaging end. The a cartridge receiving end has a cartridge attachment means configured for receiving and retaining the fishing cartridge to the stem guide in a manner that permits the fishing cartridge to be removed from the stem guide without causing an amount of damage to the stem guide which prevents the stem guide from being used again. The fishing line engaging end is at an end of the stem guide that is opposite the cartridge receiving end and is configured for receiving a fishing line through an opening in the receiving end, the opening being configured to limit the ability of the line to become separated from the stem guide while allowing the fishing line to pass through the stem guide.

Embodiments of the stem guide may include one or more of the following features. For example, the cartridge attachment means may include a base and at least one prong extending from the base. The prong may be a surface configured to restrain removal of the cartridge from the prong. The surface may include protrusions extending outwardly from the prong.

The stem guide may further include a wall encircling at least a portion of the base to define a channel configured to receive the cartridge when the cartridge is mounted to the prong.

The stem guide may include a textured surface at the cartridge receiving end for gripping the stem guide to attach to or remove the cartridge from the stem guide.

The cartridge attachment means may include a channel defined by a wall having an inner surface with protrusions extending from the inner surface into the channel. In this manner, inserting a cartridge into the channel results in an interference fit between the cartridge and the protrusions.

The protrusions may include a threaded surface configured to receive a cartridge having a threaded end. The threaded end of the cartridge may be a tube positioned around an end of cartridge, the tube having a wall defining a channel for receiving the cartridge, the wall having an internal surface and an external surface and the threaded end of the cartridge comprising threads on the external surface. The threads on the external surface of the tube may be configured to be threadably mated with the threaded surface of the stem guide.

The cartridge receiving end may include a magnet such that mounting a cartridge having a magnet to the cartridge receiving end will cause the cartridge to be magnetically mated to the stem guide.

The cartridge receiving end may include a base, multiple flaps extending longitudinally from the base to form a channel, and a ring in contact with the flaps and encircling at least a portion of the channel. In this manner the flaps have an inward bias such that a cartridge inserted into the channel will be retained within the channel by at least an interference fit between the cartridge and the flaps.

The multiple flaps may have an inner surface defining the channel and at least one of the flaps may have an inner surface from which one or more protrusions extend into the channel.

The stem guide may further include a cartridge configured to be removably attached to the stem guide. The cartridge may be one or more of a float, light stick, scent stick and combinations thereof.

The stem guide may further include a fishing line engaging end for releasably engaging a fishing line.

In another general aspect there is provided a fishing kit that includes at least one stem guide, as described above, and one or more cartridges configured to be removably attached to the stem guide. The stem guide includes a cartridge receiving end having a cartridge attachment means for attaching the cartridge to the stem guide in a manner that the cartridge can be removed from the stem guide without causing an amount of damage to the stem guide which prevents the stem guide from being used again. The one or more cartridges comprise an attachment end configured to be removably attached to the cartridge attachment means of the stem guide.

Embodiments of the fishing kit may include one or more of the following features or those described above with respect to the stem guide. For example, the cartridge may include one or more of a float, light stick, scent stick and combinations thereof. The stem guide may further include a fishing line engaging end for releasably engaging a fishing line.

In another general aspect there is provided a method of attaching and removing a fishing cartridge on a fishing stem guide. The method includes providing at least one stem guide as described above, providing one or more cartridges, mounting the cartridge to the stem guide and removing the cartridge from the stem guide. The stem guide includes a cartridge receiving end having a cartridge attachment means for attaching the cartridge to the stem guide in a manner that the cartridge can be removed from the stem guide without causing an amount of damage to the stem guide which prevents the stem guide from being used again. Each cartridge includes an attachment end configured to be removably attached to the cartridge attachment means of the stem guide. Mounting the cartridge to the stem guide includes mounting the attachment end of the cartridge to the cartridge attachment means of the stem guide. Removing the cartridge from the stem guide includes separating the attachment end of the cartridge from the attachment means of the stem guide, wherein the cartridge is removed from the stem guide without causing an amount of damage to the stem guide which prevents the stem guide from being used again.

Embodiments of the method of using the stem guide and replaceable cartridge may include one or more of the following features or those described above with respect to the stem guide. For example, the method may further include mounting a second cartridge to the stem guide after the first cartridge has been removed. The cartridge may include one or more of a float, scent stick, light stick and combinations thereof.

In another general aspect, a replaceable fishing cartridge for attaching to a stem guide includes a generally tubular member having a first end and a second end, the first end having an attachment means for attaching the cartridge to the stem guide in a manner that the cartridge can be removed from the stem guide without causing an amount of damage to the stem guide which prevents the stem guide from being used again.

Embodiments of the replaceable fishing cartridge may include one or more of the features described above or following. For example, the cartridge includes one or more of a float, light stick, scent stick and combinations thereof.

The stem guide, replaceable cartridges, kit and method of use the stem guide and replaceable cartridges offers advantages to the angle. Traditionally an angler must remove the fishing line from the float, light stick or scent stick and attach a new float, light stick or scent stick to the fishing line. The stem guide, replaceable cartridges, kit and method may permit the angler to merely remove, for example, one float and replace it quickly with a second float that is more suitable for the need at hand. This convenience also can be accompanied by the ability to have a high quality stem guide that can be used with a range of floats, e.g., that vary by length, color, diameter, weight, etc. to cover most fishing conditions. The stem guide, replaceable cartridges, kit and method offer similar convenience to scent stick and light stick cartridges.

The cartridge attachment means may be a prong and mounting the buoyant member to the cartridge attachment means includes inserting the prong into the channel in the buoyant member, whereby at least portions of an inner diameter of the channel are increased when the prong is inserted into the buoyant member and the compressive force of the buoyant member against the prong retains the buoyant member to the prong.

The cartridge attachment means may include an open cavity in the stem guide and mounting the buoyant member to the cartridge attachment means includes compressing an outer diameter of the buoyant member, inserting the buoyant member into the open cavity, and releasing the outer diameter of the buoyant member from compression to allow the buoyant member to expand against the open cavity.

In another general aspect, a fishing bobber system includes a stem guide and one or more replaceable buoyant members mountable in the stem guide. The stem guide has a first end and a second end. The first end has a surface and a prong extending outwardly from the surface and at the second end a first slot passing through the stem guide between opposite sides of the stem guide and connected to an outer surface of the stem guide by a second slot passing from the first slot to the outer surface of the stem guide. The first slot and second slot are configured to receive a fishing line.

The one or more replaceable buoyant members having a first end, a second end and a longitudinal channel passing between openings at the first end and the second end, being made of a plastic foam and configured to be inserted onto the prong of the stem guide and removed from the prong without damaging the stem guide. At least a portion of an inner diameter of the channel is increased when the prong is inserted into the channel in the buoyant member and the compressive force of the buoyant member against the prong retains the buoyant member to the prong.

Embodiments of the fishing bobber may include one or more of the features described herein or one or more of the following features. For example, the plastic foam may be an extruded closed cell polyethylene foam. The channel through the plastic foam buoyant member may be closed along a portion of the length of the plastic foam when the prong is not inserted into the channel. The fishing bobber may further include multiple buoyant members in a separate package.

In another general aspect a method of fishing includes providing a fishing float and mounting the fishing float to a stem guide. The fishing float has a first end, a second end and a longitudinal channel passing between openings at the first end and the second end. The fishing float is made of an extruded polyethylene foam. The fishing float is provided in a kit with multiple fishing floats. Mounting the fishing float to the stem guide includes changing the inner or outer diameter of the fishing float and the fishing float is retained to the stem guide solely or partially by a force exerted by the fishing float against the stem guide.

Embodiments of the method may include one or more of the features described herein or one or more of the following features. For example, the method may further include providing additional fishing floats with the stem guide or separately from the stem guide.

BRIEF DESCRIPTION OF THE DRAWINGS

FIG. 1 is front view, partially in section, showing the fishing tackle stem guide for temporarily attaching a fishing line thereto.

FIG. 1A is a fishing tackle stem guide with for temporarily attaching a fishing line thereto and with dual stem cups.

FIG. 2 shows the fishing tackle stem guide of FIG. 1 with a light stick therein.

FIG. 3 shows the fishing tackle stem guide of FIG. 1 with a scent stick therein attached to a fishing line.

FIG. 4 shows the fishing tackle stem guide of FIG. 1 as a kit with an adhesive to allow a person to secure the fishing tackle stem guide to various types of fishing tackle.

FIG. 5 shows a prior art slip bobber partially in cross section.

FIG. 6 shows the stem guide of FIG. 4 secured to the end of the stem of the prior art float of FIG. 5.

FIG. 7 shows a partial view of the rod in the fishing tackle stem guide of FIG. 1.

FIG. 11 shows the fishing tackle stem of FIG. 9 formed as an integral portion of a slip bobber.

FIG. 12 shows a side view of a portion of slotted stem in fishing tackle stem guide of FIG. 9.

FIG. 12A shows a top view of the slotted stem of FIG. 12.

FIG. 13 shows a top view of a sleeve that fits around the slotted stem of FIG. 12.

FIG. 14 shows a bottom view of the sleeve of FIG. 13.

FIG. 15 shows an assembled top view of the stem of FIG. 12 and the sleeve of FIG. 13.

FIGS. 39-41 are front, side and cross-sectional side views, respectively, of a second implementation of a stem guide and removable and replaceable cartridge.

FIGS. 42-44 are front, side and cross-sectional side views, respectively, of a third implementation of a stem guide and removable and replaceable cartridge.

FIG. 45 is a cross-sectional side view of the stem guide of FIGS. 42-44.

FIG. 46 is an enlarged view of the cross-sectional side view of the stem guide taken at enlarged section 46 of FIG. 45.

FIGS. 47-49 are front, side and cross-sectional side views, respectively, of a fourth implementation of a stem guide and replaceable cartridge using magnetic attraction.

FIG. 50 is an enlarged view of the stem guide and replaceable cartridge of FIGS. 47-49 taken at enlarged section 50 of FIG. 49.

FIGS. 51-53 are front, side and cross-sectional side views, respectively, of a fifth implementation of a stem guide and replaceable cartridge using a prong to retain the cartridge to the stem guide.

FIG. 54 is a cross-sectional side view of the stem guide of FIGS. 51-53.

FIG. 55 is a perspective view of the stem guide of FIGS. 51-53.

FIGS. 56-58 are front, side and cross-sectional side views, respectively, of a sixth implementation of a stem guide and replaceable cartridge using a prong to retain the cartridge to the stem guide.

FIG. 59 is a cross-sectional side view of the stem guide of FIGS. 56-58.

FIG. 60 is a perspective view of the stem guide of FIGS. 56-58.

FIGS. 68 and 69 are perspective front and side views of the stem guide of FIGS. 65-67.

FIG. 70 is cross-sectional side view of the stem guide of FIG. 69 taken along section line 70.

FIG. 71 is a top view of the stem guide of FIGS. 68 and 69.

FIG. 72 is a front view of a modified stem guide configured to removably receive a replaceable cartridge.

FIG. 77a is a front view of a stem guide having an adjustable buoyant member mounted to the stem guide.

FIG. 77b is a perspective view of an adjustable buoyant member.

FIG. 77c is a front view of the stem guide and adjustable buoyant member of FIG. 77a in which the buoyant member has been cut and a fishing line with fishing tackle has been mounted to the stem guide.

FIGS. 77d-g are end views showing additional configurations of the adjustable buoyant member of FIG. 77a.

FIG. 78 is a flow chart describing a method of using the stem guide with adjustable buoyant member of FIG. 77a.

FIG. 79b is a front view of the disassembled components of the fishing float assembly of FIG. 79a.

FIG. 79c is an enlarged view of a pair of line shoulders and spring at a lower end of the stem of FIG. 79a.

FIG. 80a is a front view of a dual stem fishing float assembly for slip and fixed bobber fishing.

FIG. 80b is a front view of the disassembled components of the fishing float assembly of FIG. 80a.

FIGS. 80c is a cross-sectional side view of the fishing float assembly of FIG. 80a.

FIGS. 80d and e are top and bottom views, respectively, of the fishing float assembly of FIG. 80a.

FIG. 80f is an enlarged view of a pair of line shoulders and spring at a lower end of the stem of FIG. 80a.

FIG. 81a is a front view of a single stem fishing float assembly for slip and fixed bobber fishing.

FIGS. 81b and c are top and bottom views, respectively, of the fishing float assembly of FIG. 81a.

FIGS. 81d is a cross-sectional side view of the fishing float assembly of FIG. 81a.

FIG. 81e is an enlarged view of a pair of line shoulders and spring at a lower end of the stem of FIG. 81a.

FIG. 81f is a front view of the disassembled components of the fishing float assembly of FIG. 81a.

FIG. 82*a* is a view of another embodiment of a fishing float assembly for slip and fixed bobber fishing which includes a light stick positioned within the stem of the fishing float.

FIG. 82*b* is an enlarged view of a first stem segment of the fishing float assembly of FIG. 82*a*.

FIG. 82*c* is an enlarged view of a second stem segment of the fishing float assembly of FIG. 82*a*.

FIG. 82*d* is an exploded view of the fishing float assembly of FIG. 82*a*.

DESCRIPTION OF THE PREFERRED EMBODIMENT

Figure 8:
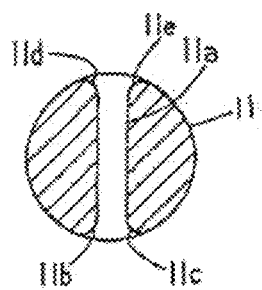
FIG. 8 shows a cross sectional view taken along lines 8-8 of FIG. 7.

FIG. 1 is front view, partially in section, showing a molded fishing tackle stem guide 10 for temporarily attaching a fishing line thereto. Stem guide 10 includes an elongated rod 11 having a stem connector 12 on one end and a line stop 10*a* on the other end with the line stop 10*a* including an annular spring stop 13 on the opposite end. Line stop 10*a* includes a first L shaped line shoulder 11*a* for engaging a fishing line and a second circular line shoulder 11*b* for engaging fishing line that is inserted therethrough. Both line shoulders are characterized by having rounded corners by molding the stem connector 12 rather than extruding the stem connector 12 to thereby avoid sharp edges found with extruded articles that can cut or abrading the fishing line. The molded rounded shoulder 11*a* on the rod 11 is illustrated in FIG. 7 and FIG. 8 by reference numerals 11*b*, 11*c*, 11*d* and 11*e* which show the radiused rather than abrupt corners where the fishing line rests on when the fishing line is held in a fixed condition in the line stop 10*a*.

A sleeve comprising a cylindrical compression spring 14 is retained on rod 11 by the stem connector 12 and the annular spring stop 13 to enable a fishing line to be restrained from sliding along the line shoulder 11*a* or 11*b* by the frictional engagement of the line between the sleeve 14 and the rod 11 as the line is held in a non linear condition within the confines of the compression spring 14. This type of line stop with compression spring and radiused shoulders is found as an integral part of the Lucky Jack™ Bobber sold by ROD-n-BOBB'S of Eau Claire Wis.

Extending axially through the stem guide 10 is a tube 15 or central line guide that allows a fishing line to slide freely therethrough. A purpose of the tube or central line guide 15 is to allow the stem connector 12 to be secured to a hollow stem of a slip bobber to convert the slip bobber to a fixed bobber.

In the embodiment shown the stem connector 12 forms an open-ended stem cup that has a large opening 16*a* on one end and has a closed end 16*b* penetrated by the tube 15. The stem cup 12 has an inner cylindrical securement surface 16 that can be attached to the user's fishing tackle either through a friction fit or a more permanent attachment using an adhesive, molding or the like. The stem connector 12 and the rod 11 are molded from a polymer plastic such as Nylon or Polycarbonate to provide a one-piece unit that together with the compression spring sleeve 14 can be secured to any number of different types of fishing tackle by insertion of a portion of the fishing tackle into the open-end 16*a* of stem cup 12. In the embodiment shown the stem cup 12 has an inner diameter $D_1$ on the upper portion of the stem cup. If desired the stem cup can be provided with bands of different inner diameter on the upper portion of the stem cup to permit the stem cup to engage different diameter end sections on various types of fishing tackle. Thus the stem guide provides a means to secure various sizes of fishing tackle to a fishing line. As one example, a float or a stem of a float can be inserted into the cup and adhered with an adhesive.

FIG. 1A shows another embodiment of the stem guide wherein the stem guide 10 is shown with a second stem cup 12' having a base secured to the stem guide 10 with the second stem cup 12' identical to the stem cup 10 and having an open end 16*a'* and a closed end 16*b'* with the central passage 15 extending therethrough. With the embodiment of FIG. 1A one can attach two items to the fishing line. For example, one might attach a scent stick in one stem cup and a light stick in the other stem cup or one might have scent sticks or light sticks in both cups.

FIG. 2 illustrates the stem guide 10 connected to a commercially available light stick 20, which is often used in fishing floats or the like. In the present application the stem guide 10 engages the sidewalls of the light stick to frictionally hold the light stick 20 therein while the spring 14 and stem 11 coact to form a line stop to hold the fishing line 21 thereto. When used in this manner the stem guide 10 enables a fisherperson to know where the fishing line is located. Once the light stick 20 is spent the light stick can be removed and replaced with a fresh light stick. In addition the light stick 20 can be removed and replaced with a light stick that generates a different colored light thus giving the fisherperson the option of selecting the proper light.

FIG. 3 illustrates still another use of the stem guide 10 showing a scent stick 24 secured to the fishing line 10 with the scent stick located on the fishing line 25 and proximate the fish hook 26. A scent stick can comprise a stick of material that is an attractant to fish. The fisherperson can place the bait on the hook 26 and in addition can attach the stem guide 10 with the scent stick 24 proximate the fishing hook to act as an attractant to bring the fish to a position where it can spot the bait on the hook 26. Thus the stem guide can be used to hold scent attractants proximate a hook on a fishing line.

A further use of the stem guide is to hold items such as buoy markers so that one can mark off an area.

FIG. 4 shows a fisherperson's stem guide kit 30 that comprising a transparent envelope or pouch 32 having a stem guide 10 therein together with a tube of an adhesive 31 having a cap 31*a* thereon. To use the kit 30 the user opens pouch 30 and removes the stem guide 10 and the tube of adhesive from the pouch 30 and places a drop of adhesive from the tube of adhesive 31 on the inside of the stem connector 12. To illustrate the use of the stem guide kit reference should be made to FIG. 5 which shows a prior art extruded slip bobber 40 comprising a float 41 having a hollow upper stem 42 and a lower hollow stem 42*a* with a fishing line 43 slideable extending through the stems and the float.

Another popular prior art bobber is a fixed stick bobber. The fixed stick extruded bobbers generally have a solid stem and lack the hole through the stem to enable the bobber to be used as a slip bobber. In order to reduce manufacturing costs the stick bobbers are extruded. Although the stick bobbers can be manufactured relatively inexpensive the stick bobbers suffer when uses as a fixed bobber. That is, to make the extruded bobber a fixed bobber a saw cut is made part way into the stem of the stick bobber. The saw cut is then used to hold the line to prevent the line from slipping. Unfortunately, the saw cut in the stem of the bobber has sharp edges which can cause the fishing line to break. To alleviate the problem of line weakening while maintaining low cost in bobber manufacture the molded stem guide 10 of the present invention can be incorporated onto the existing stem of a fixed bobber or slip bobber to a line-friendly bobber. While the stem guide 10 is shown in use with the slip bobber 40, the stem guide can also be used with a fixed bobber. For example, one may want to eliminate the saw cut on the fixed bobber and replace an end portion of the stem with the stem guide 10 having the rounded line shoulders obtainable by molding to thereby placing a line friendly line stop on the fixed bobber.

FIG. 6 shows the prior art conventional extruded slip bobber 40 that has been converted to a combination slip bobber/fixed bobber during a fishing outing by the placement of the stem cup 12 of the stem guide 10 on the end of the lower hollow stem 42*a* of the fishing bobber 40 by engaging the sidewalls 16 of the stem cup 12 with the outer surface of the lower stem 42*a*. By use of an adhesive or the like the user has fixedly secured the stem guide 10 to the fishing float 40 thus making the slip bobber 40 a combination slip bobber/fixed bobber. A feature of the present invention is that it reduces the cost of making a fishing bobber that is not harsh on the fishing line. Conventional bobbers are generally formed through an extrusion molding process and sawing process that result in sharp edges that can abrade the fishing line during use. To mold the bobber and the line stop in one piece increases the cost of the bobber; however, by molding only the stem guide which holds the fishing line 43 and the fishing bobber 40, and then securing the stem guide to the stem of a stick float one can create a fishing bobber that is not harsh on the fishing line but one can also reduce the cost of making the fishing bobber since the costs of molding an entire fishing bobber is more costly than molding only the stem guide for the bobber. Thus the bobber comprises two distinct portions: an extruded body portion and a molded end portion that can hold the fishing line in a manner that inhibits or prevents abrasion of the fishing line. By molded it is meant that the surfaces can be formed by allowing the molten plastic to set within the confines of a mold. Consequently, one can introduce smooth surfaces into the article and thus avoid sharp edges that are inherent in an extrusion process.

As shown in FIG. 6 the fishing line 43 extends through the hollow tube and through the stem guide 10 and can be temporarily secured to the stem 11 though the compression spring 14 thus providing fixed bobber operation. Thus, the kit 30 can convert a slip bobber to a fixed line bobber but more significantly the operation can on-the-go provide a slip bobber with a line stop that does not weaken or cut the fishing line. That is, by inserting the inner surface 16 into engagement with the exterior cylindrical surface of the hollow stem 42*a* one can fasten the stem guide 10 to available slip bobbers. A further use of the stem guide 10 is that even with fish slip bobbers/fixed bobbers that have a harsh line stop such as a saw cut stem one can replace a harsh line stop with the stem guide 10 with the radiused corners by severing the end of the stem in the float that contains the saw cut and securing the stem guide 10 to the float stem to reduce line abrasion.

Figure 9:
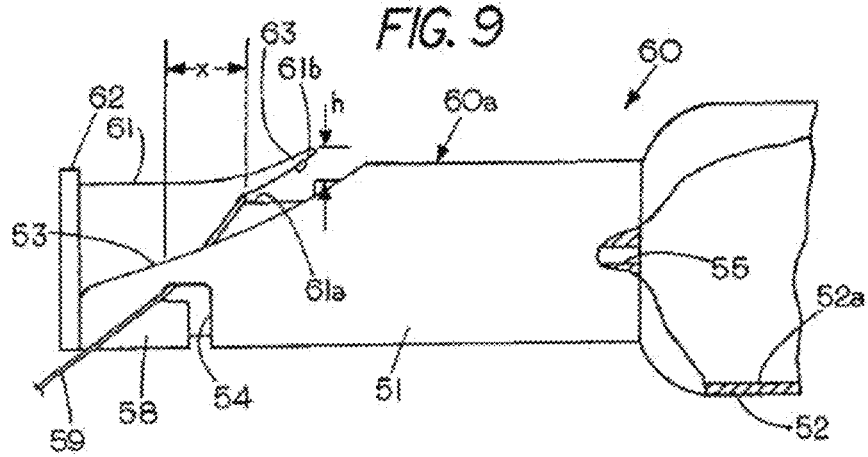
FIG. 9 shows a side view of another embodiment of fishing tackle stem guide secured to fishing line.
Figure 10:
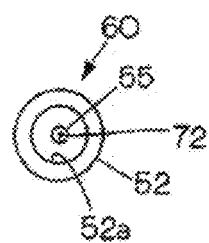
FIG. 10 shows a top view of the fishing tackle stem guide of FIG. 9.

FIG. 9 shows another embodiment of a fishing tackle stem guide 60. Fishing tackle stem guide 60 includes a molded stem connector 52 on one end and a molded line stop 60*a* on the opposite end for temporarily securing fishing line thereto. Fishing tackle stem guide 60 includes a stem connector 52 having an inner cylindrical surface 52*a* for connecting to a fishing float, a scent stick, a light stick or other types of fishing tackle such as stem guide 10. A tube 55 extends axially through a cylindrical rod 61 to enable the stem guide 60 to be attached to an end of a slip bobber to convert the slip bobber to a fixed stop bobber. Rod 61 includes an annular end stop 62 that maintains a cylindrical sleeve 51 in a working relationship with stem 61 although other methods of holding the sleeve 51 on the rod such as by pining or adhesively securing the sleeve thereto could be used.

The line stop stem rod 61 is shown in isolated side view in FIG. 12 and in an isolated top view in FIG. 12A revealing the lip 63 that has been formed in stem rod 61 with the lip projecting a distance "h" above the stem rod 61. Lip 63 has an undersurface 61*b* and a shoulder 61*a* that forms a v-shaped groove that allows a fishing line to be wedged between undersurface 61*b* and shoulder 61*a* by axially pulling the fishing line toward the annular end 62. To illustrate the wedging action, a fishing line 59 is shown in a wedged condition in FIGS. 12 and 12A.

FIG. 9 shows the stem rod 61 of line stop 60*a* including a cylindrical sleeve 51 having an edge 53 defining an opening in the sleeve that exposes the upward projecting line lip 63. Line lip 63 projects a distance "h" above the rod 61 to enable a fishing line 59 to be slid axially along the stem connector 52 toward the annular end stop 62 and in doing so cause the fishing line to be guided under the lip 63 and onto the shoulder 61*a* under the lip 63 where the fishing line is secured therein by the coaction of the undersurface 61*b* and the shoulder 61*a*. Once the fishing line engages the shoulder 61*a* the fishing line 59 is wrapped partially around the rod by slipping the fishing line between the sleeve 51 and the rod 61 and then out the L-shaped line shoulder 54 in sleeve 51 as shown in FIG. 9. Thus, the end portion forms a first ear 58 that enables the fishing line 59 to be held around a portion of rod 61. Similarly, the opposite side of sleeve 51 includes an ear 58*a* (see FIG. 13), which allows the fishing line 59 to be held around a further portion of rod 61. The use of a molded stem guide allows one to make rounded shoulder on the line stop so as to minimize abrasion to the fishing line. A further feature of the embodiment of FIG. 9 is that the line stop is all plastic and includes no metal springs so as to further reduce line abrasion. Thus, the fishing line 59 is wedged beneath the lip 63 and extends at least partially around the elongated rod 61 and the sleeve includes a set of ears 58 and 58*a* to hold the fishing line beneath the lip with the lip spaced from an line shoulder or eye 54 in the sleeve 51 and an identical line shoulder or eye in the opposite side of sleeve 51 to hold the fishing line 59 in an offset condition to prevent slippage of the fishing line therein.

FIGS. 13 and 14 show an isolated view of the cylindrical sleeve 51 showing the V shaped edge 53 that forms an opening therein to allows projection of the lip 63 therethrough as well as the ears 58 and 58*a* that extend around rod 61 to hold a fishing line therebetween in a nonlinear condition so that a pulling force on the line brings the fishing line into wedged engagement between surface 61*b* and shoulder 61*a*.

FIG. 9 shows the fishing line 59 is held a spaced distance x from the bottom of the v-shaped grove between lip 63 and shoulder 61*a* so that a pulling force on line 59 causes the fishing line to be pulled tighter into the v-shaped groove thus inhibiting or preventing the fishing line from sliding in the line stop 60*a*.

FIG. 15 shows an isolated top view of the sleeve 51 and rod 61 with the line 59 held between the inner surface of sleeve 51 and the outer surface of rod 61 to maintain line 59 in the wedged condition between surface 61*b* and shoulder 61*a*. That is, by having the line held around the rod 61 by the ears 58 and 58*a* it causes the fishing line to be wedged between the surface 61*b* and shoulder 61*a* to frictionally hold the line in position beneath the lip 63 as a pulling force is applied to the fishing line. Thus, the embodiment of FIG. 9 eliminates the point contact on the fishing line found in line stops with springs since the contact with the fishing line in the line stop of FIG. 9 is over an extended area under lip 63 and between the rod 61 and the sleeve as illustrated in FIGS. 9 and 15. Thus the embodiment of FIG. 9 allows one to hold a fishing line therein through elimination of the spring as shown in the embodiment of FIG. 1.

FIG. 11 shows a lighted fishing slip bobber, which contains a light source therein (not shown) with the line holder 60 shown in FIG. 9 integrally formed to bobber 70. In this embodiment of the lighted fishing bobber the line stop of FIG. 9 has been integrally formed onto the end of the bobber 70. Bobber 70 is a slip bobber and includes a tube 71 with a line 72 extending therethrough. Although the lighted bobber 70 is a slip bobber the bobber 70 can also function as a fixed line bobber since the cylindrical sleeve 60 and the rod 61 coact to frictionally grip the line as illustrated and described with respect to FIG. 9. Thus in the embodiment of FIG. 11 the use of a compression spring as the sleeve has been eliminated with the use of the line stop of FIG. 9.

The invention includes a method of securing an item of fishing tackle to a fishing line by engaging a first end of a stem connector 10 or 60 with an item of fishing tackle and inserting a fishing line into a line stop on the second end of the stem connector to secure a fishing line thereto to thereby secure both the stem connector and the item of fishing tackle to the fishing line. For example, if one engages the stem connector 10 or 60 with an end of a slip bobber 40 as shown in FIG. 5 one can provide fixed bobber operation to the slip bobber. If desired, one can integrally form the stem connector 60 to a slip bobber as shown in FIG. 11 to provide fixed bobber operation of the slip bobber.

The invention also includes a method of inserting a fishing line into a line stop of the fishing tackle line guide of FIG. 9 by extending a fishing line between an outer surface of a rod in the line stop and an inner surface of a sleeve 51 on the rod to secure the fishing line therebetween as well as extending the fishing line beneath a lip 63 on the line stop 60*a* to at least partially secure the fishing line therein.

Further methods of attachment include the step of securing a light stick a scent stick or other items of fishing tackle to a stem cup in the stem connector. In addition if desired the stem cup could be a rod or the like to provide a male fitting rather than a female fitting.

The inventor also has developed a multi-season fishing tackle stem guide that is configured for one or more of winter slip fishing, summer slip fishing, and fixed fishing. The stem guide has a line stop system that can be varied to permit one or more of the following: (a) position the fishing line within a first opening or shoulder that is used for fixed, e.g., fixed bobber, fishing, (b) position the fishing line within a second opening or shoulder that is used for winter slip, e.g., slip bobber, fishing, and (c) position the fishing line within a third opening that is used for summer slip, e.g., slip bobber, fishing. References herein to slip or fixed bobber fishing also should be interpreted to be understood to include slip of fixed fishing with a light stick, scent stick and the like because the stem guide can be attached to fishing articles other than a bobber.

The stem guide is configured to permit winter slip bobber fishing by positioning the fishing line under the water when the stem guide is in the water such that freezing air does not cause water on the line to freeze the line against a surface on the bobber. Because the fishing line will pass through and be positioned within the stem guide entirely under the water, the fishing line will not freeze against a surface of the bobber. The stem guide is configured to do this by causing the fishing line to be positioned in a slot or opening that is not enclosed, surrounded or otherwise in frictional contact by a sleeve, spring or compression means during winter slip bobber fishing. In some implementations, the sleeve may be compressed in one lengthwise direction for one type of fishing and compressed in an opposite direction for another type of fishing.

The stem guide offers other advantages, as described in part with respect to FIG. 1. The stem guide includes an elongated rod with one or more shoulders to receive a fishing line. In the prior art fishing bobbers the angler had limited options to have an optimal fishing bobber. For summer slip bobber fishing, the stem of the fishing bobber typically is an extruded tube through which an axial channel runs. The fishing line passes through this channel for slip bobber fishing. An advantage of extruded tube is that it is relatively inexpensive to produce. But this type of slip bobber fishing will not work at temperatures below freezing where the exposed portion of the line extending out of the elongated rod and water will freeze to the rod. Further, to attempt to make this extruded tube useful for fixed bobber fishing requires cuts to be made into the tube to form shoulders to receive the fishing line. These cuts are undesirable because they are sharp and can cut or weaken the line when the line is pulled against the sharp edge of the cut. Instead, some companies attempt to mold the elongated rod to contain the shoulders. A molded, full-length elongated rod to use as a stem for a stick bobber is relatively expensive because each piece is separately molded.

The multi-season fishing tackle stem guide for winter slip bobber fishing, summer slip bobber fishing, and fixed bobber fishing differs from the stem guide of FIG. 1 generally by the inclusion of a means similar to the shoulder for fixed bobber fishing. Instead of being used for fixed bobber fishing the means permits winter slip bobber fishing without the nicks and saws cuts that can damage a soft, flexible fishing line because the stem or elongated rod is molded to have smooth or radiused edges. In some embodiments, the molded rod has two shoulders—each having smooth or radiused edges. In other embodiments, the molded rod has one shoulder that then extends into two shoulders—each having smooth or radiused edges. For both embodiments, the molded rod may have a channel extending between both ends of the rod. Because the rod is molded, the channel is not necessarily round or centered along the central axis. The diameter of the channel should be sufficiently large to permit a fishing line to easily pass through for summer slip bobber fishing. The shoulders should be formed during the molding, e.g., injection molding, such that they are entirely or primarily positioned within the solid portion of the rod. By placing the stem from a stick bobber into the stem cup, an angler can pass a fishing line into the bottom end of the channel in the elongate rod and into the axial channel passing through the stick bobber, as shown in FIG. 6.

Figure 16:
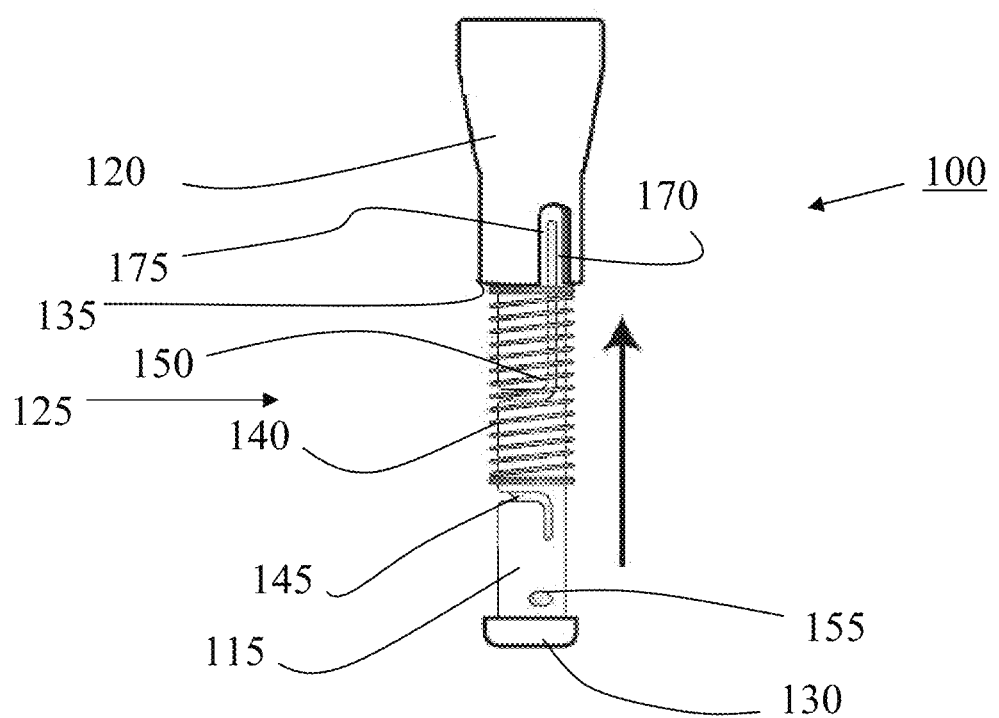
FIG. 16 is a front view of a multi-season stem guide in which a spring is compressed upwardly for fixed bobber fishing.
Figure 17:
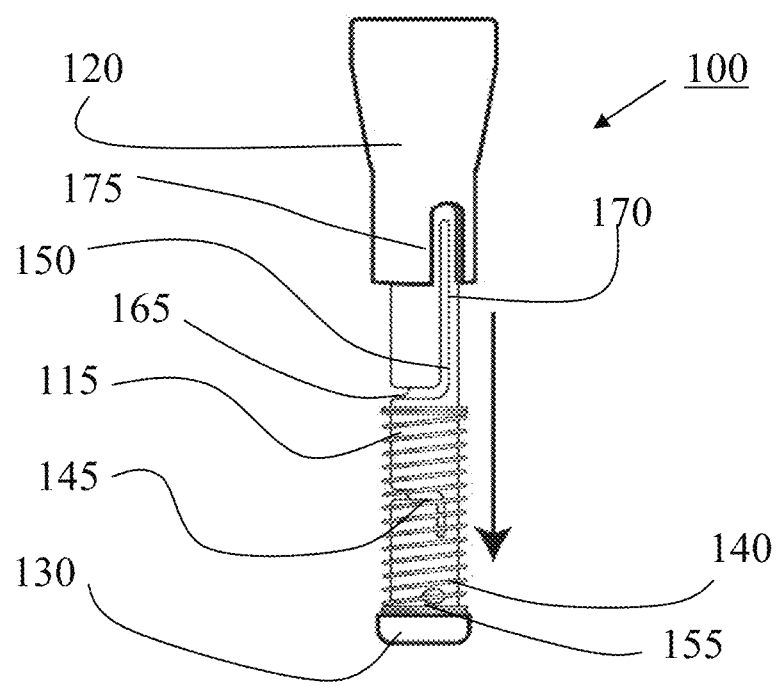
FIG. 17 is a front view of the multi-season stem guide in which a spring is compressed downwardly for winter slip bobber fishing.
Figure 18:
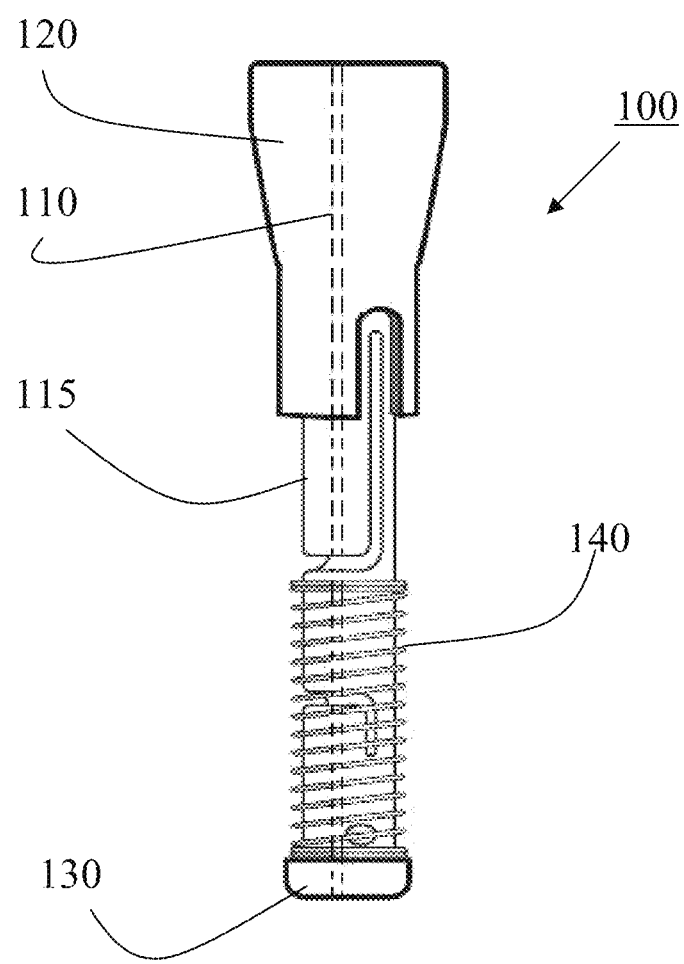
FIG. 18 is a front view of the multi-season stem guide showing a cross-sectional view of a channel passing through the stem guide.

FIGS. 16, 17 and 18 are front views of a multi-season fishing tackle stem guide 100 for temporarily attaching a fishing line. The stem guide 100 includes an elongated rod 115 having a stem connector 120 on one end and a line stop system 125 on the other end. A channel 110 extends the length of the elongated rod 115 and opens in the stem connector 120 to form a stem cup for receiving a fishing article. The channel is shown in FIG. 18 to illustrate the placement of the fishing line. The channel 110 can be wider than illustrated in FIG. 18 and may vary in diameter over the distance of the rod and stem connector. The line stop system 125 includes a flange or annular sleeve stop 130 on one end and the stem connector 120 on the opposite end. The line stop system 125 further includes a first L shaped line shoulder 145, a second L-shaped line shoulder 150 and an optional circular line shoulder 155. Each of the line shoulders are used to engage a fishing line that is inserted there through. Each line shoulder also has a smoothed or radiused edge without cuts or nicks and is configured to prevent damage to the fishing line. This generally is accomplished by making the rod using molding, e.g., injection molding.

A sleeve 140 encircles at least a portion of the rod 115 and can be moved along the length of the rod between the annular sleeve stop 130 and the stem connector 120. The sleeve 140 may be a spring. A base 135 of the stem connector 120 acts as an upper stop for the upper movement of the sleeve while the annular sleeve stop 130 acts as a lower stop of the downward movement of the sleeve. The stem connector 120 also includes a pair of notched or cut out sections 175 that extend upward from the base 135 and surrounds a portion 170 of the second L-shaped shoulder 150. The pair of notched sections 175 is used such that a fishing line can pass freely through the rod 115 by entering one notched section 175 and passing out of the rod through a second notched section 175.

In general, the sleeve 140 will extend the length of the rod between the stem connector 120 and the sleeve stop 130. In FIGS. 16 and 17, the arrows adjacent to the rod 115 are used to indicate the compression of the sleeve in one direction or the other. In FIG. 16 the sleeve 140 is compressed up on the rod against the stem connector 120 such that the sleeve encircles a portion of the shoulder 150 while exposing the shoulders 145 and 155. However, the portion 170 of the shoulder 150 remains unencircled by the sleeve because the sleeve cannot extend beyond the base of the stem connector 120. In contrast to the configuration illustrated in FIG. 16, in FIG. 17 the sleeve 140 is compressed down on the rod against the annular sleeve stop 130 such that the sleeve encircles the shoulders 145 and 155 while exposing the shoulder 150.

By use of the shoulders 145 and 150, the multi-season fishing tackle stem guide 100 can be used for multiple types of bobber fishing, e.g., slip bobber fishing, fixed bobber fishing, and multi-season fishing, e.g., summer fishing and winter fishing. In winter fishing where the outside temperature is below freezing, the angler with a slip bobber must ensure that the fishing line passing through the bobber does not become frozen against a surface of the bobber. For example, as illustrated in FIG. 18, if the fishing line was to pass through the longitudinal channel 110 in the rod 115 and the stem connector 120, the water on the line in the bobber above the water would freeze the line to the channel 110 and prevent movement of the line in the channel. To counter this problem, the angler using the stem guide 100 in winter slip bobber fishing pulls the sleeve 140 down as illustrated in FIG. 17 and passes a fishing line through the upper shoulder 165 and up into slot extension 170. Upon releasing the sleeve 140 such that it is extended between the annular sleeve stop 130 and the base 135, the fishing line is trapped within the notched section 175. In this position, the fishing line can slide through the slot portion 170.

It should be noted that the position of the channel 110 within the rod can vary but generally will not be positioned such that the shoulders 145 and 150 extend into the channel. However, in some embodiments, a portion of the shoulders may extend into the channel 110.

As illustrated in FIG. 16, to use the stem guide 100 in fixed bobber fishing, the sleeve 140 is pulled up and the fishing line is passed into the lower shoulder 145. Upon releasing the sleeve 140 such that it is extended between the annular sleeve stop 130 and the base 135, the fishing line is trapped within the lower shoulder 145 and under the sleeve 140. Specifically, the fishing line passes between the annular sleeve stop 130 and the base of the sleeve 140 and then between the sleeve and the rod 115 before passing through the lower shoulder 145. The fishing line then passes out of the lower shoulder 145, between the sleeve and the rod, and finally between the sleeve stop 130 and the base of the sleeve 140. In this configuration, the fishing line is trapped in place and unable to slide through the lower shoulder 145.

Figure 19:
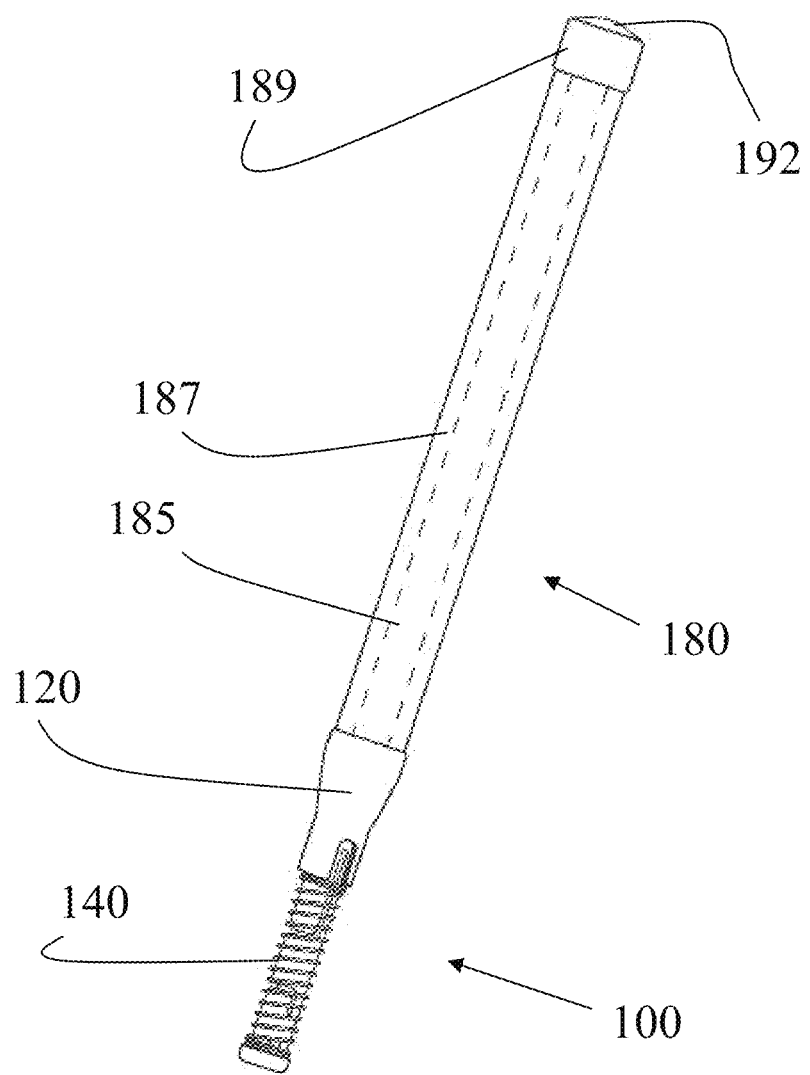
FIG. 19 is a front view of the multi-season stem guide of FIG. 16 showing a float attached to the stem guide.

Referring to FIG. 19, a fishing bobber rig 180 is assembled from the stem guide 100 attached to a foam stem 185 through which a channel 187 passes. The channel 187 is in connection with the channel 110 in the stem guide 120 such that a fishing line can pass through the fishing bobber rig 180 if used for slip bobber fishing in warmer weather. The sleeve 140 can be compressed downward to use the bobber for slip bobber for slip bobber fishing in freezing weather or compressed upward to the bobber for fixed bobber fishing in the warmer weather. The foam stem 185 can be replaced with other types of fishing components. For example, a light rod can be substituted for the foam stem. As described elsewhere herein, the foam stem 185 or light rod can be friction fit within the stem cup or held in place with an adhesive. Similar to the configuration illustrated in FIG. 6, the stem guide 100 can be attached to the stem of a stick bobber. In general, the stem cup can be interfaced with any mating fishing article using a friction fit, adhesive or other attachment means. In this manner, most fishing articles can be optimized for winter slip bobber fishing, summer slip bobber fishing and fixed bobber fishing merely by attaching them to the stem cup of the stem guide 100.

Figure 20:
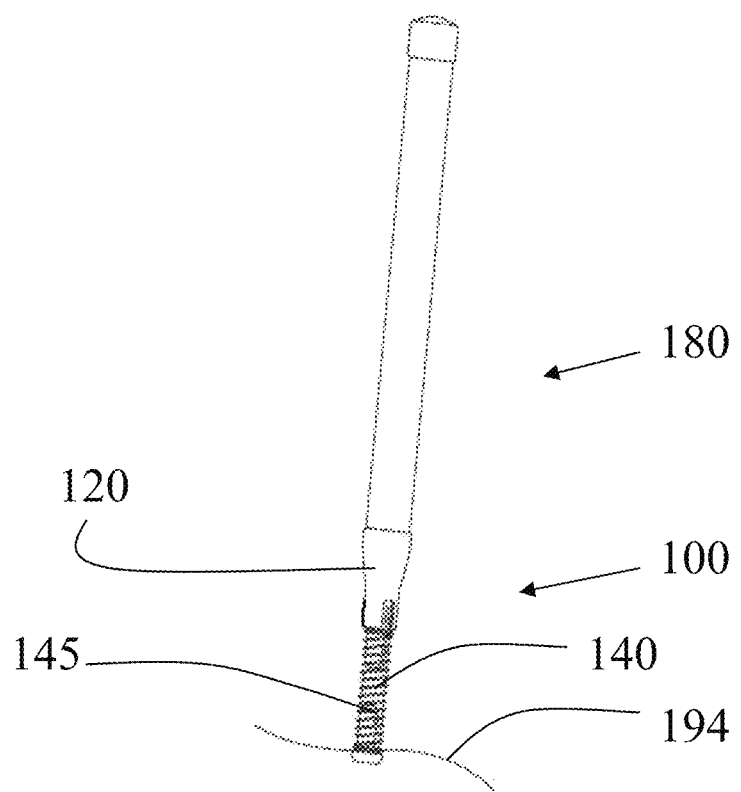
FIG. 20 is a front view of the multi-season stem guide of FIG. 19 configured for fixed bobber fishing.

Referring to FIG. 20, the fishing bobber rig 180 is shown configured for fixed bobber fishing. To use the fishing bobber rig for fixed bobber fishing, the user compresses the sleeve 140 upwardly and passes a fishing line 194 through the lower shoulder 145. Upon releasing the sleeve 140, the fishing line 194 is fixed in position against the rod 115. When the user casts the fishing bobber rig 180, the interaction between the sleeve 140, rod 115 and fishing line 194 keeps the fishing bobber rig from sliding along the line 194.

Figure 21:
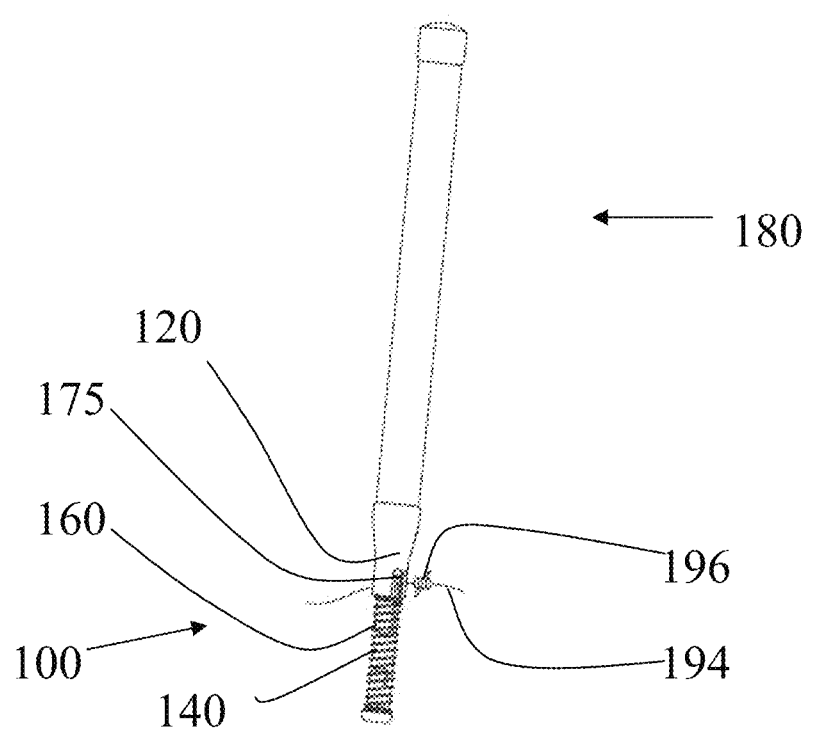
FIG. 21 is a front view of the multi-season stem guide of FIG. 19 configured for winter slip bobber fishing.

Referring to FIG. 21, the fishing bobber 180 is shown configured for slip bobber winter fishing, in particular when the air temperature is at or below freezing and there is a need to prevent the water on the fishing line from freezing to a surface on the fishing bobber rig 180. To use the fishing bobber rig for slip bobber winter fishing, the user compresses the sleeve 140 downwardly and passes a fishing line 194 through the upper shoulder 165. Upon releasing the sleeve 140, the fishing line 194 is trapped in a slidable configuration within the portion 170 in the rod 115. When the user casts the fishing bobber rig 180, the fishing bobber rig can slide along the line 194. For example to cast, the user reels in the fishing line until the hook or other fishing apparatus at the end of the line is adjacent to the bobber rig 180. As illustrated in FIG. 21, a knot 196 is tied onto the fishing line 194. The knot 196 is of a size small enough to be reeled in and through the eyelets on the fishing rod (not shown) but large enough such that the knot will not pass through the shoulder 165 or the portion 170.

Upon casting out, the hook, weights or other gear attached to the end of the fishing line will sink into the water while the buoyancy of the fishing bobber keeps it floating on the surface. The fishing line 194 will continue to pass through the portion 170 until the knot 196 reaches the portion 170.

Certain portions of the fishing bobber 180 will be above the water line and other portions below the water line. In particular, the portion 170 will be positioned below the water surface such that the fishing line 194 will not freeze against the bobber.

Figure 22:
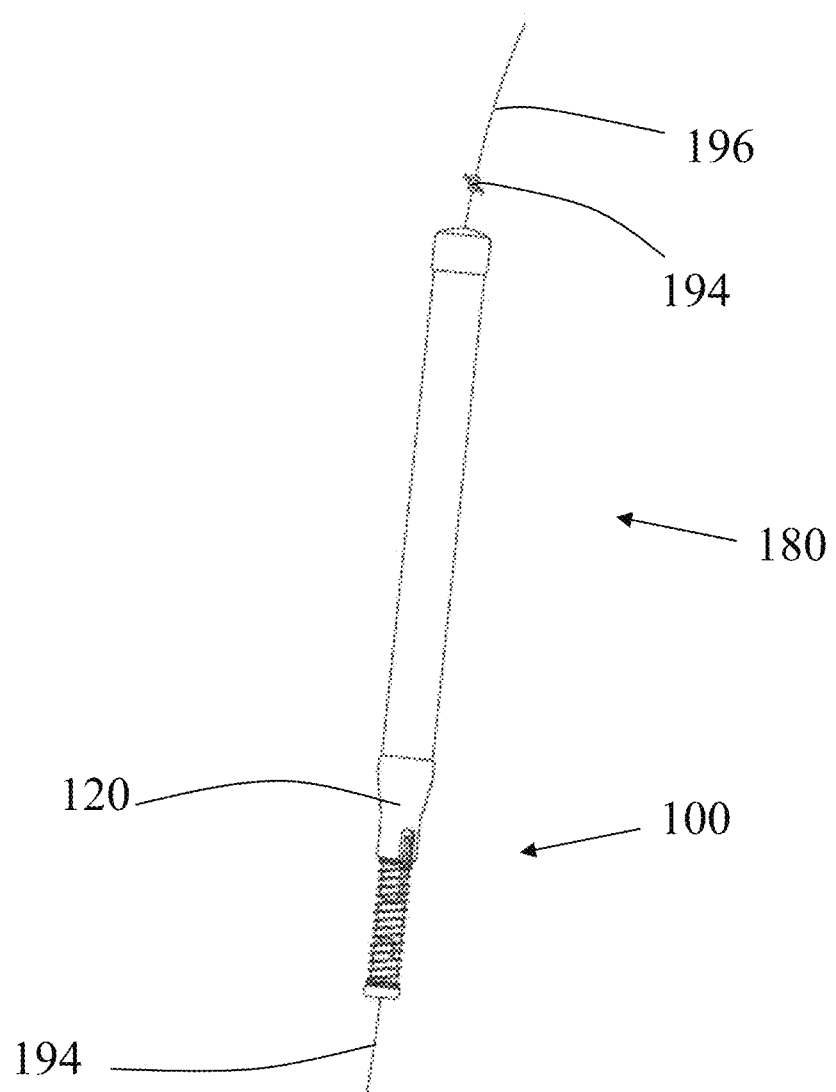
FIG. 22 is a front view of the multi-season stem guide of FIG. 19 configured for summer slip bobber fishing.

The use of the slip bobber configuration illustrated in FIG. 21 for winter fishing can be contrasted against the slip bobber configuration illustrated in FIG. 22 for summer fishing. In FIG. 22, the fishing line passes through the inner channels 110 and 185. When the user casts the fishing bobber rig 180, the fishing bobber rig can slide along the line 194. For example to cast, the user reels in the fishing line until the hook or other fishing apparatus at the end of the line is adjacent to the bobber rig 180. As illustrated in FIG. 22, the knot 196 is tied onto the fishing line 194. The knot 196 is of a size small enough to be reeled in and through the eyelets on the fishing rod (not shown) but large enough such that the knot will not enter and pass through the channels 110 and 185.

Upon casting out, the hook, weights or other gear attached to the end of the fishing line 194 will sink into the water while the buoyancy of the fishing bobber 180 keeps it floating on the surface. The fishing line 194 will continue to pass through the channels 110 and 180 until the knot 196 reaches the top of the bobber. Like the winter bobber configuration illustrated in FIG. 21, certain portions of the fishing bobber 180 will be above the water line and other portions below the water line. Unlike winter fishing, in summer fishing there is no concern that the water on the fishing line will freeze to the bobber. If the configuration in FIG. 22 was to be used in winter fishing where the temperature is below freezing, the water on the line 194 would cause the line to freeze to the bobber at least along the top of the bobber because the top of the bobber would be exposed to the sub-freezing temperatures.

As can be expected the stem guide 100 can be used to attach to fishing tackle other than a bobber. For example, the fishing tackle can be a light stick or a scent stick. The bobber, light stick or scent stick can be attached to the stem guide 100 according to any of the methods described above, such as one or more of a friction fit, a twist lock attachment, or an adhesive.

Similarly, the stem guide 100 can be an integral part of any piece of fishing tackle. The stem guide can be formed such that the stem cup or connector is a portion of the bobber or float and a further stem extends from the opposite end of the bobber or float. The stem guide 100 can be manufactured such that a foam float portion of a bobber is slid along the elongated stem adjacent to the line shoulders. In other words, the stem guide 100 can be a separate piece that is an after market attachment to an article of fishing tackle or it can be configured as an integral part of an article of fishing tackle.

Figure 23:
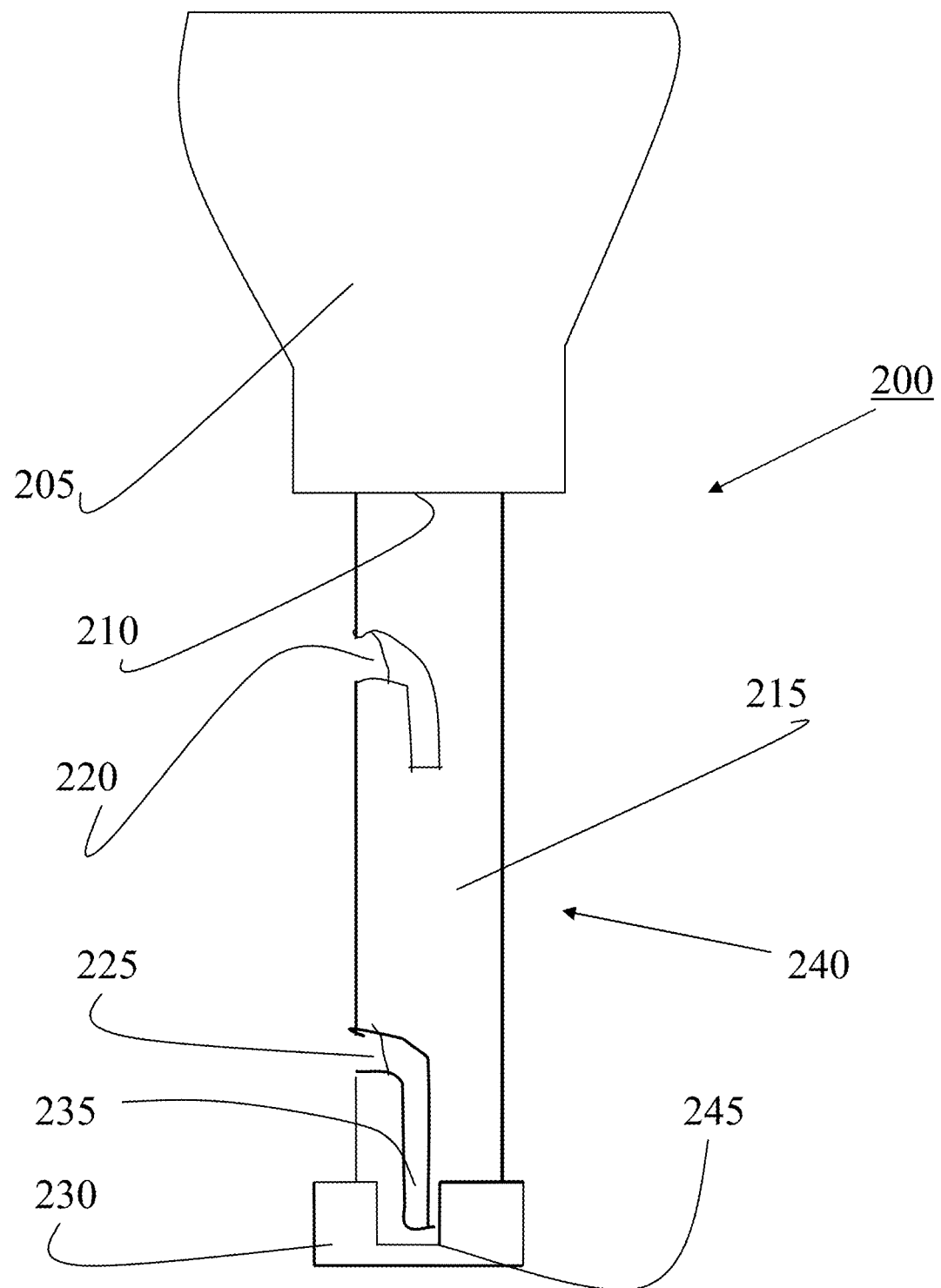
FIG. 23 is a front view of a second implementation of a multi-season stem guide.

The principle of the multi-season stem guide 100, namely the ability to slip bobber fish and fixed bobber fish in any season using one bobber, can be applied in other configurations of a stem guide as well. For example, referring to FIG. 23, a multi-season stem guide 200 includes an elongated rod 215 having a stem connector 205 on one end and a line stop system 240 on the other end. The line stop system 240 includes a flanged or annular sleeve stop 230 on one end and the stem connector 205 on the opposite end. A sleeve (not shown) is in compression between the annular sleeve stop 230 and a base 210 of the stem connector 205. As described above, the sleeve may be a spring or other compression means. The line stop system 240 further includes an upper L shaped line shoulder 220 and a lower L-shaped line shoulder 225. Each of the line shoulders are used to engage a fishing line that is inserted there through. The annular sleeve stop 230 includes a notched or cut-out section 245 into which an extension 235 of the lower line shoulder 225 is positioned.

The stem guide 200 is used similarly to the stem guide 100 except that the upper shoulder 220 is used for fixed bobber fishing and the lower shoulder 225 is used for winter slip bobber fishing. Upon pulling the sleeve (not shown) down so that it is compressed against the sleeve stop 230, the shoulder 220 is exposed and a fishing line can be placed within the shoulder. When the sleeve is released, the fishing line will enter and exit a space between the sleeve and the rod 215 adjacent to the base 210 of the stem connector 205. The fishing line will be fixed in position between the sleeve and the rod 215.

In contrast, for winter slip bobber fishing, the sleeve is pulled up so that is compressed against the stem connector base 210 with the lower shoulder 225 exposed so that a fishing line can be placed within the shoulder. When the sleeve is released, the fishing line will be pushed down within the shoulder extension 235 and surrounded by the notched section 245. Because the sleeve cannot extend all the way to the bottom of the extension 235, the fishing line can easily pass through the shoulder during winter slip bobber fishing. Of importance to winter fishing, when the bobber is in the water, the fishing line will be positioned in or under the water so that it will not freeze against the bobber.

Figure 24:
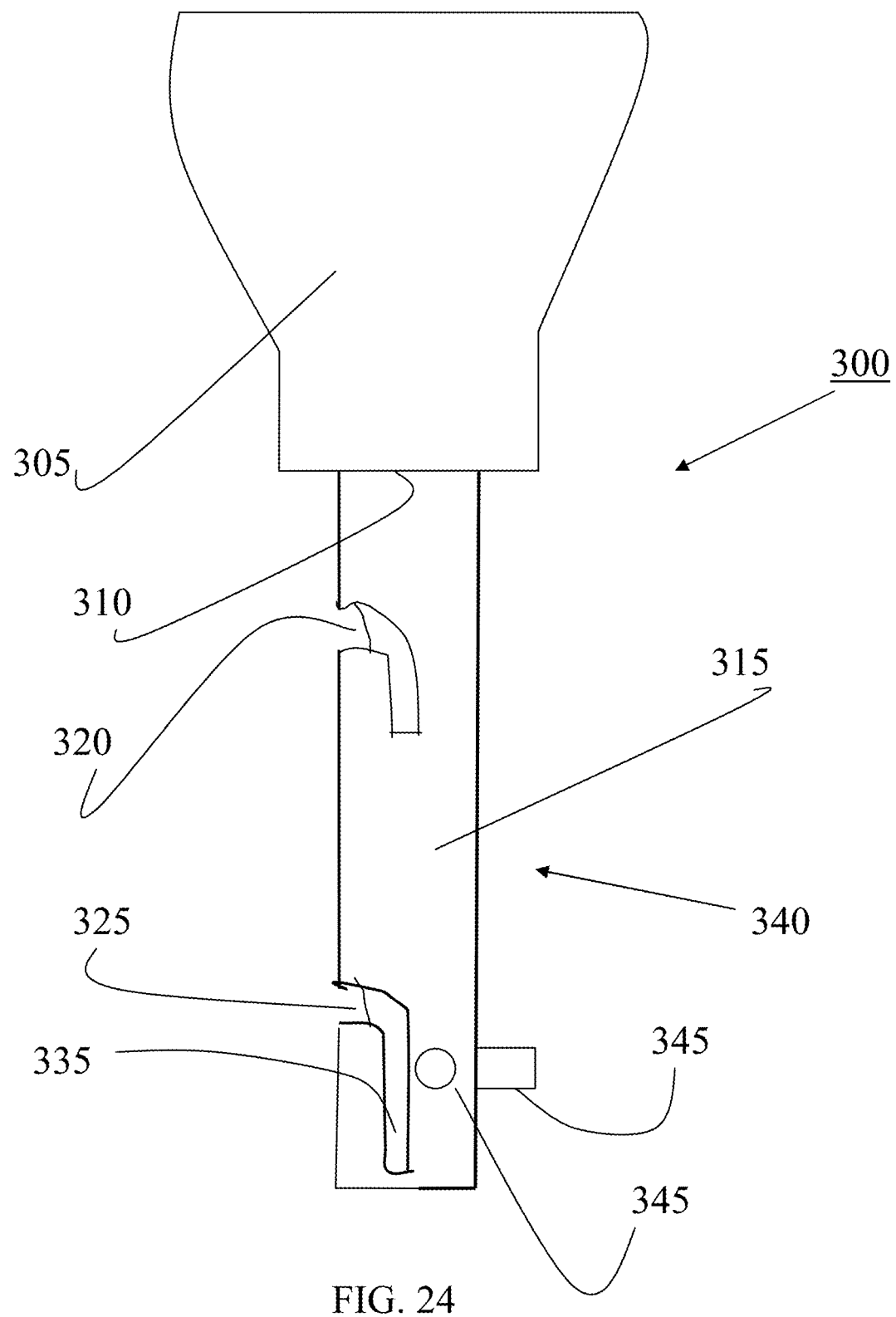
FIG. 24 is a front view of a third implementation of a multi-season stem guide.

In another implementation of a multi-season stem guide, FIG. 24 illustrates a multi-season stem guide 300 that includes an elongated rod 315 having a stem connector 305 on one end and a line stop system 340 on the other end. The line stop system 340 includes one or more sleeve stops 345 in the proximity of one end and the stem connector 305 on the opposite end. A sleeve (not shown) is in compression between the sleeve stops 345 and a base 310 of the stem connector 305. The line stop system 340 further includes an upper L shaped line shoulder 320 and a lower L-shaped line shoulder 325. Each of the line shoulders are used to engage a fishing line that is inserted there through. The sleeve stops 345 are positioned adjacent to the lower line shoulder 325 such that a portion 335 of the lower line shoulder 325 extends past the sleeve stops 345. In this manner, a sleeve around the rod 315 will not be able to extend past the sleeve stops 345.

The stem guide 300 is used similarly to the stem guide 200 with the upper shoulder 320 used for fixed bobber fishing and the lower shoulder 325 used for winter slip bobber fishing. Upon pulling the sleeve (not shown) down so that it is compressed against the sleeve stops 345, the shoulder 320 is exposed and a fishing line can be placed within the shoulder. When the sleeve is released, the fishing line will enter and exit a space between the sleeve and the rod 315 adjacent to the base 310 of the stem connector 305. The fishing line will be fixed in position between the sleeve and the rod 315.

In contrast, for winter slip bobber fishing, the sleeve is pulled up so that is compressed against the stem connector base 310 with the lower shoulder 325 exposed so that a fishing line can be placed within the shoulder. When the sleeve is released, the fishing line will pushed down within the shoulder extension 335 beyond the sleeve stops 345. Because the sleeve cannot extend all the way to the bottom of the extension 335, the fishing line can easily pass through the shoulder during winter slip bobber fishing. Of importance to winter fishing, when the bobber is in the water, the fishing line will be positioned in or under the water so that it will not freeze against the bobber.

Figure 25:
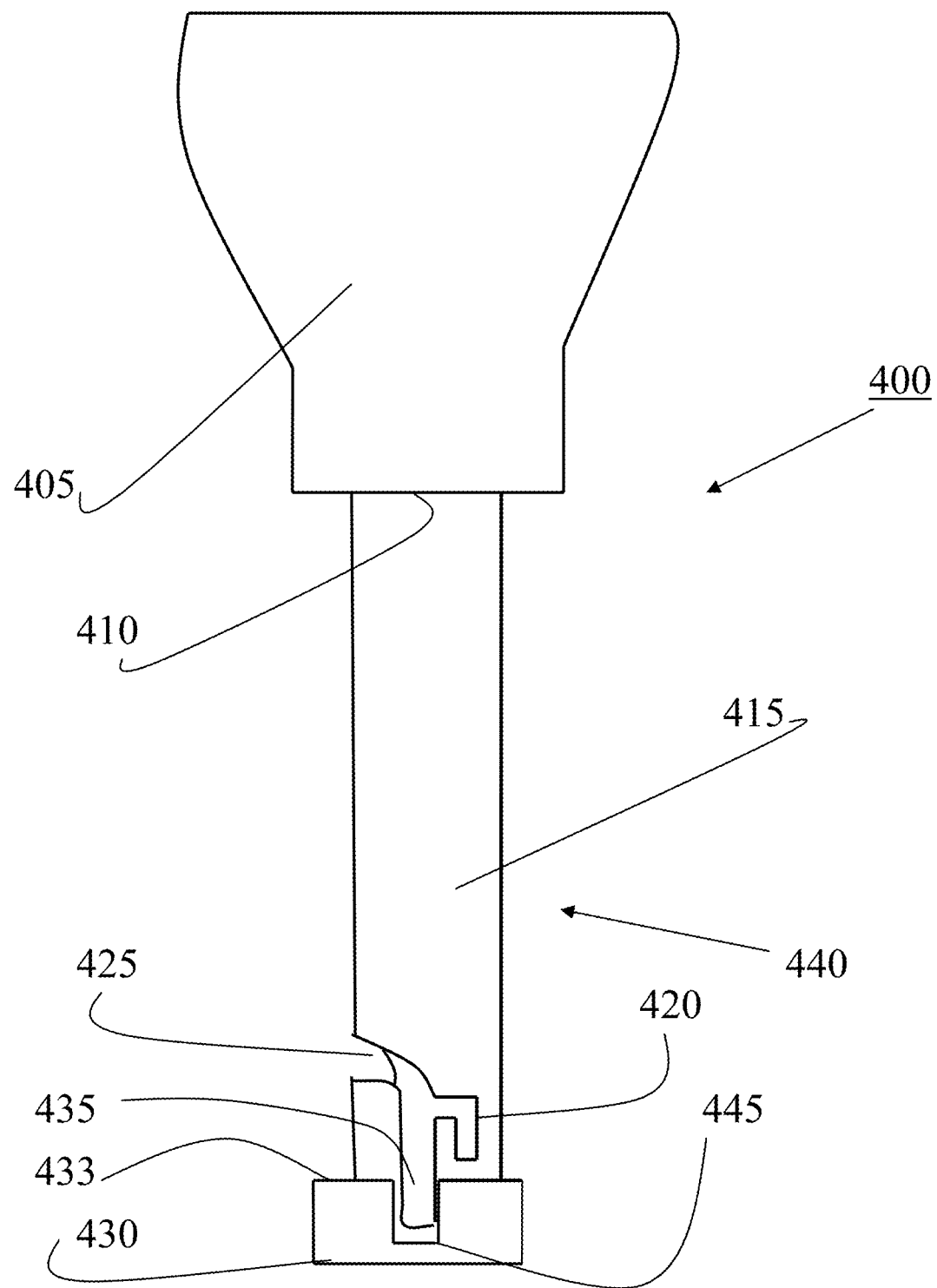
FIG. 25 is a front view of a fourth implementation of a multi-season stem guide.

In another implementation of a multi-season stem guide, FIG. 25 illustrates a multi-season stem guide 400 that includes an elongated rod 415 having a stem connector 405 on one end and a line stop system 440 on the other end. The line stop system 440 includes a sleeve stop 430 at one end and the stem connector 405 on the opposite end. A sleeve (not shown) is in compression between the annular sleeve stop 430 and a base 410 of the stem connector 405. The line stop system 440 further includes an L shaped line shoulder 425 that includes an upper portion 420 and a lower portion 435. Each of the line shoulder portions are used to engage a fishing line that is inserted through the shoulder 425. The upper portion 420 extends to the proximity of, but above, a top edge 433 of the sleeve stop 430. The lower portion 435 extends into a notched or cut-out section 445 of the annular sleeve stop 430. In this manner, a sleeve, such as a spring or other compression means, positioned around the rod 415 will extend past and enclose the upper portion 420 but will not be able to extend over the lower portion 430.

The stem guide 400 is used similarly to the above stem guides except that the shoulder 425 is used for both fixed bobber fishing and winter slip bobber fishing. In particular, the fishing line is fed into the line shoulder 425 and then into the upper portion 420 used for fixed bobber fishing and the lower portion 435 for winter slip bobber fishing. Upon pulling the sleeve (not shown) up so that it is compressed against the stem connector base 410, the shoulder 425 is exposed and a fishing line can be placed within the shoulder. The fishing line then can be placed within the upper extension 420 for fixed bobber fishing or the lower extension 435 for winter slip bobber fishing. For fixed bobber fishing, when the sleeve is released, the fishing line will enter and exit a space between the sleeve and the rod 415 adjacent to the top edge 433 of the sleeve stop 430. The fishing line will be fixed in position between the sleeve and the rod 415.

In contrast, for winter slip bobber fishing, when the sleeve is released the fishing line will be pushed down within the lower extension 435 in the notched section 445. Because the sleeve cannot extend all the way to the bottom of the lower extension 435, the fishing line can easily pass through the shoulder extension during winter slip bobber fishing. Of importance to winter slip bobber fishing, when the bobber is in the water, the fishing line will be positioned in or under the water so that it will not freeze against the bobber.

Figure 26:
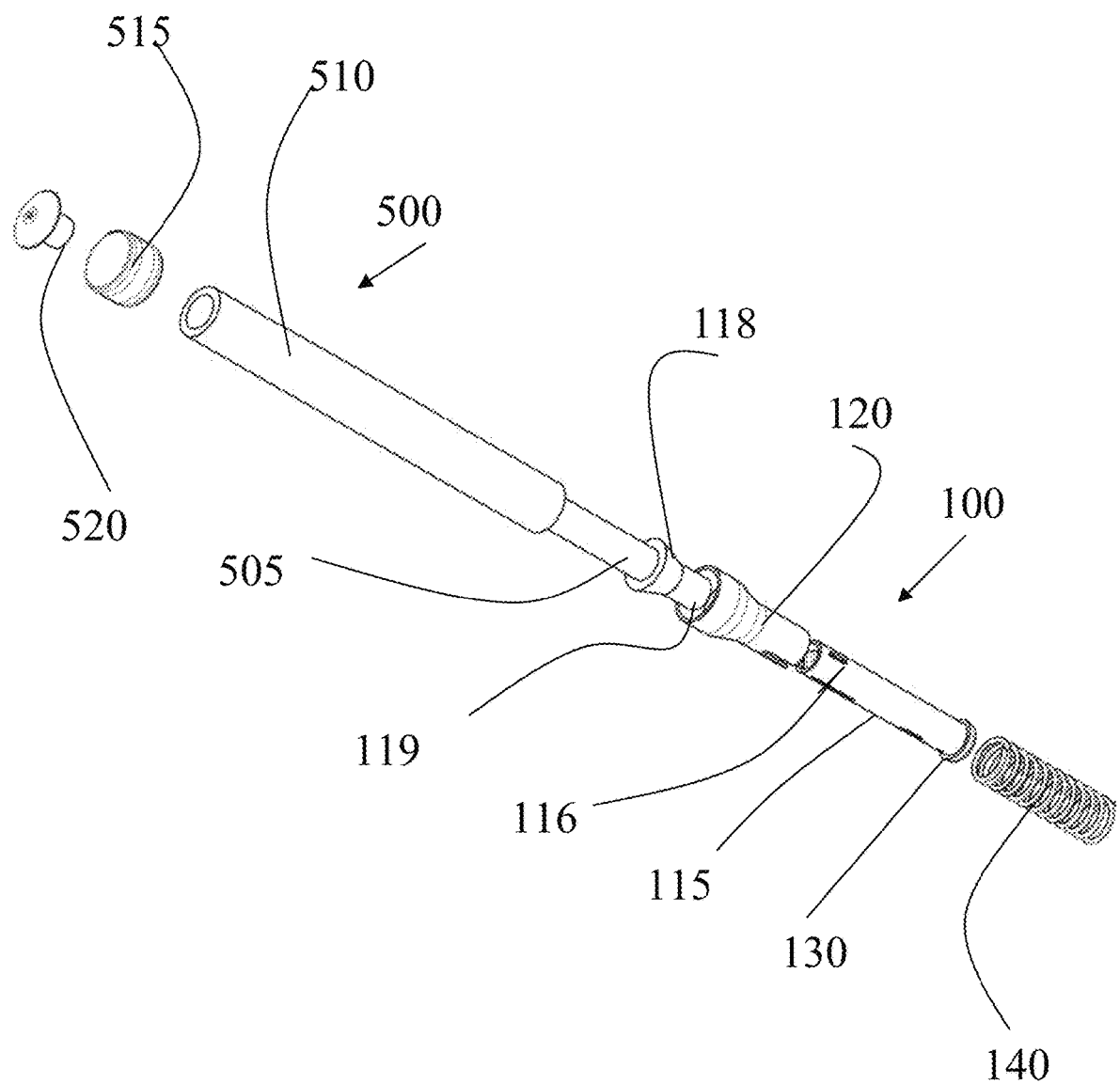
FIG. 26 is an exploded assembly view of a multi-season stem guide and stick bobber.
Figure 27:
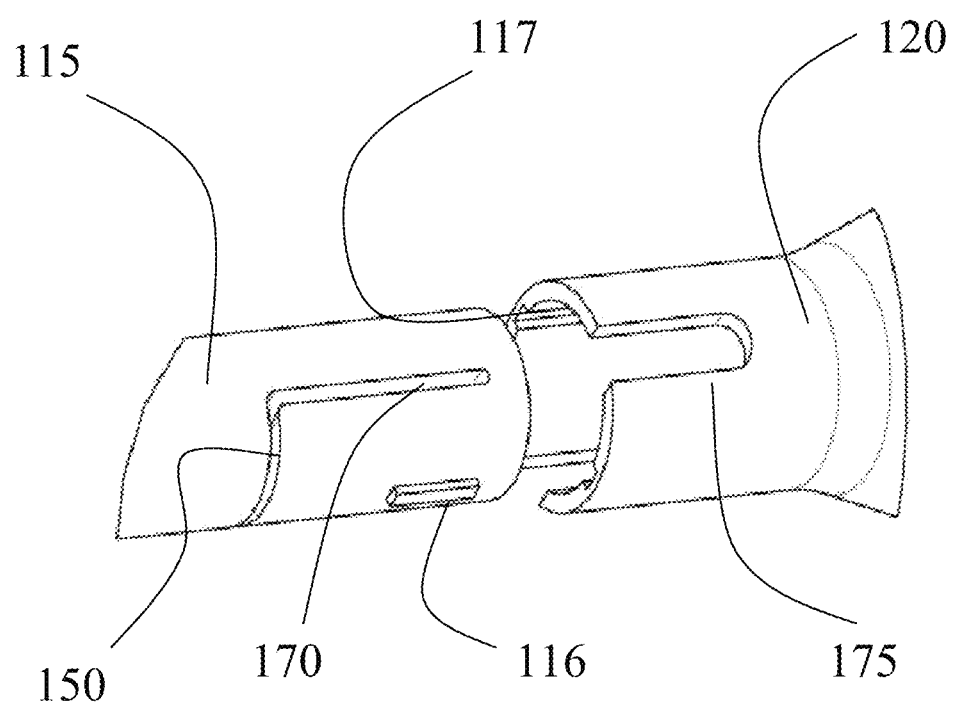
FIGS. 27 and 28 are perspective and front views respectively, showing the alignment of the stem cup to the elongated rod.
Figure 28:
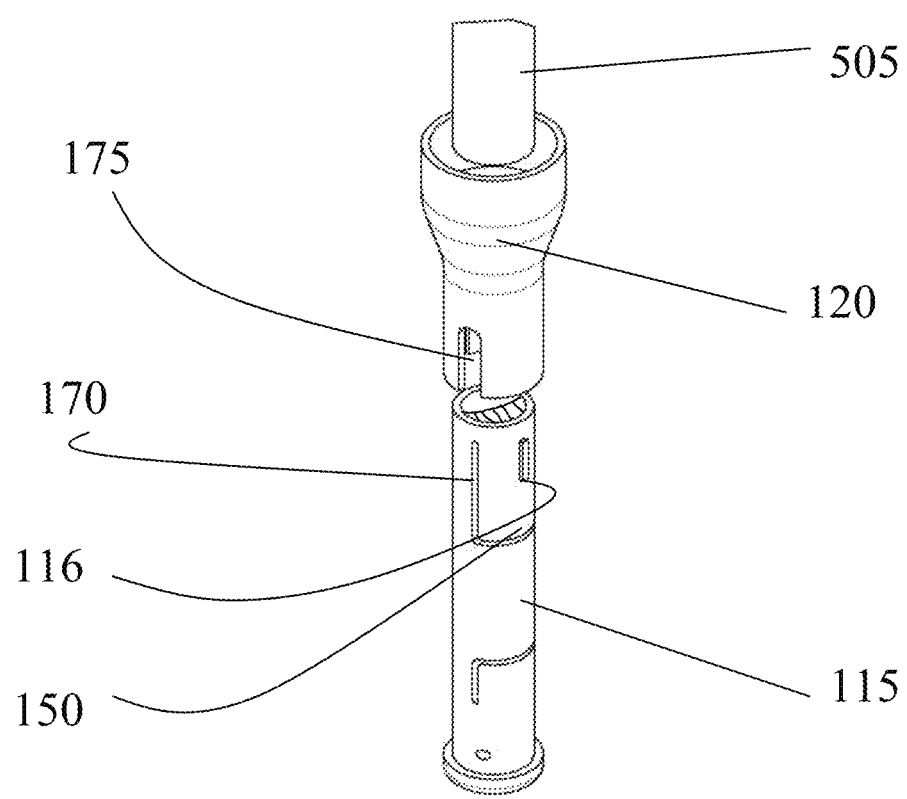
Figure 29:
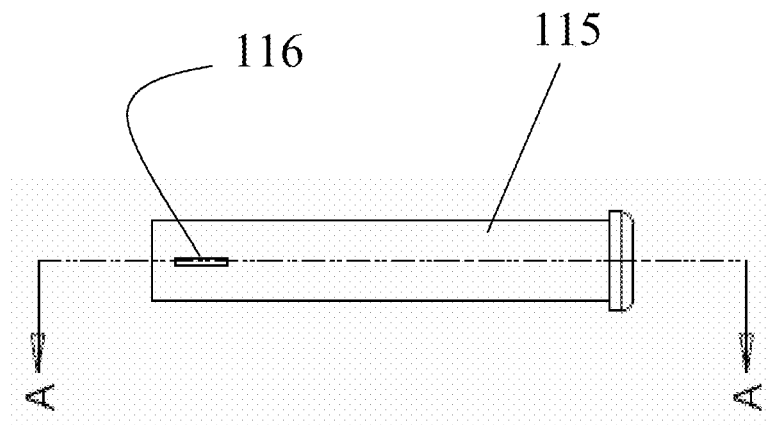
FIG. 29 is a side view of the elongated rod.
Figure 30:
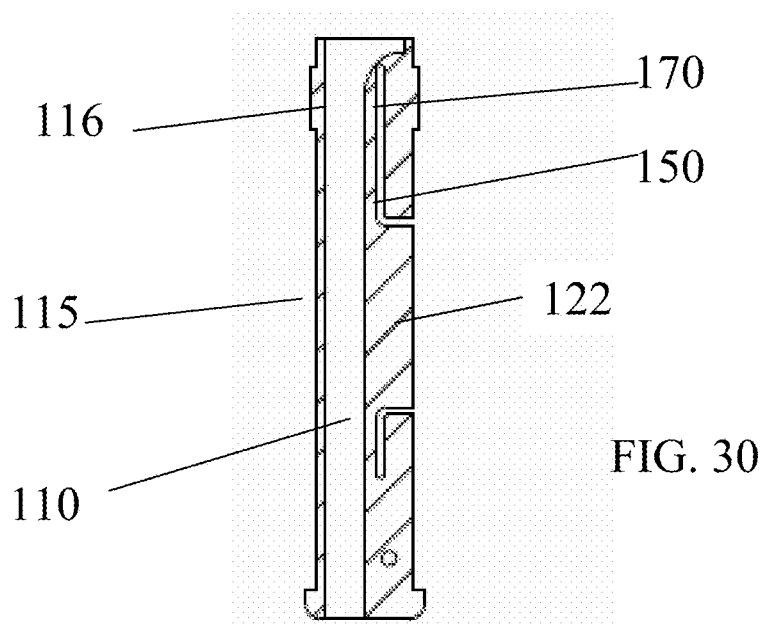
FIG. 30 is a cross-sectional side view of the elongated rod of FIG. 29 taken along section lines AA.
Figure 31:
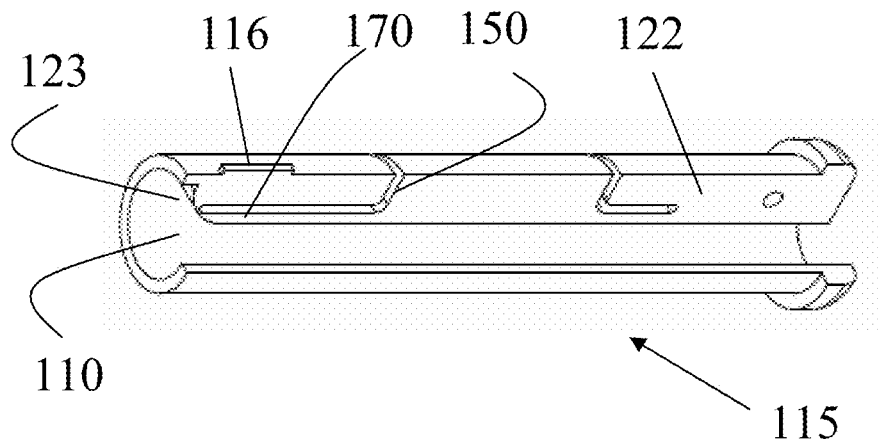
FIG. 31 is a perspective, cut away side view of the elongated rod of FIG. 29.
Figure 32:
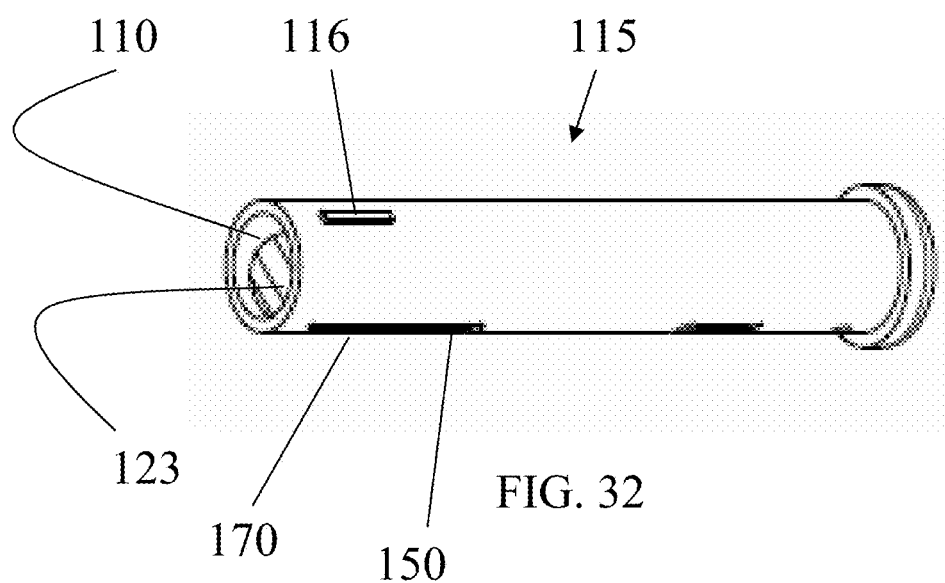
FIG. 32 is a perspective side view of the elongated rod of FIG. 29 showing the increase in channel diameter.

The assembly of one implementation of the stem guide 100 is illustrated in FIGS. 26-28. FIG. 26 is an expanded view of the stem guide 100 and a stick bobber 500, such as a stem of a stick bobber, that illustrates the arrangement of the components of both the stem guide and the stem. Referring also to FIGS. 27 and 28, the elongated rod 115 includes one or more alignment ridges 116 on its outside surface that are configured to mate within alignment grooves or slots 117 within the inner surface of the stem cup 120. In this manner, it is ensured that during assembly the extension 170 of the shoulder 150 and extension 170 will be properly aligned with the cutout section 175 of the stem cup. This is important to the reliable and consistent manufacture of the product because if the extension 170 of the shoulder and the cutout section 175 are not aligned, the stem guide may not function appropriately for slip bobber fishing.

Prior to mating the elongated rod 115 with the stem connector/cup 120, the sleeve 140 is placed over the rod. If not placed over the rod prior to assembly, the flange or stop 130 would prevent the sleeve from sliding onto the rod. The rod and stem connector or cup can be adhered together using an adhesive or other adhering means, e.g., heat, interference fit, etc. Once the rod, stem connector and sleeve are assembled, an optional weight 118 may be inserted into the open end 119 of the stem cup and adhered in position. Alternatively, another attachment method may be used to retain the weight within the stem cup. The weight 118 is useful when casting out with a fishing apparatus using the stem guide 100.

The assembled stem guide then may be combined with another piece of fishing tackle, such as the stick bobber 500. As illustrated in FIG. 26, the stick bobber 500 includes a stem 505, a float 510, a marker 515 and a grommet 520. The stem 505 has a longitudinal channel that is aligned with the channel 110 passing through the elongated rod so that a fishing line can be inserted into the elongated rod and passed into and through the longitudinal channel in the stem. The float 510 includes an internal longitudinal channel that receives the stem 505, and the two are held together using an adhesive, an interference fit, or other mating method known in the art. The marker 515 and grommet 520 are mounted to the other end of the stem and the grommet mounted to the longitudinal channel in the float with an adhesive, interference fit, etc. or combination.

FIGS. 29-32 show in more detail the configuration of the elongated rod that forms the stem of the stem guide. As noted above, the elongated rod includes the internal longitudinal channel 110 that runs the length of the rod from a first open end to a second open end. The body of the elongated rod therefore can be divided between the channel and the remainder of the body, which is a solid portion 122. The diameter of the channel 110 is sufficiently large such that it can receive a fishing line and have a negligible affect on the ability of the line to pass through the channel, such as during casting or reeling in the line. The shoulders are molded and positioned entirely or at least primarily within the solid portion 122 of the rod. This manufacturing process causes the shoulders to be smooth, radiused or rounded so they can cause minimal damage to the fishing line inserted within the channel 110. In addition, because of the large percentage of the rod that is the solid portion 122, the strength of the rod is increased in comparison to a similar extruded tube with a larger diameter channel.

Also of note in the configuration of the elongated rod 115 is the widened end 123 of the channel 110 which is positioned within the stem cup. The channel diameter at that end 123 increases such that the fishing line passing through the rod 115 will more easily pass into the channel in the stem of the attached stick bobber, light stick, scent stick, etc. The channel opening at the opposite end of the rod also may have an increased diameter relative to the majority of the length of the channel, such as by having a flared opening. In this manner, the angler can easily insert the line into the stem guide.

Figure 34:
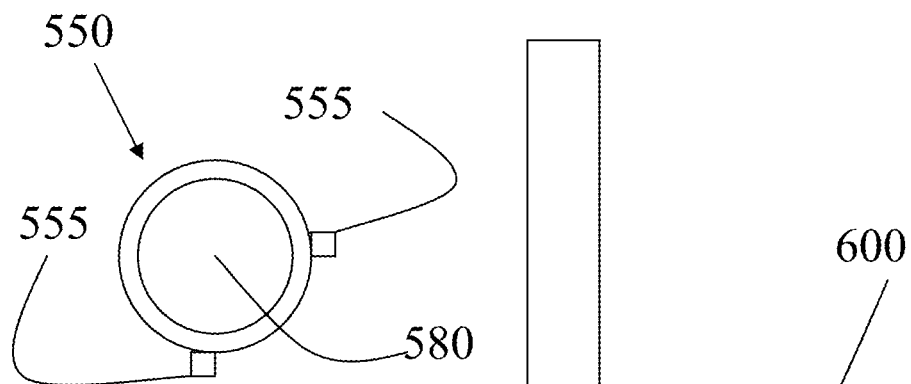
FIG. 34 is a top view of the stem guide of FIG. 33.
Figure 33:
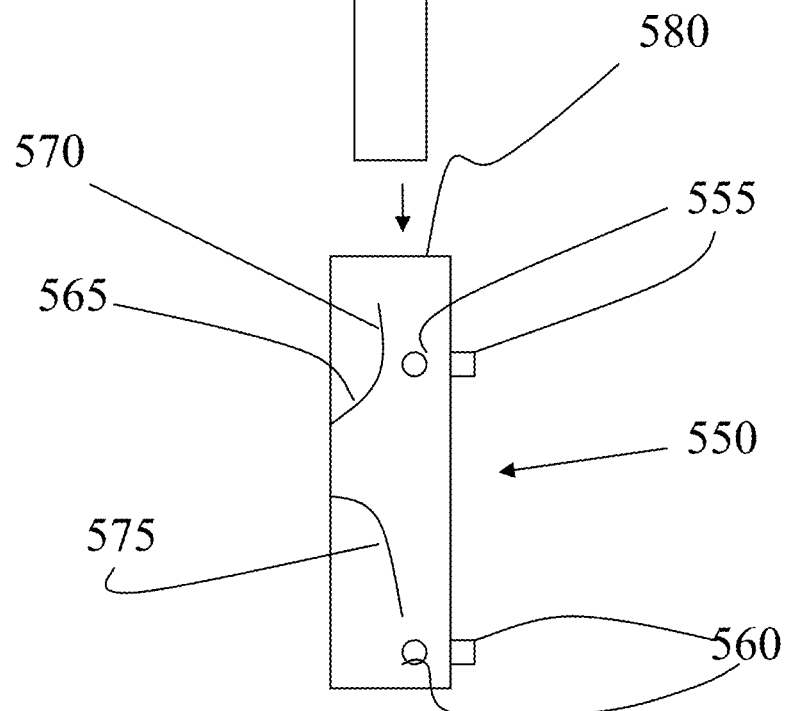
FIG. 33 is a front view of a stem guide and a fishing article for inserting into an open end of the stem guide.
Figure 38:
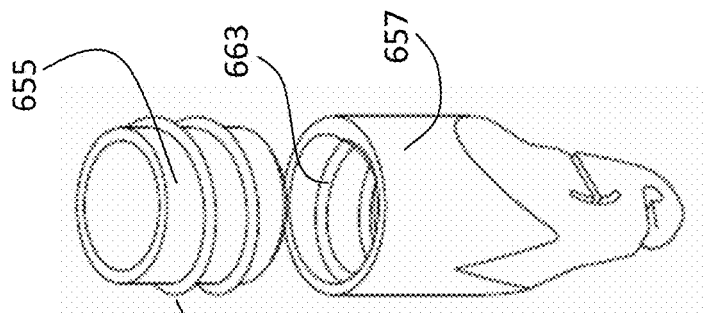
FIG. 38 is a perspective view of the stem guide of FIG. 35 and a cartridge attachment means for replaceably attaching a cartridge to the stem guide.
Figure 37:
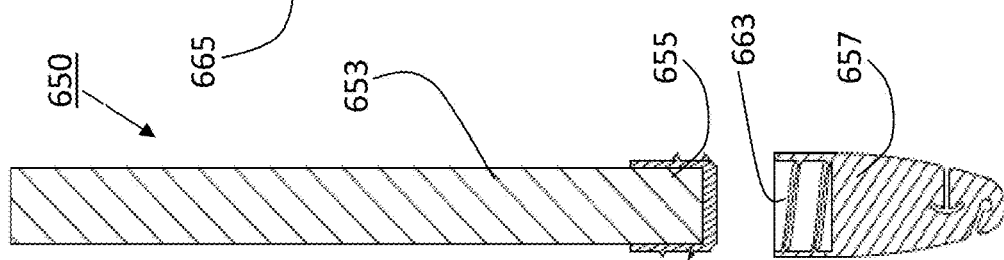
FIG. 37 is a cross sectional front view of the stem guide and replaceable cartridge of FIG. 35 taken along section lines 37-37.
Figure 36:
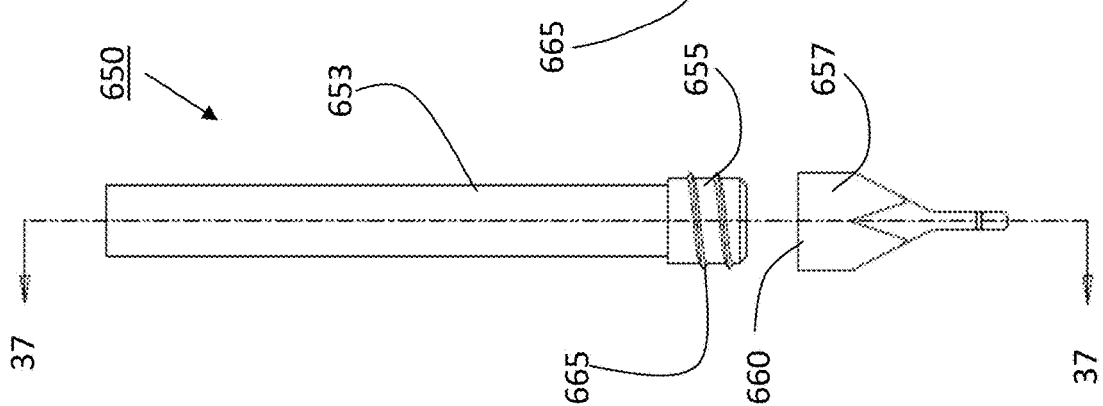
FIG. 36 is a side view of the stem guide and replaceable cartridge of FIG. 35.
Figure 35:
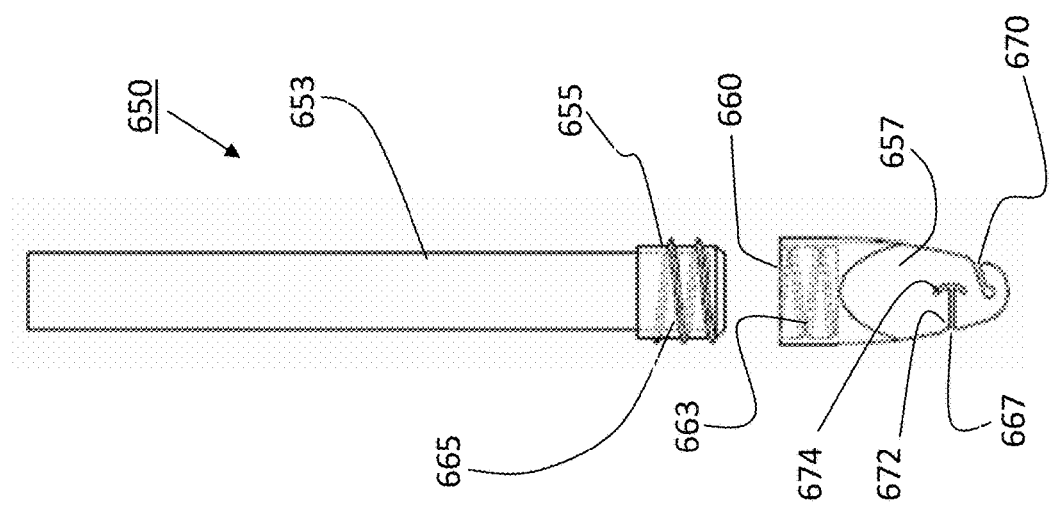
FIG. 35 is a front hidden line view of a stem guide and a removable and replaceable cartridge.
Figures 61, 62, 63, 64:
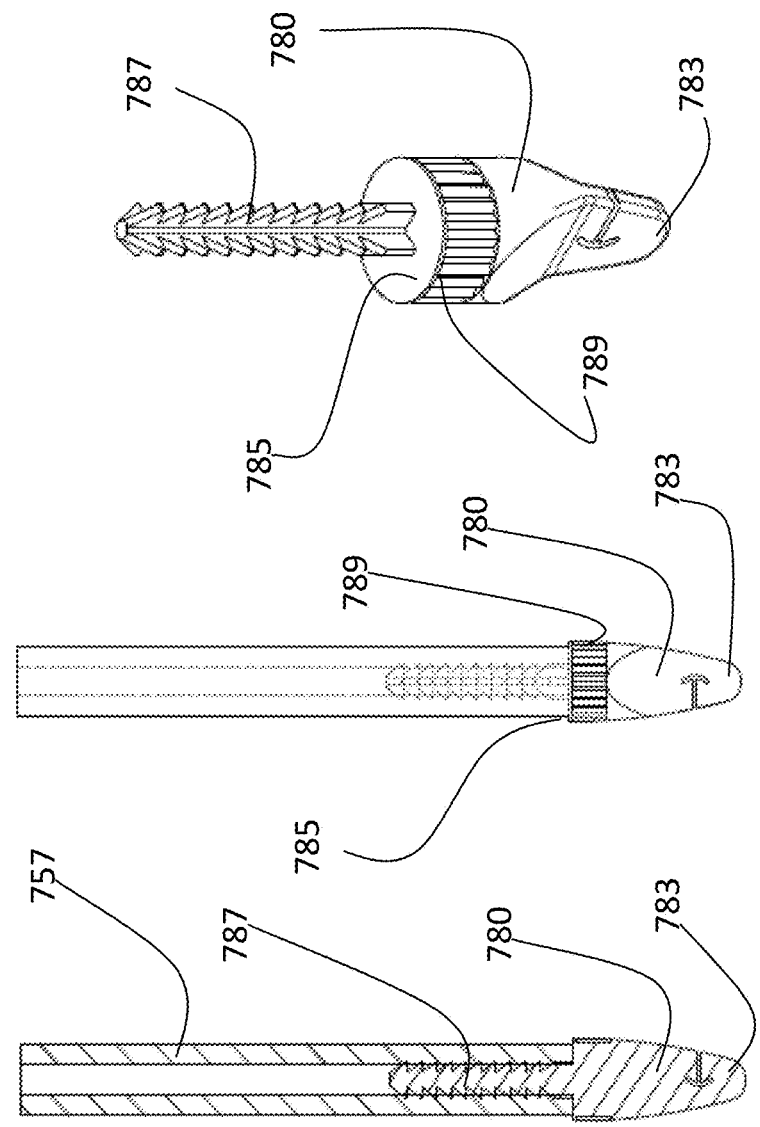
FIGS. 61-63 are side, cross-sectional front and front views, respectively, of a seventh implementation of a stem guide and replaceable cartridge using a prong to retain the cartridge to the stem guide.
FIG. 64 is a perspective view of the stem guide of FIGS. 61-63.
Figure 67:
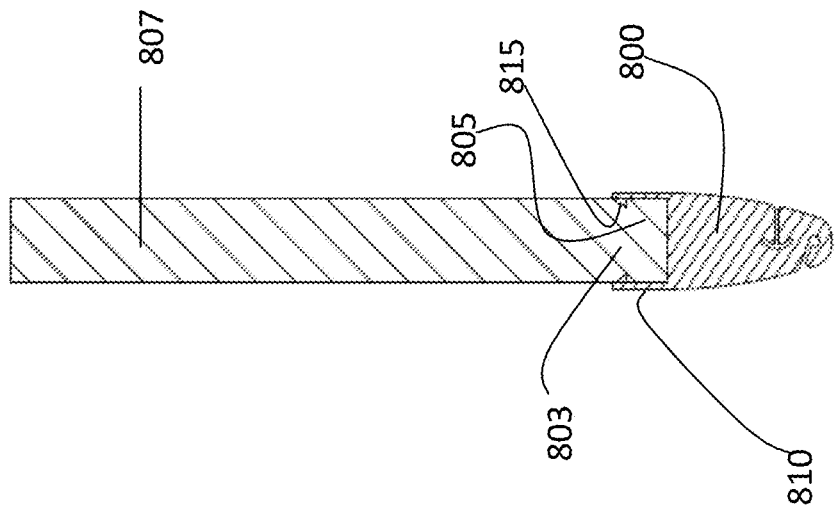
FIGS. 65-67 are front, side and cross-sectional front views, respectively, of a eighth implementation of a stem guide and replaceable cartridge.
Figure 66:
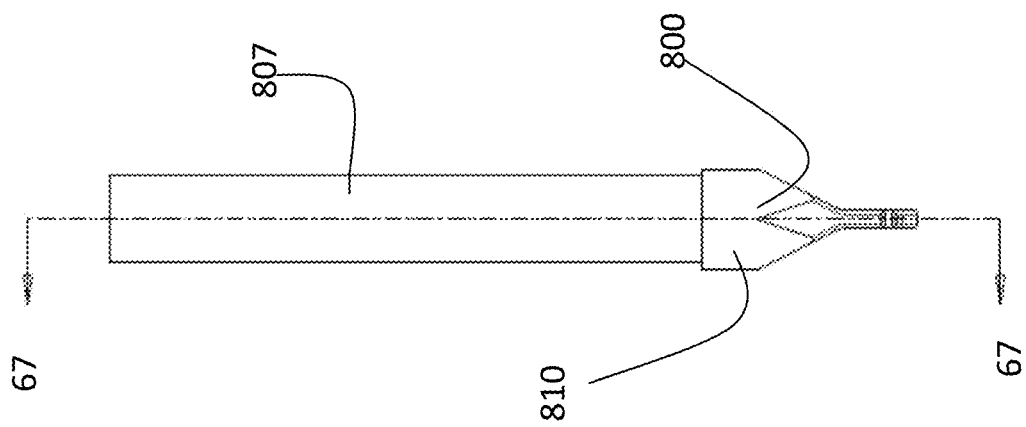
Figure 65:
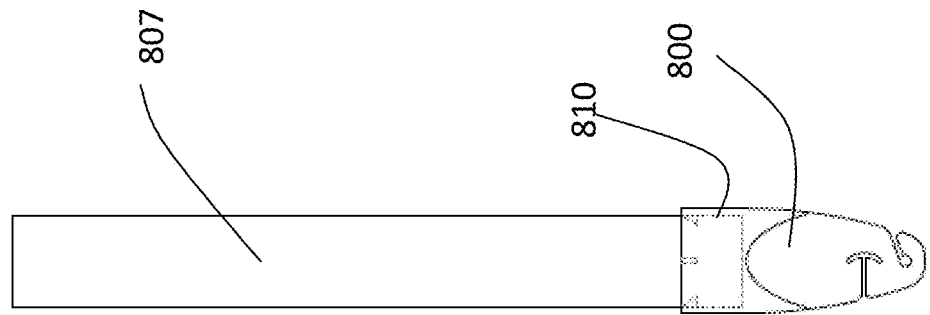

Referring to FIGS. 33 and 34, in another configuration a stem guide consists of an elongated rod 550 that has a pair of line shoulders 565 and 575 and multiple line stops 555 and 560. A movable sleeve (not shown), such as a spring, is positioned between the line stops 555 and 560. Generally, the sleeve will be maintained in compression between the line stops 555 and 560. The line stops are arranged relative to the line shoulders to permit fixed fishing and winter slip bobber fishing. The line shoulder 575 is positioned entirely between the line stops 555 and 560. In this manner, a fishing line positioned in the line shoulder 575 would be compressed by the sleeve against a surface of the elongated rod 550 such that the fishing line cannot move or slide through the line shoulder 575 and thereby functions for fixed bobber fishing. In contrast, the line shoulder 565 has an extension 570 that extends along the length of rod but on the opposition side of the line stop 555 relative to the shoulder 565. Because of this configuration, the sleeve cannot extend beyond the stops 555 and 560 and would not slide over the extension 570. In this manner a fishing line positioned within the line shoulder 565 would be advanced by the sleeve into the extension 570 such that the fishing line can move or slide within the extension 570 and function for winter slip bobber fishing.

The elongated rod 550 also has a lumen 580 along its length to permit summer slip bobber fishing. The lumen is oversized for purposes of carrying a fishing line but because of its diameter a fishing article, such as a light stick, scent stick or bobber stem 600, or part thereof, can be press fit or adhered within the lumen. With this configuration, the elongated rod also functions as a stem guide, but without the need to add a second part, i.e., the stem cup, and the elongated rod can be extruded or molded. If the rod is extruded, the line shoulders can be cut into the rod and then radiused or smoothed. The line stops can be mounted using conventional means. Alternatively, if the rod is molded, the line stops and line shoulders can be molded at the same time. The injection molded rod also can be molded such that the line stops are configured to be flanges or ridges around all or part of the outer circumference of the rod. In either method, the sleeve can be placed over the line stops and be maintained in compression between the line stops.

To use the stem guide for fixed bobber fishing, the angler compresses the sleeve up to expose the line shoulder 575 and passes the fishing line into the line shoulder. The angler then releases the sleeve to fix the position of the fishing line in the shoulder 575. To use the stem guide for winter slip bobber fishing, the angler compresses the sleeve down to expose the line shoulder 565 and passes the fishing line into the line shoulder. The angler then releases the sleeve to allow the fishing line to be forced into extension 570. Before or after the position of the fishing line in the line shoulder is set, the angler can attach a fishing article to the stem guide by inserting the article into the open end of the lumen. An adhesive may be used if desired. If the angler wishes to use the stem guide for summer slip bobber fishing, the fishing article should first be inserted into the stem guide and then the fishing line passed through the lumen in the fishing article and the lumen of the stem guide.

It is expected that the elongated rod can be extruded and the line shoulders formed within the rod such that the edges are smoothed or radiused. The stem cup then can be mounted to the rod if necessary. Also, the elongated rod and stem cup can be molded as either a single piece or two separate pieces that later are joined. The stem guide may be an integral part of a piece of fishing tackle, such as a bobber, light stick or scent stick.

The inventor also has developed a fishing stem guide and system that permits an angler to use a stem guide configured to allow a first cartridge to be easily replaced with a second cartridge without destruction to either the stem guide or the cartridge such that the stem guide or cartridge cannot be used again. The stem guide can be configured as the stem guides describe above, modified from those described above, or as follows to provide a replaceable cartridge fishing apparatus. The cartridge may be, for example, a float, a scent stick or a light stick. The float may be configured to receive a scent stick or a light stick. For example, the float may have an inner channel that has at least one opening on an end into which the scent stick or light stick can be inserted. The float may be configured to have an absorbable pouch, surface or section that can be dipped or otherwise wetted with a fishing scent.

Referring to FIGS. 35-38, in one implementation a stem guide system 650 includes a replaceable cartridge, such as a float 653, that is removably attached to a stem guide 657 having a cartridge attachment means for attaching the cartridge to the stem guide. The float 653 includes an attachment means 655 positioned at one end of the float. In system 650, the attachment means 655 is a hollow tube having an exterior surface with threads 665. To mate the cartridge attachment means with the attachment means 655, the float 653 and attachment means 655 are inserted into an open end 660 of the stem guide such that the threads 665 mate with threads 663 on an internal surface of the stem guide.

The float 653 can be attached to the attachment means 655 in a number of manners. The two can mate together merely through an interference fit. However, the interference fit can be augmented with an adhesive bonding between the outer surface of the float and the inner surface of the attachment means. In another attachment method, heat, an adhesive or a solvent can be used to bond or otherwise affix the attachment means to the float.

The stem guide 657 is attached to a fishing line using a line attachment means 667 or one of those otherwise described herein. Line attachment means 667 is generally T-shaped with a slotted opening 672 in the stem guide connecting to a second slot 674 connecting to and extending generally perpendicularly from the first slotted opening 672. In this manner, a fishing line can be easily inserted into the first slotted opening and pulled into the second slot 674. When the fishing line is within the second slot, the line is unlikely to pass out of the second slot into the first slotted opening 672 of its own accord. This configuration thereby ensures the fishing line remains positioned securely within the stem guide.

The stem guide 657 also includes a weight attachment means 670 that includes a narrow slot into the stem guide that terminates in a larger diameter opening. The weight includes a line that is pulled through the slot into the larger diameter opening. This configuration also ensures that the weight remains positioned securely within the stem guide.

To use the stem guide system 650, the angler selects a float having particular characteristics, such as length, diameter, color, and presence or absence of an internal channel passing through the length of the float. It is expected that the float 653 will be provided with the attachment means 655 already positioned around the float. The angler then threadably inserts the attachment means 655 into the cartridge attachment means of the stem guide, including the threaded opening 660 of the stem guide. The angler inserts the attachment means 655 into the opening 660 until the attachment means is firmly mated with the threaded opening of the cartridge attachment means. The angler then inserts the fishing line into the line attachment means 667 and proceeds to use the float in the water.

While the system 650 has been described with reference to a float 653, it should be understood that another type of apparatus may be used, such as a light stick or scent stick, if desired.

Similarly, although system 650 has been described with reference to a threaded attachment means and a threaded cartridge attachment means, other configurations can be used to mate the cartridge and stem guide. For example, the attachment means can include protrusions and the cartridge attachment means can include channels such that the protrusions are inserted into the channels and twisted in one direction to attach and the opposite direction to remove.

Referring to FIGS. 39-41, in a simplified version of the system 650, a system 680 differs by the elimination of the threaded attachment means 655. The system 680 includes the float 653 and stem guide 657 with the cartridge attachment means as used in the system 650. The stem guide 657 has an open end 660 that has threads 663 on its inner surface. A fishing line can be inserted into either the line attachment means 667 or other means described herein.

To use the system 680, an angler selects a cartridge or float 653, which is not attached to a threaded attachment means, and inserts the float into the open end 660 thereby mating the cartridge with the cartridge attachment means. By pressing down or inserting in a downwardly threading manner, the angler fixes the float within the stem guide 657. The threads 663 form an interference fit with the float to keep the float within the stem guide. To remove the float, the angler pulls outwardly with or without a threading movement of the float relative to the stem guide. The float can be used again at a later time and the stem guide can be used again to receive a float, bobber, scent stick, light stick, or the like.

Referring to FIGS. 42-46, in another implementation of a stem guide system that permits replacement of the cartridge from the stem guide, a stem guide 700 includes a cartridge attachment means that includes an attachment opening 703 into which the cartridge 653 is inserted. The attachment opening is made up of multiple flaps 706 that extend from the stem guide along the longitudinal axis of the stem guide and form a channel 709 to receive the cartridge. The flaps 706 are configured to be resilient with an inward tendency or bias. An elastic band or ring 712, made up of any elastic or slightly elastic material such as rubber, plastic and metal for example, surrounds the outer surface, or a portion of the outer surface, of the flaps 706. In this configuration, when a cartridge is inserted into the channel 709, the ring 712 restrains an outward movement of the flaps. The ring 712 may be positioned within a groove 715 on the outer surface of the flap formed by a lip 718 extending from the flap as one boundary, the flap itself as a second boundary, and a ridge 721 as another boundary. The ridge 721 is configured such that the angler can slide the ring 712 over the ridge and down the length of the flaps to allow the channel 709 to be opened wider, for example to insert or remove a cartridge.

Upon inserting the cartridge 653 into the channel 709, the angler then can slide the ring 712 over the ridge 721 into the groove 715. When the ring 712 compresses the flaps 706 against the cartridge, the flaps form an interference fit with the cartridge 653 to ensure the cartridge is retained in the channel 709 of the stem guide.

The flaps 706 optionally may include one or more projections or protrusions 723 on an inner surface of each flap. When a cartridge is inserted into the channel 709 and the ring 712 put into position, the projections 723 will be pressed into or against the cartridge. In this manner, the projections 723 will further ensure that the cartridge is retained within the channel.

Referring to FIGS. 47-50, in another implementation of a stem guide system that permits replacement of the cartridge from the stem guide, a stem guide 730 has a cartridge attachment means that includes an opening 733 of a channel 735 into which the cartridge 653 is inserted. The channel 735 passes between the 733 opening and a base 737. The stem guide 730 includes a magnet 739 embedded within the base. The cartridge 653 includes an attachment means 741 that is a portion of a hollow tube having an open end and a closed end at the opposite end. The closed end includes a magnet 743 embedded within it to form the attachment means 741. The cartridge 653 is mounted within the open end of the cartridge attachment means. The cartridge may be mounted within the attachment means 741 using an interference fit, heat, adhesive, solvent, mechanical or other means. When the cartridge 653 and attachment means 741 are inserted into the cartridge attachment means, i.e., into the channel 735 of the stem guide, the magnets 739, 743 are attracted thereby retaining the attachment means and cartridge within the channel against the stem guide.

Referring to FIGS. 51-55, in another implementation of a stem guide system that permits removal and replacement of the cartridge from the stem guide, a stem guide 750 has a cartridge attachment means that includes an opening 753 of a channel 755 into which a cartridge 757 is inserted. The channel 755 is formed from a wall that defines the channel. The channel passes between the opening 753 and a base 760. A prong 763 extends outwardly from the base 760 through the opening 753. The prong 763 is configured to receive a cartridge having an internal channel extending at least a portion of the length of the cartridge. As illustrated in FIGS. 51-55, the cartridge 757 includes a longitudinal channel 765 extending its entire length. The cartridge 757 is placed into the opening 753 with the prong 763 inserted into the channel 765. To replace the cartridge 757 with a different cartridge, such as one of a different length, color, shape, or purpose (e.g., float, light stick, scent stick), the angler merely pulls the cartridge out of the channel 755 and off of the prong 763.

The prong 763 may optionally include a surface configured to restrain the removal of the cartridge from the prong. As best illustrated in FIGS. 54 and 55, a portion of the length of the prong includes barbs or projections 767 extending from the prong. When the cartridge 757 is inserted onto the prong, the barbs cause both an interference fit and a slight embedment into the cartridge to restrain removal of the cartridge from the prong. Although barbs are illustrated on the prong 763 of FIGS. 51-55, another restraining means can be used, such as ridges, grooves, protrusions, a roughened surface, or a soft surface that conforms to the surface of the channel in the cartridge to restrain the ability of the cartridge to fall off of the prong but yet permits the angler to remove the cartridge without damage to the prong or the cartridge. A small amount of adhesive may be used to assist in retaining the cartridge to the stem guide. The adhesive may be between the prong and the cartridge, between the channel wall 755 and the cartridge or between the base 760 and the cartridge. In these configurations, the stem guide will not be damaged upon removal of the cartridge such that the stem guide cannot be used again. However, it is possible that the cartridge will be damaged and unable to be used again.

Referring to FIGS. 56-60, in a modification of the stem guide 750, the opening into the channel of the stem guide is eliminated such that a prong for mounting a cartridge extends from an exposed base. The stem guide 770 of FIGS. 56-60 has a cartridge attachment means that includes a base 773 from which a prong 775 extends. The cartridge 757 is inserted over the prong 775 until an end of the cartridge rests against the base. The prong 775 may optionally include barbs or projections 777, as illustrated in FIGS. 56-60. When the cartridge 757 is inserted onto the prong, the barbs cause both an interference fit and a slight embedment into the cartridge to restrain removal of the cartridge from the prong of the cartridge attachment means. Although barbs are illustrated on the prong 775 of FIGS. 56-60, another restraining means can be used, such as an adhesive, ridges, grooves, protrusions, a roughened surface, or a soft surface that conforms to the surface of the channel in the cartridge to restrain the ability of the cartridge to fall off of the prong but yet permits the angler to remove the cartridge without damage to the prong or the cartridge. For example, a small amount of adhesive may be used to assist in retaining the cartridge to the stem guide. The adhesive may be between the prong and the cartridge or between the base 773 and the cartridge. In this configuration, the stem guide will not be damaged upon removal of the cartridge such that the stem guide cannot be used again. However, it is possible that the cartridge will be damaged and unable to be used again.

Referring to FIGS. 61-64, in a modification of the stem guide 750 and 770, but applicable to the other stem guides described herein, a stem guide 780 includes a first end 783 for attaching a fishing line and a weight and a second end 785 from which a prong 787 extends. A surface 789 of the stem guide is knurled or otherwise provided with a surface around the circumference of the stem guide such that the angler can easily hold the stem guide to remove the cartridge, for example, by a gripping the knurled surface and applying a turning motion to the stem guide relative to the cartridge while pulling the cartridge from the stem guide. Although FIGS. 61-64 illustrate a knurled or ribbed surface, any other surface may be applied or imparted that will provide an easily gripped surface. This surface will reduce the likelihood that the stem guide will slip in the angler's hands when the stem guide is still wet after being pulled from the water with the intent of replacing the cartridge with a different cartridge. In this configuration, the stem guide will not be damaged upon removal of the cartridge such that the stem guide cannot be used again. However, it is possible that the cartridge will be damaged and unable to be used again.

Referring to FIGS. 65-71, in another implementation of a stem guide that can be used with a replaceable cartridge, a stem guide 800 has a cartridge attachment means that includes an opening 803 into a channel 805 for receiving a replaceable cartridge 807. The channel 805 is formed by a wall 810 that extends from a base 813. The wall 810 includes projections or protrusions 815 that extend from an inner surface of the wall 810 into the channel 805. When the cartridge 807 is inserted into the channel 805, the projections 815 restrict the ability of the cartridge to be removed from the channel, thereby retaining the cartridge 807 to the stem guide 800.

A variety of cartridge attachment means and attachment means have been described. Other configurations are applicable as well. For example, the cartridge attachment means and attachment means can be made up of a hook and loop system, e.g., such as Velcro®. The stem guide can have a cartridge attachment means that is made up of one part of a hook and loop system and the attachment means is made up of the other part of the hook and loop system. When the cartridge is attached to the stem guide, the cartridge attachment means mates with the attachment means.

In another configuration, the cartridge attachment means may be protrusions that made with grooves in the attachment means. In another embodiment of this implementation, the cartridge attachment means may be grooves and the attachment means may be protrusions. In either embodiment, the cartridge may be inserted in a turning manner.

In another configuration, the cartridge attachment means may be a flap or flaps that include one or protrusions that mate with grooves or a groove within the attachment means of the cartridge. The flaps are pulled outwardly, the cartridge inserted into a channel formed by the flaps and the flap or flaps then released such that the protrusions are inserted into the grooves or groove. To remove the cartridge, the flap or flaps are pulled outward and the cartridge removed. In any of these embodiments, an amount of adhesive may be used. Alternatively, the embodiments may be free of an adhesive to retain the cartridge to the stem guide.

The embodiments above showing a stem guide with a prong can be configured with the prong having threads on its outer surface and the cartridge having a threaded inner channel. In this manner, the cartridge is threadably attached to the prong and retained together in that manner. Any other known means that can be used to removably connect two items together.

While several particular forms of the invention have been illustrated and described, it will be apparent that various modifications can be made without departing from the spirit and scope of the invention. For example, as illustrated in FIG. 72, the stem guides illustrated in FIGS. 16-32 can be modified to receive a replaceable cartridge. FIG. 72 illustrates a stem guide 830 that differs in part from those of FIGS. 16-32 by a portion of the stem cup being removed and a prong 840 extending from a surface 835 of the stem guide. As described above with respect to FIGS. 51-64, the cartridge is removably inserted over the prong. In FIG. 72, arrow B indicates the direction of movement of the spring for inserting a fishing line into the stem guide 830. The stem guides of FIGS. 16-32 also can be modified according to the embodiments illustrated in FIGS. 35-71 and the other embodiments described but not illustrated above. The stem guide 830 may be a single piece component in which the stem guide and cartridge attachment means, e.g., the prong, may be injection molded or formed as a single piece. Alternatively, the stem guide may easily be formed from two or more pieces and assembled. In fact, the majority of the stem guides described above may be made as single pieces, by injection molding for example, or assembled from multiple pieces.

Figure 73C:
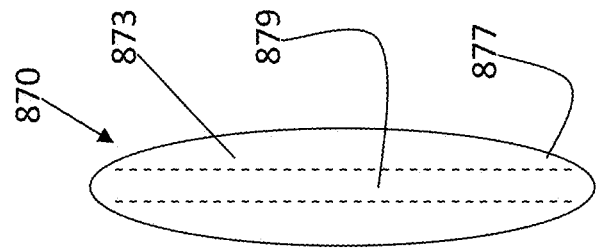
FIGS. 73a-c are front views of three replaceable cartridges having different shapes.

The replaceable cartridges can be of a variety of shapes, materials and configurations for mounting to the stem guide. For example, referring to FIG. 73a, a replaceable cartridge 850 includes a float portion 853 and an attachment means 857 for mounting to the cartridge attachment means of a stem guide. The float portion of the cartridge 850 is generally pear shaped such that when a fish takes the hook there will be a gradual increase in resistance caused by the float. FIG. 73a illustrates a channel 859 into which a prong 855 extending from a stem guide (not shown) would be inserted. The position of the prong 855 is illustrated in FIG. 73a as if the cartridge 850 were mounted to the stem guide having a prong. The attachment means 857 can be configured to mount to any stem guide, for example by including a thread along its outside surface, a threaded surface on the channel 859 running the length of the cartridge and mating with a threaded prong on the stem guide, a surface that forms a friction fit with the inner channel of the stem guide, etc. The choice of materials for fabricating the cartridge can be a conventional material such as a plastic or foam, e.g., polystyrene, Styrofoam, polycarbonate, rubber, cork, polyethylene, balsam wood etc. The material can be selected for improving the attachment of the cartridge to the stem guide. The cartridge can be extruded or injection molded to have a lengthwise shape, such as slots or protrusions. Extruded polyethylene has been found to be particularly suitable as a buoyant cartridge.

It should be understood that in some configurations herein, the stem guide will not be damaged upon removal of the cartridge such that the stem guide cannot be used again. However, it is possible that the cartridge will be damaged and unable to be used again.

Figure 73B:
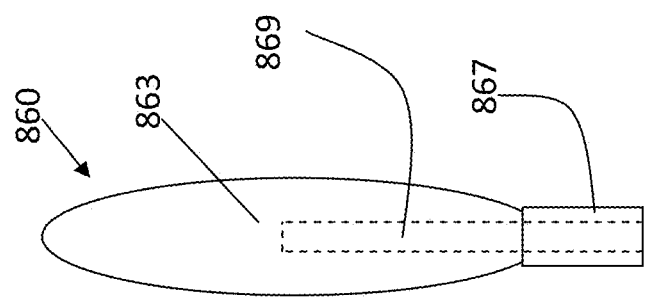
Figure 73A:
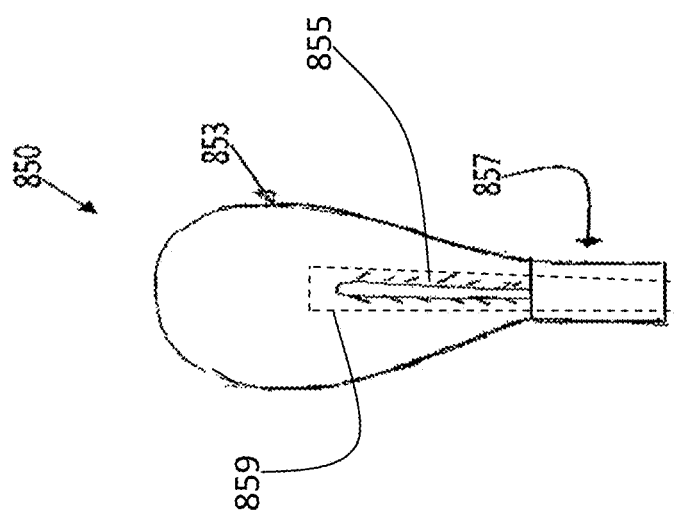

Referring to FIG. 73b, a replaceable cartridge 860 includes a float portion 863 and an attachment means 867 for mounting to the cartridge attachment means of a stem guide. The cartridge attachment means of the stem guide may have a channel into which the attachment means 867 is inserted. The float portion of the cartridge 860 is elongated with a torpedo shape along its length. In this manner when a fish takes the hook there will be a gradual increase in resistance caused by the float being pulled into the water. As described above, the attachment means 867 can be configured to mount to any stem guide and the material can be selected for improved attachment of the cartridge to the stem guide. FIG. 73b illustrates the cartridge 860 having a channel 869 for receiving a prong (not shown) on a stem guide (not shown).

Referring to FIG. 73c, in a modification of the replaceable cartridge 860, a replaceable cartridge 870 does not include the elongated attachment means 867 but instead includes an attachment means 877 that is an end of a float portion 873. The attachment means 877 for mounting to a cartridge attachment means of a stem guide includes a channel 879 that extends the length of the cartridge. In this configuration, the angler mounts the cartridge over a prong (not shown) extending from a stem guide. As described above, the attachment means 877 can be configured to mount to any stem guide and the material can be selected for improved attachment of the cartridge to the stem guide.

Figure 74A:
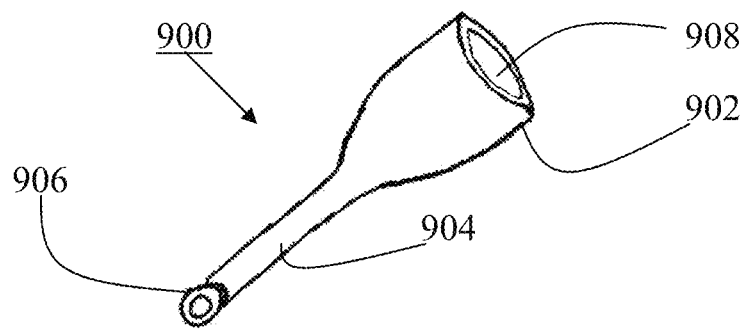
FIGS. 74a-c are perspective view of a modified stem guide for replaceable cartridges having an eyelet for retaining a fishing line.

Referring to FIG. 74a, in a modification of the replaceable cartridges described above, a stem guide 900 includes a stem cup 902, an elongated rod 904 and an eyelet or closed wire loop 906 at an end of the elongated rod. Such eyelets or closed wire loops are more often used for fishing in Europe and other regions outside of the United States, than in the United States. The stem cup 902 has an open end 908 into which a float or other buoyant member is inserted. The cup 902 can be configured according to the embodiments described above such that the float can be held in place temporarily or permanently. For example, the float can be held in place with an adhesive, a threaded interaction (e.g., FIGS. 35-41), an elastic band (FIGS. 42-46), magnets (FIGS. 47-50), a prong with barbs extending from the cup (e.g., FIGS. 51-55), or a friction fit (FIGS. 65-71). The stem guide will not be damaged upon removal of the cartridge such that the stem guide cannot be used again. However, it is possible that the cartridge will be damaged and unable to be used again.

Figure 74B:
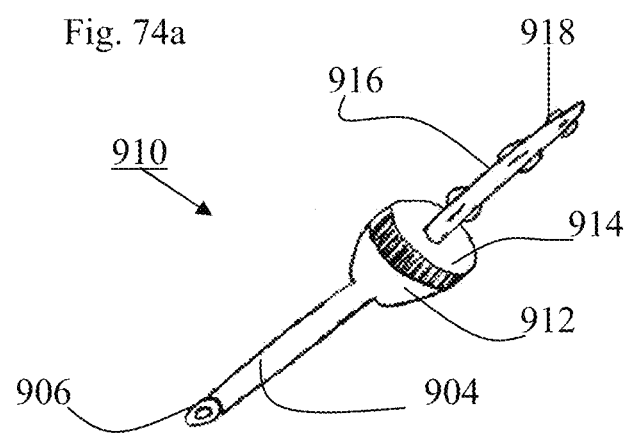

As further illustrated in FIG. 74b, a stem guide 910 includes an end 912 having a flat surface 914 from which a prong 916 extends. The prong 916 includes barbs or protrusions 918. The prong is configured to receive an article of fishing tackle or cartridge, such as a float, light stick or the like. The cartridge is pushed over the prong until it rests against the surface 914. A small amount of adhesive may be placed on the surface to better retain the cartridge to the stem guide. Like FIG. 74a, the stem guide also includes an elongated rod or stem 904 having an eyelet or closed wire loop 906 at the end.

Figure 74C:
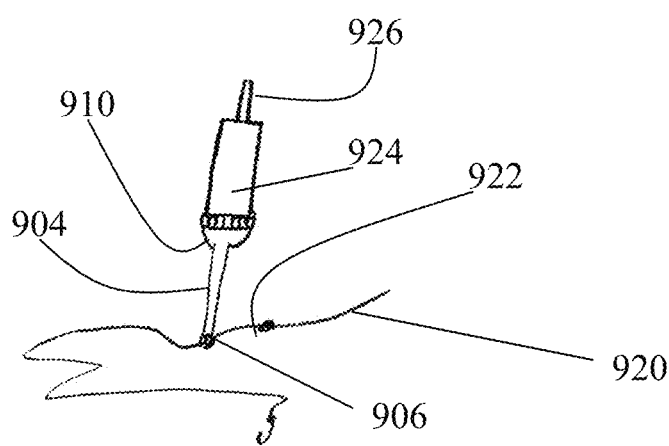

As further illustrated in FIG. 74c, the stem guide 910 can be used for slip bobber fishing by passing a fishing line 920 through the eyelet 906. A bobber stop 922 is placed on the fishing line to interact with the eyelet and cause the line to stop passing or sliding through the eyelet. A cartridge 924, such as a float, is placed around the prong 916 and held in place at least through the interaction between the barbs 918 and an inner channel of the cartridge. The cartridge further includes a viz-stick 926 inserted into the channel I the cartridge and extending outwardly beyond the cartridge. The viz-stick allows for the angler to more easily see the cartridge and know its location, as well as watch for strikes by a fish.

Figure 75A:
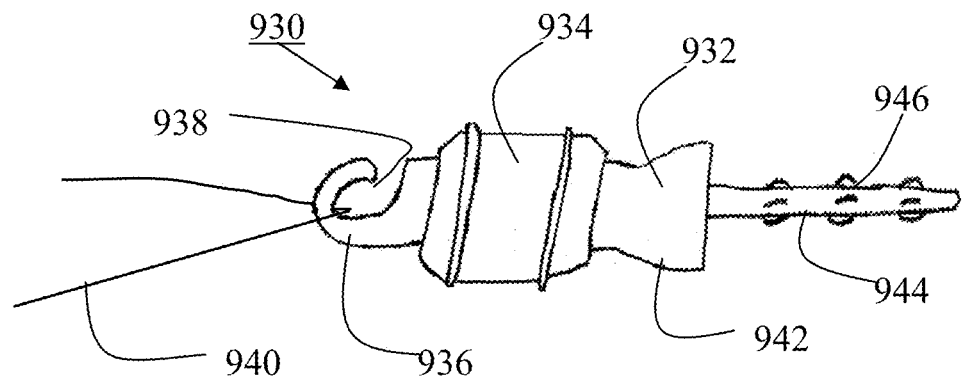
FIGS. 75a-c and 76 are side views of a modified stem guide for replaceable cartridges having a hook and sleeve for retaining a fishing line.
Figure 75B:
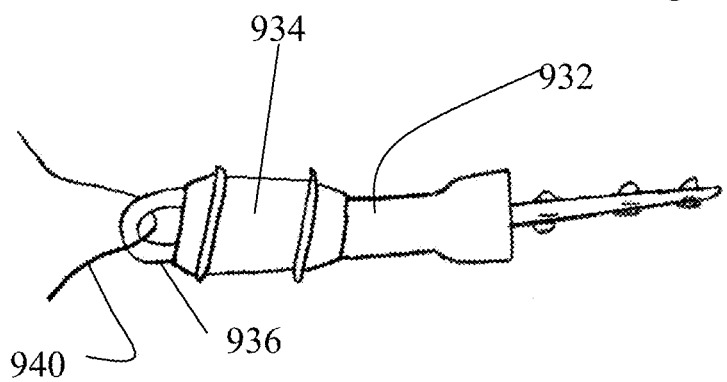
Figure 75C:
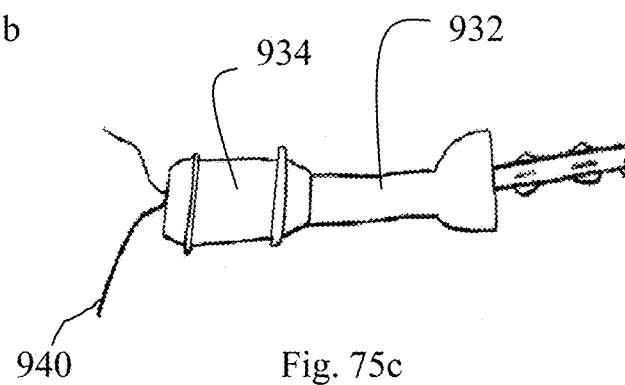

Referring to FIGS. 75a-c, in another implementation of the replaceable cartridges discloses herein, a stem guide 930 includes a body 932 over which a sleeve 934 can slide. The sleeve can slide in the direction of a prong 944 extending from a base 942 or in the direction of a hook 936. As illustrated in FIG. 75a, the sleeve 934 is intermediate between the hook 936 and the prong 944. In this manner, an opening 938 is formed into which a fishing line 940 can be inserted. FIG. 75b illustrates the sleeve moved further in the direction of the hook 936 such that the opening 938 is closed and the position of the hook relative to the sleeve forms a channel through which the fishing line 940 passes. Because the opening is closed, the fishing line cannot be pulled laterally out of the channel. If a line stop (not shown) is used on the fishing line, the stem guide can be used for slip bobber fishing. As illustrated in FIG. 75c, by further pushing the sleeve 934 over the body 932 in the direction of the hook 936, the fishing line can be wedged in place between the sleeve and the hook, which prevents the fishing line from sliding through the stem guide. In this manner the stem guide can be used for fixed bobber fishing. Although not shown in FIGS. 75a-c, a replaceable cartridge, such as a float, can be placed over the prong 944. The cartridge can be inserted over the prong and held in place by the barbs or protrusions 946 without more or an adhesive can be additionally applied.

Figure 76:
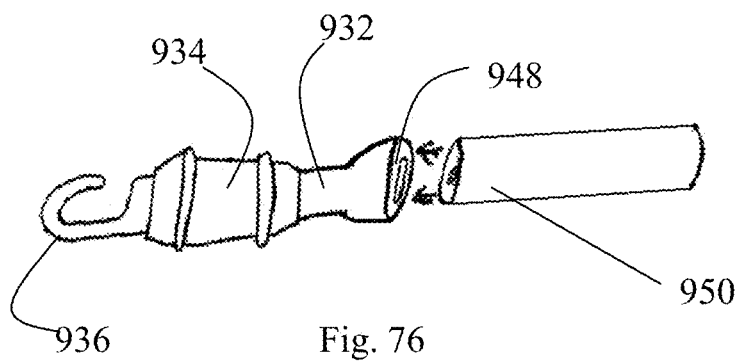

Referring to FIG. 76, in another implementation the stem guide 930 can have a cup 948 instead of a flat surface at one end. The cup can be used to receive a cartridge 950. The cartridge is received within the cup and held in placing using any or more of the methods described herein, e.g., magnets, friction fit, adhesive, threaded, etc. The type of stem guide bottoms illustrated in FIGS. 75a-c and 76, i.e., a hook with a movable sleeve, is used primarily in Europe rather than in the United States.

Referring to FIGS. 77a-c, the systems described herein with a buoyant member can be modified to minimize the resistance a fish would feel upon striking a lure or bait used with the stem guide and replaceable buoyant member. The modification is accomplished by cutting the buoyant member such that a top surface of the buoyant member is approximately flush with the top surface of the water when used with hook, lure or bait, sinker, etc. The buoyant member is made of a material that floats in water but can be cut using, for example, a knife, scissors, or torn off by hand. Suitable materials that can be cut include a conventional material such as a plastic or foam, e.g., cork, polyethylene, balsam wood, etc. The buoyant member, or cartridge, can be extruded or injection molded. Extruded polyethylene has been found to be particularly suitable as a buoyant member or cartridge.

By minimizing the length of the buoyant member, and hence its buoyancy, when a fish strikes the bait or lure and takes the line, there will be a minimum resistance of the buoyant member in the water. The buoyant member can be cut such that the top surface is above the water surface, partially below the water surface or flush with the water surface.

Because the top surface of the buoyant member will be approximate the surface of the water, the angler will likely find it difficult to see the buoyant member. This can be problematic to know whether a fish has struck the bait or lure. To address this need, the buoyant member can be fitted with a viz stick, light stick or other visualization article. The buoyant member may have a channel along its length that is of a similar inner diameter as the outer diameter of the viz stick, light stick or other visualization article. The viz stick is inserted into the channel where it is retained and extends above the top surface of the buoyant member. In this manner, the angler can easily see the position of the line and whether or not a fish is striking the bait or lure. The length of the viz stick can be adjusted by the angler if desired. For example, the viz stick can be made of an extruded plastic that is selected to have a bright color and be easily cut. The viz stick can be hollow or solid. It also can have a phosphorescent coating such that it will emit light to further improve visualization of the viz stick.

FIGS. 77a-c illustrate the stem guide 952 with a hollow buoyant member 954 mounted over a prong 956. The other versions of stem guides and stem connectors described herein can be used in the embodiment illustrated in FIGS. 77a-c. FIG. 77a illustrates the stem guide 952 with the uncut buoyant member positioned over the prong 956. FIG. 77b illustrates the buoyant member 954 as being a simple hollow tube with a channel 958 along its length. It should also be understood that the buoyant member can alternatively be a solid tube.

FIG. 77c illustrates the buoyant member 954 being cut to have a buoyancy that is approximately equal to the weight of the lure or bait, hook, sinker, etc. that together pull the buoyant member into the water. FIG. 77c also shows a viz stick 960 being positioned in the channel 956 such that the viz stick extends above the water so that it can be seen by the angler even if they buoyant member cannot be seen.

In another embodiment, the buoyant member can be solid but sufficiently soft such that a rigid viz stick with a pointed end can be inserted into the material. The viz stick can be a hollow, extruded tube in which the end is sharpened, for example by cutting. The cut end then can be pushed into the buoyant member. It should be understood that a viz stick of this configuration can be used with either a hollow buoyant member or a solid buoyant member. Similarly, a solid extruded viz stick can have a sharpened end formed by the process of cutting the individual viz sticks from the extruded tube. Such viz sticks can be used with either hollow or solid buoyant members. Viz stick are available from Rod-n-Bobbs of Eau Claire, Wis.

Figure 77D:
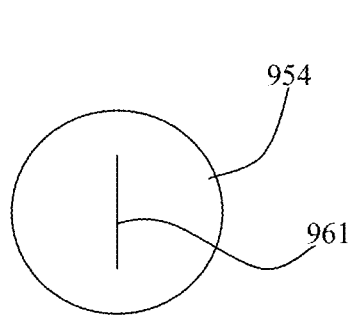
Figure 77E:
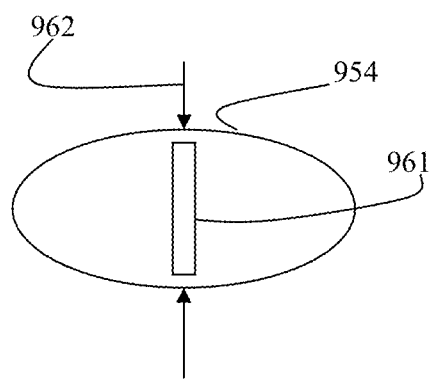

Referring also to FIG. 77d-g, in other embodiments, the buoyant member can be formed from a resilient foam material, such as extruded polyethylene or polypropylene foam, or other suitable resilient buoyant material, and configured to have a lengthwise channel that does not have a diameter (or at least a negligible diameter) when in an uncompressed configuration but that opens up to form a lengthwise channel when the buoyant member is compressed. For example, FIG. 77d illustrates a slit 961 formed in the buoyant member 954. The slit 961 runs the entire length or a portion of the length of the member 954. As illustrated in FIG. 77e, by applying a compressive force 962 on opposite sides of the buoyant member, the cross-section of the buoyant member is distorted thereby distorting the slit 961 such that it opens to form a channel. Once the slit 961 is distorted to form a channel, the channel can be placed over a prong that has protrusions or is free of protrusions. For example, the prong can be in the form of a blade. Once the compressive force applied to the buoyant member is removed, the channel reverts to its slit-like configuration, which compresses the buoyant member against the prong and hinders its removal.

Figure 77F:
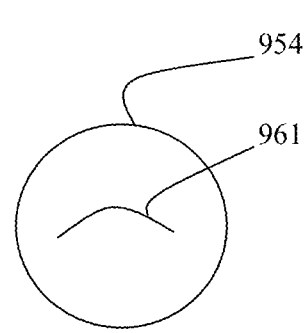
Figure 77G:
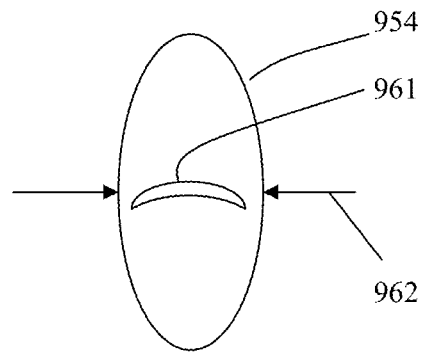

Similarly, FIG. 77f illustrates the slit 961 formed in the buoyant member 954. The slit 961 runs the entire length or a portion of the length of the member 954. The slit has a semi-circular shape but may be shaped in any other nonlinear shape. As explained below, the nonlinear shape of the slit is results in a varying degree of force applied to a prong within the slit across the length of the slit. As illustrated in FIG. 77g, by applying a compressive force 962 on opposite sides of the buoyant member, the cross-section of the buoyant member is distorted thereby distorting the slit 961 such that it opens to form a channel, here in the shape of a opened semi-circle. Once the slit 961 is distorted to form the channel, the channel can be placed over a prong that has protrusions or is free of protrusions. For example, the prong can be in the form of a blade. Once the compressive force applied to the buoyant member is removed, the channel reverts to its semi-circular slit configuration, which compresses the buoyant member against the prong and hinders its removal. The semi-circular slit retains the buoyant member against the prong based first on the presence of the slit and second because of the shape of the slit. The shape of the slit will attempt to conform the prong to that shape. However, the rigid nature of the prong will not permit such change in the prong and thereby providing additional force to retain the buoyant member to the prong.

The buoyant member 954, and other buoyant members described herein, are designed to be easily mounted to the stem guide 952 and thereafter easily removed from the stem guide 952 when and if desired. There is no requirement of securing the buoyant member to the stem guide with an adhesive, glue or other permanent mechanical securing means to permanently or temporarily secure the buoyant member to the stem guide. For example, rather than a crimping step of the stem guide to retain the buoyant member to the stem guide, the buoyant member may be retained by an interference fit within the stem guide in a step that does not include crimping or another form of permanent or plastic deformation of either the stem guide, the buoyant member or the combination of the two. Similarly, the step in which the buoyant member is retained in the stem guide or on the stem guide is by a step that does not either permanently or plastically deform the stem guide or buoyant member. For example, the buoyant member may have one end compressed, inserted into a cavity of the stem guide and then allowed to expand to its natural condition, or almost natural condition, to securely fit within the stem guide. In this configuration, it is not necessary to apply adhesive or glue to retain the buoyant member in the stem guide. This method of applying the buoyant member may be applicable to buoyant members with a channel along its length as well as solid buoyant members.

As another example of a step of retaining the buoyant member to the stem guide, the buoyant member can be twisted or rotated (e.g., in a clockwise or counter clockwise direction) into the stem guide such that the twisting or rotating causes the outer diameter of one end of the buoyant member to be temporarily decreased to fit within the stem guide. In another embodiment of mounting the buoyant member to a prong extending from the stem guide, the buoyant member can be compressed or distorted in shape to change the round channel through the buoyant member to form an elongated, narrowed channel that passes easily over any protrusions extending from the prong. By forming an elongated, narrowed channel, it is meant that the diameter of the channel is reduced in one dimension but extended in another dimension. For example, the channel may be round at rest but upon compressing two opposite sides of the buoyant member inward, the channel changes from a round shape to an elongated oval shape. As a consequence, the buoyant member passes easily over the prong to be in contact with the stem guide, but upon releasing any compressive force applied to the buoyant member the resiliency of the buoyant member causes the channel to return to its original diameter. As a result, the channel will attempt to return to its originally round shape and compress against the prong and any protrusions extending from the prong, which will thereby restrict the ability of the buoyant member to be inadvertently removed. However, the buoyant member can be easily removed by repeating the compression action to slide the buoyant member off of the prong.

It also should be noted that most of the buoyant members and stem guides described herein have certain characteristics in common. For example, the stem guide is generally rigid without movable parts such as a hinge mechanism. Therefore the stem guide is free of any movable part and free of any hinge or hinge-like mechanism and consists of or consists essentially of the configurations illustrated in the figures for purposes of mounting and retaining the buoyant member to the stem guide. It should be understood, however, that the spring or sleeve that slides over a portion of the stem guide is not included in this characterization because the spring is not the same as the stem guide but instead is an article added to the stem guide for use with the stem guide.

In contrast, most of the buoyant members used as replaceable elements with the stem guide are configured to be movable rather than rigid. By movable, it is meant that the buoyant member can be one or more of compressed inward, distorted in shape, bent, folded over, stretched lengthwise or widthwise and compressed lengthwise or widthwise. These characteristics permit such buoyant members to be easily mounted to and removed from a stem guide. A buoyant member made of a material that is resilient, flexible or compressible, could be difficult for an angler to mount to the prong or insert into a cup. For example, a rigid Styrofoam buoyant member could be too rigid for use as a replaceable float with the prong version or the cup version of the stem guide. The act of sliding the Styrofoam buoyant member of a prong having protrusions extending from the surface may result in the buoyant member cracking or otherwise permanently deforming.

As an example of one of these characteristics referenced above, the prong extending from the flat surface of the stem guide is generally rigid and does not include a flexible or movable portion that is used to exert a force to retain the buoyant member to the prong. Instead, the prong maintains a constant shape, does not exert a force against the buoyant member and can be characterized as being passive with respect to acting on or exerting a force against the buoyant member. Therefore, retention of the buoyant member to the prong is based solely on the compressive force exerted by the buoyant member against the prong rather than an expansive force exerted by the prong against the buoyant member. In other words, retention of the buoyant member to the prong occurs because the buoyant member exerts a force on the prong while the prong receives the force exerted by the buoyant member.

As a further explanation, in use the buoyant member is stretched or forced over the prong and passed along a portion or all of the length of the prong. Upon being placed or forced over the prong, the buoyant member is primarily retained to the prong by the compressive force of the buoyant member as it attempts to reduce its size by returning to its unstretched or unexpanded state against the prong. Consequently, if a buoyant member has a channel with an inner diameter that is greater than the outer diameter of the prong, the buoyant member will not exert a force against the prong and therefore will easily fall off of the prong.

Figure 78:
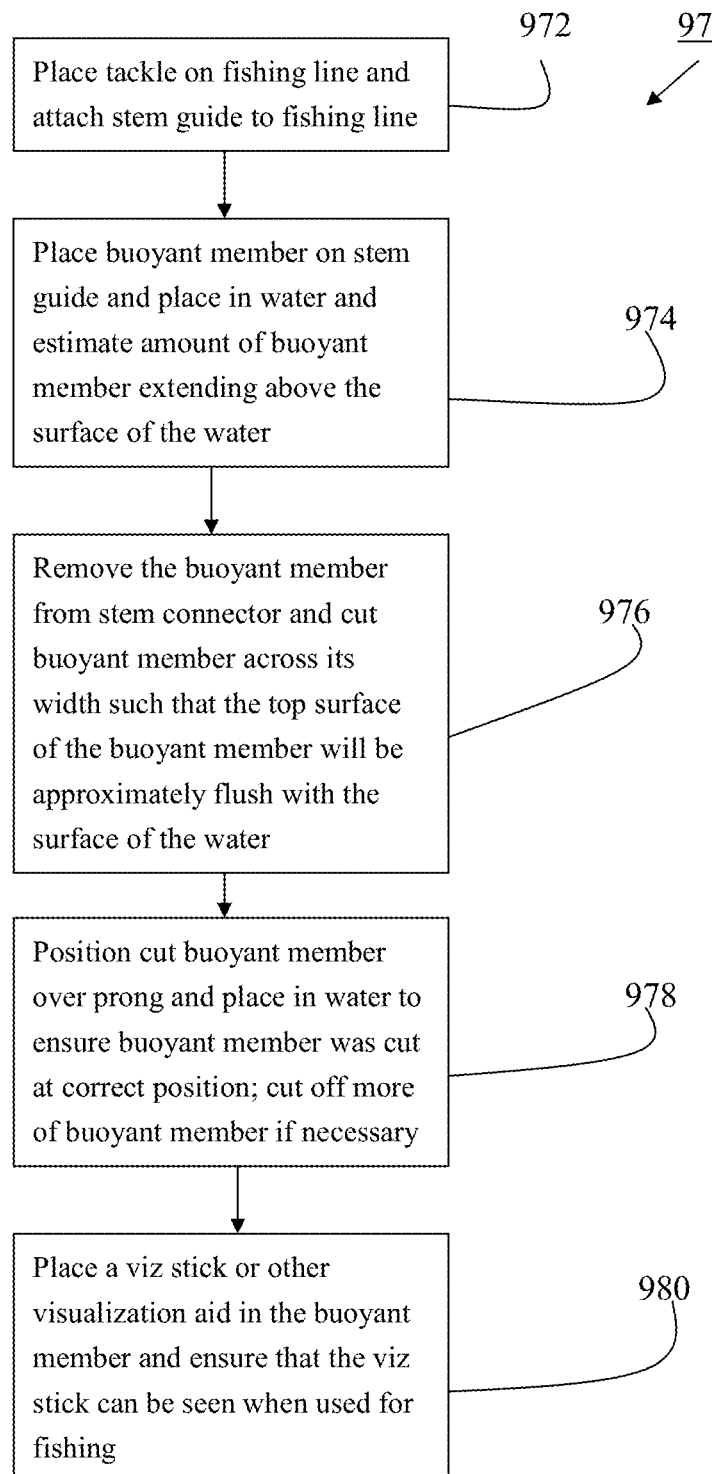

FIG. 78 describes a process 970 by which an angler can use the stem guide 952 and the buoyant member 954 for fishing to minimize the resistance that a fish would feel upon taking the lure or bait used with the stem guide. Initially, the angler places tackle on the fishing line and attaches a stem guide to the fishing line (step 972). Next, the angler mounts the buoyant member 954 to the stem guide 952 and places the stem guide in the water to estimate the amount of buoyant member extending above the surface of the water (step 974). The angler next removes the buoyant member from the stem connector and cuts the buoyant member across its width at the position where the surface of the water was seen on the buoyant member. In this manner the top surface of the buoyant member should be approximately flush with the surface of the water (step 976). The angler then positions the cut buoyant member over the prong of the stem connector and places the stem connector back in the water to ensure buoyant member was cut at the correct position. If the angler decides that the buoyant member extends too much out of the water, the angler can cut off more of the buoyant member (step 978). Finally, the angler can place a viz stick or other visualization aid (e.g., light stick) in the buoyant member and ensure that the viz stick can be seen when fishing (step 980).

Although it is expected that the buoyant member will be securely retained to the stem guide without the use of an adhesive, the angler may decide to apply a small amount of adhesive to the buoyant member of the stem guide. In this manner, the angler will have additional assurances that the buoyant member will be retained to the stem guide. Similarly, the viz stick should be securely retained within the buoyant member without the use of an adhesive. However, the angler may wish to apply a small amount of adhesive to either the viz stick or the buoyant member to be assured that the viz stick will be retained within the buoyant member. In one embodiment, the amount of adhesive applied is just enough to retain the viz stick or buoyant member but not so much that the articles cannot be separated without damage to either article. In another embodiment, the amount of adhesive applied retains the viz stick or buoyant member but prevents separation without damage to either the viz stick, buoyant member or stem guide. Such techniques are optionally included in the method of this invention.

Figure 79A:
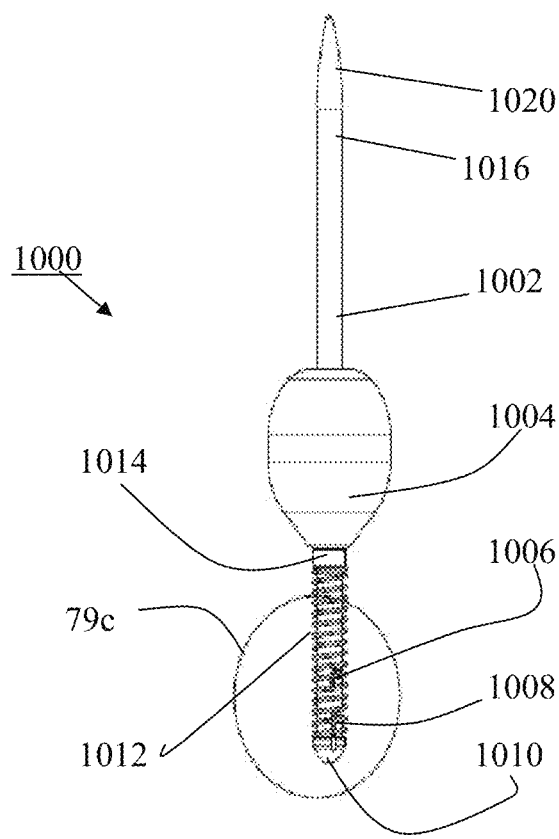
FIG. 79a is a front view of a single stem fishing float assembly for slip and fixed bobber fishing.
Figure 79B:
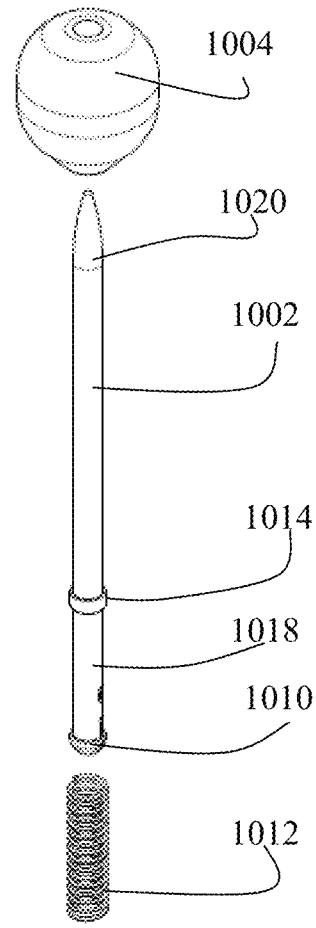
Figure 79C:
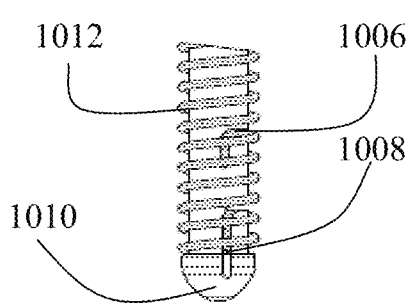

Referring to FIGS. 79a-c, in another embodiment, an angler can use a fishing float 1000 for both slip bobber fishing and fixed bobber fishing in any season. The fishing float 1000 includes a stem 1002 and a float 1004. At a lower region 1018 of the stem 1002 there is positioned a pair of line shoulders 1006, 1008 that pass into the stem. At the lower region of the stem there also is a cap 1010 positioned at the end of the stem. The cap 1010 can be a molded part that is attached to the stem or molded with the stem during the manufacture of the stem. The cap 1010 has an outer diameter that is greater than that of the stem such that the outer edge of the cap extends beyond the outer edge of the stem. The line shoulder 1008 extends into the cap 1010 through an upper surface of the cap that is oriented generally perpendicularly to the outer surface of the stem.

The stem also includes a flange or ridge 1014 against which the float 1004 is mounted. The ridge 1014 may be a part separately mounted to the stem and held against the stem by, for example, an adhesive, interference fit, solvent or heat to form a bond between the stem and ridge or a combination of these techniques. The stem also may be an integral part of the stem that is formed during the manufacture of the stem. During manufacture, the float 1004 is passed over the stem from the upper region 1016 along the stem to the ridge 1014. The float 1004 may be retained against the stem by an interference fit between an inside surface of the float, an adhesive that bonds the float to the stem, use of a solvent or heat to form a bond between the float and the stem, or a combination of these techniques.

The fishing float 1000 also includes a spring 1012 that is positioned over the lower region of the stem 1002 such that the spring surrounds both line shoulders 1006, 1008. The spring extends between the cap 1010 and the ridge 1014 such that the spring is retained on the lower region 1018 of the stem. As noted above, the line shoulder 1008 extend into the cap 1010. In so doing, a portion of the length of the line shoulder is not surrounded by the spring. In contrast, the spring covers the entirety of the upper line shoulder 1006. This different is important in use of the fishing float 1000 for slip bobber fishing and fixed bobber fishing. As is understood by one of skill in the art, the lower region 1018 of the fishing bobber will be within the water during fishing with a lower portion of the float 1004 under the water and an upper portion above the water. When a fishing line passes through the lower line shoulder 1008, the fishing line can slide through the line shoulder without hindrance and remains underwater when passing through the line shoulder. While this may not provide unexpected advantages during fishing in above freezing temperatures, this configuration offers advantages during winter fishing when temperatures are below freezing. Because the interaction of the fishing line and the line shoulder occurs underwater, there is no contact with freezing air conditions that could cause water on the line or line shoulder to result in the line freezing to the line shoulder.

To prepare the fishing float 1000, the stem 1002 is prepared by extrusion, molding, or other fabrication technique. The stem may be solid or hollow with a lengthwise channel through its center. The stem may be molded with the line shoulders 1006, 1008, cap 1010 and ridge 1014 in place or extruded and the line shoulders, cap and ridge formed separately. The cap 1010 may have an optional opening that can be used if the stem 1002 has a channel along its length, for example, for slip bobber fishing. The stem may be made of a plastic, such as polypropylene, polyethylene, nylon, etc. The float 1004 may be a polyurethane foam, a hollow plastic piece with a channel through the middle such that a buoyant region is formed, or other buoyant material with a lengthwise channel through the middle. The float 1004 may be placed over the upper region 1016 of the stem and then affixed to the stem in the manners described above. The spring 1012 may be mounted to the lower region of the stem prior to placing the cap and ridge on the stem or afterwards by manipulating the spring such that it can be forced over the cap or ridge. The ridge 1014 can be formed such that it includes a downward directed opening forming a cavity sized to receive the end of the spring. In this manner, the upper end of the spring resides within the cavity, which advantageously reduces the likelihood that an angler will attempt to push down the upper end of the spring with using the fishing float 1000.

As evident from the figures, the upper region 1016 of the stem includes a tapered cap 1020 that is positioned at a terminal end of the stem. The tapered cap 1020 can be a separate item that is affixed to the stem, an integral part of the stem formed during manufacture, or an integral part of the stem formed by inserting the stem into a heated mold shaped to result in the tapered shape. The cap 1020 can be the same color as the stem or a different, more readily visible color, such as red, yellow, orange, or a fluorescent color that is easily seen during angling. The cap can include a lengthwise channel and have an opening at the tapered end that permits passage of the fishing line so that the fishing float can be used for slip bobber fishing through the length of the stem as well as through the line shoulder 1008.

To use the fishing float 1000, the angler can either slip bobber or fixed bobber fish. If fixed bobber fishing, the angler moves the lower end of the spring 1012 upward in the direction of the ridge 1014. In moving the spring upwards, the line shoulder 1008 and 1006 are exposed. If the angler places the fishing line through the line shoulder 1006, the angler can use the fishing float 1000 for fixed bobber fishing. Upon releasing the spring 1012, the spring will expand downward against the cap 1010. In expanding downward, the fishing line will be forced by the spring against the cap 1010 on opposite positions of the line shoulder. By forcing the fishing line against the cap, the fishing line will be hindered from sliding through the line shoulder, thereby providing the bobber suitable for fixed bobber fishing.

If the angler pushes the lower end of the spring upward and places the fishing line through the line shoulder 1008, the angler can instead use the fishing float 1000 for slip bobber fishing. Upon releasing the spring, the end of the spring will push the fishing line into the portion of the line shoulder that passes through the cap 1010. In this manner, the fishing line can slide through the line shoulder and cap without hindrance until a line stop reaches the line shoulder. The line stop, e.g., a knot and/or bead, will be of an outer diameter than cannot fit through the shoulder such that upon interaction with the line shoulder, the line will not be able to move further through the line shoulder.

It should be understood that the primary functions of the cap 1010 are to provide a surface against which the fishing line will be pressed for fixed bobber fishing and to prevent the spring from falling off of the stem. The functions can be provided just as well by the formation of a ridge extending from the stem around the entirety or a portion of the circumference of the stem.

It should be noted that in this embodiment, the fishing float does not include a stem connector as described above. Instead, the fishing float consists of or consists essentially of the stem, the line shoulders in the stem for fixed and slip bobber fishing, a float positioned around the stem to provide buoyancy to the fishing float, and a spring with a ridge or cap to prevent loss of the spring and to permit fixed bobber fishing.

In another implementation of the fishing float 1000, the float 1004 is made of a buoyant material that can be cut, as described above. The float can be made of a material that floats in water but can be cut using, for example, a knife. Suitable materials that can be cut include a conventional material such as a plastic or foam, e.g., cork, polyethylene, balsam wood etc. The float can be extruded or injection molded. Extruded polyethylene has been found to be particularly suitable as a buoyant float. As explained above, the float is cut to reduce the amount of buoyant material, e.g., the float, positioned above the water line. In this way, the float can be cut so that a minimal amount of float is above the water line or at the water line. The angler would make these adjustments in the manner described above.

Advantageously, in this embodiment the float 1004 can be removed and replaced with a different float as desired. In this implementation, the float is retained to the stem 1002 by an interference fit and/or an optional application of an adhesive, or using other methods disclosed herein. In this implementation, the stem 1002 can be provided in a kit with one or more floats 1004. The floats 1004 also can be provided in a separate package without the stem. The stem 1002 can be sold separately if desired. Although the floats are illustrated as being bulb shaped, the floats can be of any shape, such as an elongated tube as illustrated in other figures herein.

Referring to FIGS. 80a-f, in another embodiment, a fishing float 1030 includes a two part stem made up of a first tube 1016 and a second tube 1018. The pair of tubes are joined together at a sleeve 1040. The sleeve 1040 may be a short segment of tubing that is receives an end of the each of the tubes 1016, 1018 and then retains the tubes within the sleeve through an interference fit, adhesive, heat or solvent bonding, etc. or a combination of techniques. The sleeve 1040 instead can be integrally formed with the tube 1018, for example, by injection molding of the entire piece. The inner diameter of the sleeve can be sized to receive the tube 1016 with a tight interference fit. The sleeve also can be configured to have an opening into a cavity that is sized to receive an end of a spring, as described above with respect to FIGS. 79a-c. If injection molded of otherwise manufactured, the tube 1018 also can be configured to include a cap or ridge 1010 at the end opposite of the sleeve. The cap/ridge 1010 prevents the sleeve from being dislodged off of the tube 1018.

As particularly illustrated in FIG. 80c, the tube 1018 includes a lengthwise channel 1032 that passes between a pair of openings at ends 1042, 1044. The opening at end 1042 permits a fishing line to pass out of the fishing float 1030 in slip bobber fishing. The fishing line passes through the channel 1032 from the opening at end 1044 to end 1042. The fishing line enters the tube 1018 from tube 1016, which is formed with a lengthwise channel 1034 over its entire length. The end of the tube 1016 that is distant from the tube 1018 has an opening that is closed with a cap 1036. The cap 1036 has an opening 1046 through which the fishing line can pass. The opening 1046 is sized such that a fishing line can pass through the opening but a bobber line stop, such as a tied knot or an elastic bead, will not pass through the opening. This allows the fishing float 1040 to be used for slip bobber fishing.

As evident in FIGS. 80c and 80f, the tube 1018 is solid except for the channel 1032. A pair of line shoulders 1006, 1008 are formed within the tube 1018. As explained above with respect to FIGS. 79a-c, the spring 1012 is used in combination with the line shoulders to be permit an angler to use the fishing float 1030 for either fixed bobber fishing or slip bobber fishing in any weather conditions, e.g., freezing conditions or summer conditions.

The fishing float 1030 has other features in common with the fishing float 1000. For example, the float 1004 can be affixed permanently to the stem or can be removable and replaceable. Similarly, the float can be cut to a particular length to reduce resistance when a fish strikes the hook.

A difference between fishing floats 1000 and 1030 is the optional ability to insert a light stick into the tube 1016 of fishing float 1030. If desired, the angler can remove the cap 1036, insert a light stick into the tube 1016 and position the cap into the tube. In this embodiment, the tube 1016 is made of a clear plastic such that the light emitted by the light stick will pass through the tube and be visible to an angler.

Referring to FIGS. 81a-f, in another embodiment a fishing float 1050 is configured for use in slip bobber fishing in all seasons. The fishing float 1050 includes a one-piece stem 1052 that runs the entire length of the fishing float and a float 1004 positioned on and around the stem 1052. The stem includes a sleeve 1054 mounted on the stem in the form of a ridge or flange around the circumference of the stem. The sleeve acts as a stop to limit the downward movement of the float 1004 on the stem and may be formed with the stem, e.g., by injection molding, or a separately formed part that is mounted on the stem and held in place by, for example, a bond formed through use of an adhesive, solvent, heat, etc.

In conjunction with a ridge or cap 1056 at the bottom of the stem, the sleeve 1054 also limits upward movement of a spring 1012 on a lower region of the stem while the ridge 1056 limits downward movement of the spring. The spring encircles a pair of line shoulders 1006, 1008 in the lower region of the stem. As explained above, the line shoulder 1008 extends below the ridge 1056 into the cap such that the spring does not encircle the entirety of the line shoulder 1008 while encircling the entirety of the line shoulder 1006. This difference in encirclement by the spring permits the line shoulder 1006 to be used for fixed bobber fishing and the line shoulder 1008 to be used for slip bobber fishing.

The stem 1052 also includes a lengthwise channel 1060 that has a first opening 1064 at one end of the stem and a second opening 1062 as the other end of the stem. The channel 1060 is used for slip bobber fishing and is particularly suited for summer slip bobber fishing. The top end of the stem and the channel opening 1064 is closed with a cap 1046. The cap 1046 includes an opening through which a fishing line can be passed to be used for summer slip bobber fishing. The opening 1064 can have a flared configuration such that the fishing line will easily pass into the channel 1060. The stem 1052 can be formed by any conventional manufacturing method, including extrusion, injection molding, etc. and consist of a conventional plastic material, such as nylon, polypropylene, polyethylene, etc.

To use the fishing float 1050 for slip bobber fishing in warm weather, an angler would place a bobber stop on the fishing line in a position on the line between the fishing float and the reel. The angler then would pass the free end of the fishing line through the opening in the cap 1046, into the opening 1064, through the channel 1060, and out of the opening 1062 and the bottom of the stem. The angler then would attach fishing tackle, including sinkers, swivel, hook, lure, etc. to the free end of the line. The angler reels the fishing line into the reel, which causes the fishing float to slide along the line until it reaches the tackle at the end of the line. Upon casting out, the fishing tackle pulls the fishing line through the channel 1060 until the bobber stop fixed to the fishing line reaches the cap 1046 and the opening in the cap. Because the opening is sized to be smaller than the bobber stop, the line will stop passing through the channel, To use the fishing float 1050 for slip bobber or fixed bobber fishing using the line shoulders 1006, 1008, the angler pulls the spring 1012 up in the direction of the sleeve 1054. By pulling the spring up sufficiently to pass the fishing line into the line shoulder 1006 and then releasing the spring, the angler can use the fishing float 1050 for fixed bobber fishing. Releasing the spring causes the fishing line to be pressed by the spring against the ridge 1056, preventing movement of the fishing line through the line shoulder 1006. By pulling the spring up sufficiently to pass the fishing line into the line shoulder 1008 and then releasing the spring, the angler can use the fishing float 1050 for slip bobber fishing in freezing weather. Because any contact between the fishing line and the fishing float occurs underwater in this configuration, the fishing line will not freeze against the fishing float during use.

Referring to FIGS. 82a-d, in another embodiment a fishing float 1070 is configured for slip and fixed bobber fishing with the use of a light stick positioned within the stem of the fishing float. The fishing float 1070 includes a two part stem consisting of a lower stem segment 1072 and an upper stem segment 1074. The stem segments 1072, 1074 are fitted together using any conventional means, such as a threaded mounting, an interference fit or the like. FIG. 82*d* illustrates the use of a tube 1076 positioned within and extending from the lower stem segment 1072. The stem segment 1074 has a lengthwise channel 1079 into which the tube 1076 is inserted to mount the lower stem segment and the upper stem segment to form the stem of the fishing float 1070. The tube 1076 is retained within the channel 1079 by an interference fit, application of a small amount of adhesive, solvent bond, etc. The mounting of the two stem segments can result in a water tight seal. The stem includes a sleeve 1078 mounted on the stem in the form of a ridge or flange around the circumference of the stem. The sleeve acts as a stop to limit the downward movement of the float 1004 on the stem and may be formed with the stem, e.g., by injection molding, or a separately formed part that is mounted on the stem and held in place by, for example, a bond formed through use of an adhesive, solvent, heat, etc.

The channel 1079 within the stem segment 1074 forms a cavity into which a light stick 1084 or other visual indicator (e.g., viz stick) can be placed. The upper stem segment 1074 may be formed from a clear plastic material such that the light from the light stick will emit through the plastic material so that the angler can locate the position of the fishing float 1070 once it is positioned in the water or can be alerted to a strike on a hook attached to the fishing line by movement of the light stick/fishing float combination.

A cap 1082 is positioned within the channel 1079 such that the cavity within the upper stem segment 1074 is water tight. The cap 1082 can be used to form a simple interference fit or can be modified to provide a more certain, water tight seal. For example, the cap can have a shaft from which extends one or more ridges that form water tight interference fit between the shaft and the inner wall of the channel 1079. The cap also can have a ribbed surface on the portion of the cap that is outside of the channel 1079. The ribbed surface permits an angler to easily grip the cap and remove it to insert or withdraw the light stick.

The float 1004 is positioned around the stem 1074 and held in place in the manner described above, e.g., an interference fit, a bond formed by use of an adhesive, solvent, heat. In use, the lower stem segment 1072 will be submerged under water, a portion of the float 1004 will be submerged in the water and the upper stem segment 1074 will extend out of the water with the light stick 1084 positioned entirely out of the water. Of course, the relative lengths of the stem segments 1072, 1074 can be varied from that illustrated in FIGS. 82*a-d* such that all or a portion of the light stick is submerged. The configuration of the fishing float 1070 keeps the cavity 1079 water free so that the light stick remains dry.

To use the fishing float 1070 for slip bobber or fixed bobber fishing with a light stick 1084 in the cavity formed within channel 1079, the angler first attaches the fishing line. The angler initially pulls the spring 1012 up in the direction of the sleeve 1078. By pulling the spring up sufficiently to pass the fishing line into the line shoulder 1006 and then releasing the spring, the angler can use the fishing float 1050 for fixed bobber fishing. Releasing the spring causes the fishing line to be pressed by the spring against the ridge formed by the cap 1080, preventing movement of the fishing line through the line shoulder 1006. By pulling the spring up sufficiently to pass the fishing line into the line shoulder 1008 and then releasing the spring, the angler can use the fishing float 1070 for slip bobber fishing in freezing weather. Because any contact between the fishing line and the fishing float occurs underwater in this configuration, the fishing line will not freeze against the fishing float during use. The angler then removes the cap 1082, activates a light stick, inserts the light stick into the cavity formed in channel 1079, and replaces the cap. The angler can cast out the fishing tackle and float or use the tackle and fishing float at that location (e.g., through a hole in the ice). If slip bobber fishing, the fishing line will pass through the line shoulder 1008 until a bobber stop attached to the fishing line at a pre-determined position reaches the line shoulder, at which time the interaction between the bobber stop and the line shoulder will prevent further movement of the fishing line through the line shoulder. In this manner, assuming that the angler is fishing at night or in otherwise dark conditions, the angler will be able to view the position of the fishing float based on the light emitted from the light stick.

As described above with reference to the fishing float 1000, the fishing float 1070 may similarly include a float 1004 that is made of a buoyant material that can be cut, as described above. The float can be made of a material that floats in water but can be cut using, for example, a knife. Suitable materials that can be cut include a conventional material such as a plastic or foam, e.g., cork, polyethylene, balsam wood etc. The float can be extruded or injection molded. Extruded polyethylene has been found to be particularly suitable as a buoyant float. As explained above, the float is cut to reduce the amount of buoyant material, e.g., the float, positioned above the water line. In this way, the float can be cut so that a minimal amount of float is above the water line or at the water line. The angler would make these adjustments in the manner described herein elsewhere.

Advantageously, in this embodiment the float 1004 can be removed and replaced with a different float as desired. In this implementation, the float is retained to the stem 1072 by an interference fit and/or an optional application of an adhesive, or using other methods disclosed herein. The stem 1074, like the other stems described herein can also include protrusions, a roughened surface, longitudinal ribs, circumferential ridges, etc. to improve the interference fit between the float 1004 and the stem 1074. In this implementation and the others herein, the stem 1072 can be provided in a kit with one or more floats 1004. The floats 1004 also can be provided in a separate package without the stem. The fishing float 1070 can be sold separately without a float 1004 if desired and then a kit with different sized, shaped and colored floats purchased separately for mounting on the stem. For example, while the float 1004 has been depicted as being bulb shaped, the floats can be of any shape, such as an elongated tube as illustrated in other figures herein.

Referring to FIGS. 83*a-f*, in another embodiment a fishing float 1085 is configured for slip and fixed bobber fishing with the use of a light stick 1084 positioned within a hollow tube 1087 positioned adjacent to an upper stem segment 1091 of the stem of the fishing float 1085. The fishing float 1085 includes a two part stem consisting of a lower stem segment 1090 and the upper stem segment 1091. The stem segments 1090, 1091 are fitted together using any conventional means, such as a threaded mounting, an interference fit or the like. Alternative, the stem segments can be produced as a single, one piece stem, such as by injection molding.

Figures 83A, 83B, 83C:
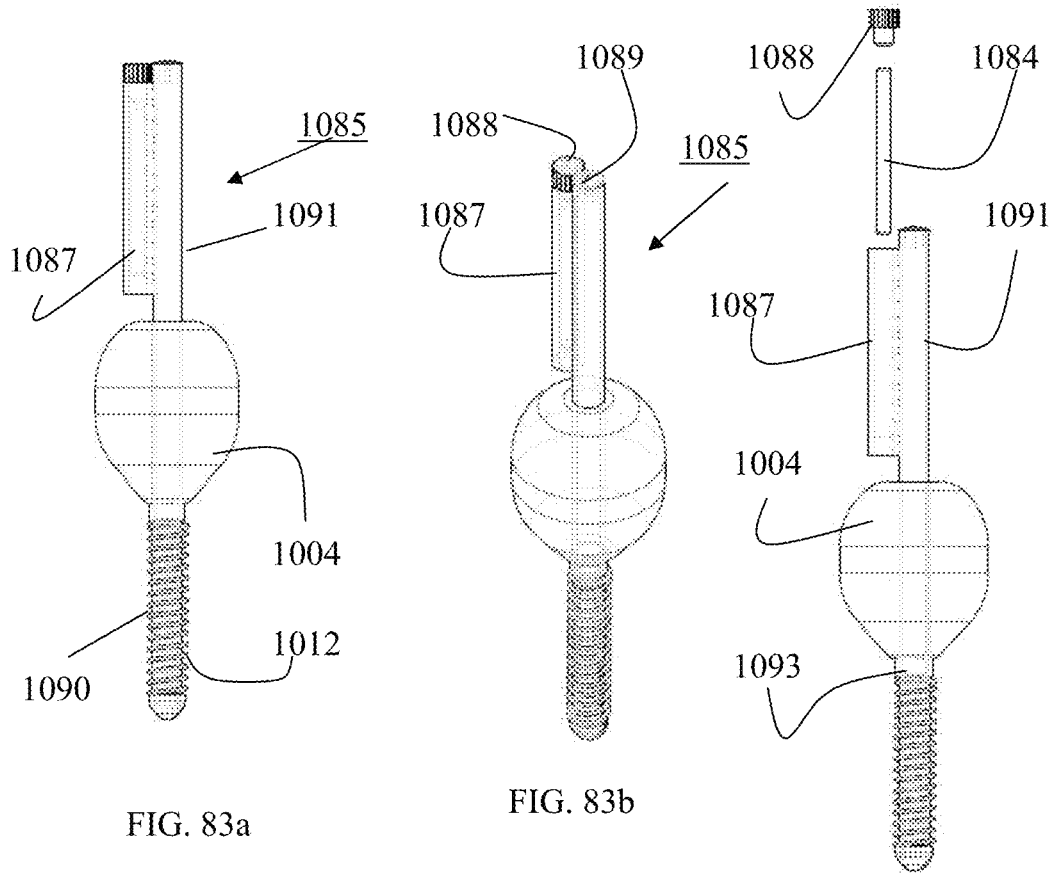
FIGS. 83*a-f* are views of a fishing float assembly that permits summer and winter slip bobber fishing.

FIGS. 83*a-c* illustrate the hollow tube 1087 positioned adjacent to and extending lengthwise along the length of the upper stem segment 1091. The hollow tube 1087 has a closed lower end and an open upper end into which a light stick 1084 or other visual indicator (e.g., viz stick) can be inserted. The light from the light stick will emit through the plastic material so that the angler can locate the position of the fishing float once it is positioned in the water or can be alerted to a strike on a hook attached to the fishing line by a movement of the light stick/fishing float combination. The open end is closed by a cap 1088 that fits within the opening. The cap may be threaded to be retained in the cap or may be threadably inserted into the cap. The cap can have a hinge that connects the cap to the tube 1087. The hinge can be in the form of a strip of plastic connecting the cap to the tube. The cap can be used to form a simple interference fit or can be modified to provide a more certain, water tight seal. For example, the cap can have a shaft from which extends one or more ridges that form water tight interference fit between the shaft and the inner wall of the channel formed in the hollow tube. The cap also can have a ribbed surface on the portion of the cap that is outside of the channel. The ribbed surface permits an angler to easily grip the cap and remove it to insert or withdraw the light stick.

The hollow tube 1087 can be made from a clear plastic material or can be tinted with one or more colors. In this manner, if the plastic used to form the tube is clear and untinted a light stick positioned within the tube will emit a light of the color of the light stick. Alternatively, if the tube is tinted with one or more colors, a light stick positioned within the tube will result in the light emitted to be of the tint or tints of the tube. The tube 1087 can be made of multiple segments that are attached to each other to form a tube. Each tube can be made of a clear plastic with a different tint to allow an angler to better distinguish his float from another. For example, the tube can be made of a first clear untinted segment and a second clear red tinted segment. In this manner, a light stick within the tube will cause a red light and a white light to be emitted when in use. Other color combinations are also possible and within the scope of the invention.

The hollow tube 1087 may be formed with the stem or stem segments or may be formed separately and mounted to the stem or stem segments. If the hollow tube is formed with the stem or stem segments, the tube may be injection molded or extruded. If formed separately, the tube may be injection molded or extruded, and then mounted to the stem or stem segments. The hollow tube 1087 may be adhered to the stem using an adhesive or solvent based bond, the tube may be heat bonded to the stem or may be retained through use of a mechanical fitting.

Figures 83D, 83E, 83F:
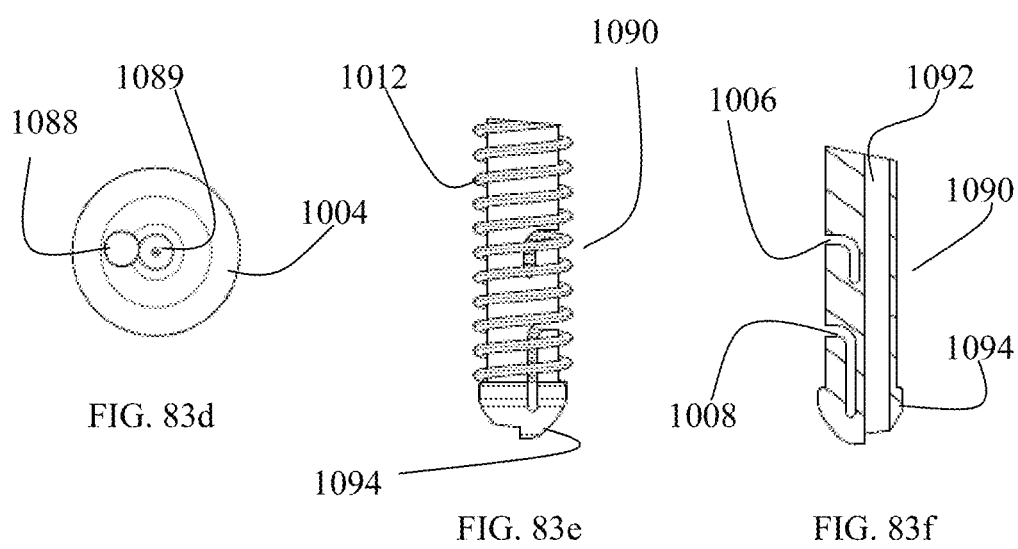

The stem segments 1090 and 1091 have a lengthwise channel 1092 into which a fishing line can be passed for through slip bobber fishing. As illustrated in FIG. 83d, the upper stem segment 1091 includes an opening 1089 at one end into which the free end of a fishing line can be inserted. The fishing line is then passed through the channel 1092 into the lower segment 1090 and out the end of the stem. The diameter of the opening 1089 is selected such that a pre-tied knot on the fishing line will interact with the opening 1089 for slip bobber fishing.

The stem includes a sleeve 1093 mounted on the stem in the form of a ridge or flange around the circumference of the stem. The sleeve acts as a stop to limit the downward movement of the float 1004 on the stem and may be formed with the stem, e.g., by injection molding, or a separately formed part that is mounted on the stem and held in place by, for example, a bond formed through use of an adhesive, solvent, heat, etc. The sleeve 1093 also limits upward movement of a spring 1012 that encircles a portion of the lower stem segment 1090. The stem segment 1090 also includes a lower cap 1093 that limits downward movement of the spring 1012, restraining movement of the spring between the cap 1093 and sleeve 1093.

The float 1004 is positioned around the stem 1090/1091 and held in place in the manner described above, e.g., an interference fit, a bond formed by use of an adhesive, solvent, heat. In use, the lower stem segment 1090 will be submerged under water, a portion of the float 1004 will be submerged in the water and the upper stem segment 1091 will extend out of the water with the light stick 1084 positioned entirely out of the water. The configuration of the fishing float keeps the cavity within tube 1087 water free so that the light stick remains dry.

To use the fishing float 1085 for slip bobber or fixed bobber fishing with a light stick 1084 in the cavity formed within the tube 1087, the angler first attaches the fishing line. The angler initially pulls the spring 1012 up in the direction of the sleeve 1093. By pulling the spring up sufficiently to pass the fishing line into the line shoulder 1006 and then releasing the spring, the angler can use the fishing float 1085 for fixed bobber fishing. Releasing the spring causes the fishing line to be pressed by the spring against the ridge formed by the cap 1094, preventing movement of the fishing line through the line shoulder 1006. By pulling the spring up sufficiently to pass the fishing line into the line shoulder 1008 and then releasing the spring, the angler can use the fishing float 1085 for slip bobber fishing in freezing weather. Because any contact between the fishing line and the fishing float occurs underwater in this configuration, the fishing line will not freeze against the fishing float during use. The angler then removes the cap 1088, activates a light stick, inserts the light stick into the cavity formed in hollow tube 1087, and replaces the cap. The angler can cast out the fishing tackle and float or use the tackle and fishing float at that location (e.g., through a hole in the ice).

If slip bobber fishing, the angler will pass the fishing line through the line shoulder 1008 until a bobber stop attached to the fishing line at a pre-determined position reaches the line shoulder, at which time the interaction between the bobber stop and the line shoulder will prevent further movement of the fishing line through the line shoulder. In this manner, assuming that the angler is fishing at night or in otherwise dark conditions, the angler will be able to view the position of the fishing float based on the light emitted from the light stick.

In another form of slip bobber fishing, the angler passes the fishing line through the opening 1089 in the upper stem 1091, through the channel 1092 and out the opening at the bottom of the lower stem 1090. In use, when a bobber stop attached to the fishing line at a pre-determined position reaches the opening 1089, the interaction between the bobber stop and the opening will prevent further movement of the fishing line through the line shoulder. In this manner, assuming that the angler is fishing at night or in otherwise dark conditions, the angler will be able to view the position of the fishing float based on the light emitted from the light stick.

As described above with reference to the fishing float 1000, the fishing float 1085 may similarly include a float 1004 that is made of a buoyant material that can be cut, as described above. The float can be made of a material that floats in water but can be cut using, for example, a knife. Suitable materials that can be cut include a conventional material such as a plastic or foam, e.g., cork, polyethylene, balsam wood etc. The float can be extruded or injection molded. Extruded polyethylene has been found to be particularly suitable as a buoyant float. The extruded polyethylene can be a foam and the foam can be a closed cell foam. As explained above, the float is cut to reduce the amount of buoyant material, e.g., the float, positioned above the water line. In this way, the float can be cut so that a minimal amount of float is above the water line or at the water line. The angler would make these adjustments in the manner described herein elsewhere.

Advantageously, in this embodiment the float 1004 can be removed and replaced with a different float as desired. In this implementation, the float is retained to the stem 1090/1091 by an interference fit and/or an optional application of an adhesive, or using other methods disclosed herein. The stem, like the other stems described herein can also include protrusions, a roughened surface, longitudinal ribs, circumferential ridges, etc. to improve the interference fit between the float 1004 and the stem. In this implementation and the others herein, the stem can be provided in a kit with one or more floats 1004. The floats 1004 also can be provided in a separate package without the stem. The fishing float system 1085 can be sold separately without a float 1004 if desired and then a kit with different sized, shaped and colored floats purchased separately for mounting on the stem. For example, while the float 1004 has been depicted as being bulb shaped, the floats can be of any shape, such as an elongated tube as illustrated in other figures herein.

Further, the fishing float described herein have the option of mounting a light stick to the stem guide or buoyant member. The light stick can be mounted against or within the stem guide or buoyant member. Examples of lights sticks and fishing floats are described and illustrated in U.S. patent application Ser. No. 12/774,710, the contents of which are incorporated herein in their entirety by reference for the different configurations, uses and accessories disclosed therein along with methods of making and using.

It should be understood that references to materials of construction, specific dimensions, and utilities or applications are also not intended to be limiting in any manner and other materials and dimensions could be substituted and remain within the spirit and scope of the invention. For example, in the examples above the float or other cartridge item can be retained to the stem guide through the use of an adhesive as a supplement to the other retaining means or as the sole retaining means. The amount of adhesive used by itself or with other cartridge retaining means can be of an amount that retains the cartridge to the stem guide but permits removal of the cartridge without rendering the stem guide unusable. It also should be understood that the above embodiments illustrated and disclosed may be free of an adhesive to retain the cartridge to the stem guide. Accordingly, it is not intended that the invention be limited, except as by the appended claims.

I claim:

1. A fishing article comprising an elongated rod having a first end and a second end which define a longitudinal axis therebetween, wherein the elongated rod comprises:
  a float member encircling at least a portion of the elongated rod between the first end and the second end;
  a first slot in the elongated rod for releasably engaging a fishing line, wherein the first slot is positioned along a length of the elongated rod between the first end and the float member, has a first portion with a length that extends into the elongated rod from an outer surface of the elongated rod at a first position on the elongated rod and the first portion of the first slot has an orientation that is at an angle to the longitudinal axis of the elongated rod and passes between opposed openings on the outer surface of the elongated rod and the first slot further comprises a second portion with the second portion being oriented in a direction of the first end;
  a second slot in the elongated rod for releasably engaging a fishing line, wherein the second slot is positioned along the length of the elongated rod between the first slot and the float member, the second slot has a third portion with a length that extends into the elongated rod from the outer surface of the elongated rod at a second position on the elongated rod, the third portion of the second slot has an orientation that is at an angle to the longitudinal axis of the elongated rod and passes between opposed openings on the outer surface of the elongated rod, and the second slot further comprises a fourth portion with the fourth portion being oriented in the direction of the first end; and
  the second position of the second slot on the elongated rod is different from the first position of the first slot on the elongated rod, and the first and second slots are not in communication with one another.

2. The fishing article of claim 1, further comprising a channel extending between a first opening at the first end of the elongated rod and a second opening at the second end of the elongated rod.

3. The fishing article of claim 1, wherein the first slot and the second slot are positioned closer to the first end than to the float member.

4. The fishing article of claim 1, further comprising at least one spring or sleeve encircling a portion of the elongated rod between the first end and the float member, wherein the at least one spring or sleeve can be moved along the elongated rod to cover all of the first slot and at least a portion the second slot.

5. The fishing article of claim 1, further comprising at least one spring or sleeve encircling a portion of the elongated rod between the first end and the float member, wherein the at least one spring or sleeve can be moved along the elongated rod to cover at least a portion of the first slot and all of the second slot.

6. The fishing article of claim 1, further comprising at least one stop extending from the elongated rod at a position between the first end and the float member.

7. The fishing article of claim 6, wherein the at least one stop comprises a flange encircling at least a portion of a circumference of the elongated rod.

8. The fishing article of claim 7, further comprising at least one spring or sleeve encircling a portion of the elongated rod between the first stop and the float member, wherein the at least one spring or at least one sleeve can be moved along the elongated rod to cover all of the first slot and at least a portion of the second slot.

9. The fishing article of claim 1, wherein the elongated rod comprises a first portion extending in a first direction from the float member and terminating at a first opening in the elongated rod and a second portion extending in a second direction from the float member and terminating at a second opening in the elongated rod.

10. The fishing article of claim 9, wherein the float member is integral with the elongated rod.

11. The fishing article of claim 9, wherein the float member is removable from the elongated rod.

12. A fishing article comprising a float portion and a fishing line receiving portion:
  the fishing line receiving portion comprising a first elongated rod having a first end and a second end which define a longitudinal axis therebetween, the second end being between the first end of the first elongated rod and the float portion, a first slot for releasably engaging a fishing line, a second slot for releasably engaging a fishing line, a first stop at an outer surface of the first elongated rod, and at least one spring or sleeve with a first spring end or a first sleeve end adjacent to the first stop and a second spring end or a second sleeve end;

the fishing article further comprising a second elongated rod extending from the float portion in a direction opposite to the first elongated rod;

wherein the first slot has a first portion with a length that extends into the first elongated rod from an outer surface of the first elongated rod at a first position on the first elongated rod and the length has an orientation that is at an angle to the longitudinal axis of the first elongated rod and passes between opposed openings on the outer surface of the first elongated rod and the first slot further comprises a second portion with the second portion being oriented in a direction of the first end;

wherein the second slot has a third portion with a length that extends into the first elongated rod from the outer surface of the first elongated rod at a second position on the first elongated rod and the length has an orientation that is at an angle to the longitudinal axis of the first elongated rod and in which the second position of the second slot is different from the first position of the first slot on the first elongated rod and passes between opposed openings on the outer surface of the first elongated rod and the second slot further comprises a fourth portion with the fourth portion being oriented in the direction of the first end, and the first and second slots are not in communication with one another; and wherein the at least one spring or sleeve covers all of the first slot and at least a portion the second slot when the at least one spring or sleeve is in an expanded or compressed configuration.

13. The fishing article of claim 12, further comprising a second stop positioned on the outer surface of the first elongated rod, wherein one or both of the first stop and the second stop comprises a flange encircling at least a portion of a circumference of the first elongated rod.

14. The fishing article of claim 13, wherein the second stop comprises a portion of the float portion or a second flange positioned between the second slot and the float portion, whereby the first spring end or the first sleeve end is compressed against the float portion or the second flange and the second spring end or the second sleeve end is compressed against the other of the first stop or the second stop.

15. The fishing article of claim 12, wherein the first stop comprises a first flange encircling at least a portion of the circumference of the first elongated rod, the first slot extending into the first flange whereby when the at least one spring or sleeve is positioned against the first flange, at least a portion of the first slot is not positioned between the first spring end or the first sleeve end and the second spring end or the first sleeve end, respectively, whereby a fishing line within the first slot can move freely within the first slot.

16. The fishing article of claim 12, wherein the first portion of the first slot and the second portion of the first slot are at an angle to each other and the third portion of the second slot and the fourth portion of the second slot are at an angle to each other.

17. The fishing article of claim 12, wherein the second elongated rod extends in a direction opposite to the longitudinal axis of the first elongated rod.

18. The fishing article of claim 17, wherein the first elongated rod and the second elongated rod include an axial channel therethrough.

19. The fishing article of claim 17, wherein the second elongated rod is clear.

20. The fishing article of claim 12, wherein the longitudinal axis of the first elongated rod is a common longitudinal axis with the second elongated rod.

21. The fishing article of claim 12, wherein the first slot and the second slot are positioned closer to the first end than to the float portion.

22. The fishing article of claim 12, wherein the float portion further comprises a buoyant member that is mountable to the second elongated rod.

* * * * *